United States Patent
Yasui

(10) Patent No.: US 7,409,283 B2
(45) Date of Patent: Aug. 5, 2008

(54) CONTROL SYSTEM FOR PLANT AND INTERNAL COMBUSTION ENGINE

(75) Inventor: Yuji Yasui, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/663,160

(22) PCT Filed: Nov. 1, 2005

(86) PCT No.: PCT/JP2005/020108

§ 371 (c)(1),
(2), (4) Date: Mar. 19, 2007

(87) PCT Pub. No.: WO2006/049169

PCT Pub. Date: May 11, 2006

(65) Prior Publication Data

US 2007/0293956 A1    Dec. 20, 2007

(30) Foreign Application Priority Data

Nov. 2, 2004   (JP)   ............................. 2004-319924
Nov. 5, 2004   (JP)   ............................. 2004-321958

(51) Int. Cl.
*G05B 19/00* (2006.01)
*G06F 19/00* (2006.01)

(52) U.S. Cl. ............................. 701/106; 700/29; 700/52

(58) Field of Classification Search ......... 701/103–106, 701/109, 102, 115; 700/28–29, 52; 123/90.16
See application file for complete search history.

(56) References Cited

U.S. PATENT DOCUMENTS

| | | | | |
|---|---|---|---|---|
| 6,985,809 B2 * | 1/2006 | Yasui | ........................ | 701/109 |
| 7,158,874 B2 * | 1/2007 | Yasui et al. | .................. | 701/103 |
| 7,184,877 B1 * | 2/2007 | de Ojeda | ..................... | 701/104 |
| 2002/0029136 A1 * | 3/2002 | Hagiwara et al. | ............... | 703/8 |
| 2003/0125865 A1 * | 7/2003 | Yasui | .......................... | 701/109 |
| 2007/0131186 A1 * | 6/2007 | Yasui et al. | ............... | 123/90.16 |
| 2008/0051979 A1 * | 2/2008 | Yasui et al. | .................. | 701/105 |

FOREIGN PATENT DOCUMENTS

| | | |
|---|---|---|
| JP | 5-181504 A | 7/1993 |
| JP | 10-301602 A | 11/1998 |
| JP | 11-166434 A | 6/1999 |

(Continued)

*Primary Examiner*—Hieu T Vo
(74) *Attorney, Agent, or Firm*—Arent Fox LLP

(57) ABSTRACT

There is provided a control system for a plant and an internal combustion engine, which is capable of enhancing controllability and control accuracy in controlling a plurality of control amounts while eliminating a mutual interaction existing between a plurality of control inputs and the control amounts. The control system 1 for the plant 90 in which a mutual interaction exists between TH_cmd and Liftin_cmd as control inputs and PB and Gcyl as control amounts calculates the two control inputs TH_cmd and Liftin_cmd as two non-interacting inputs for causing PB and Gcyl to follow target values PB_cmd and Gcyl_cmd, respectively, the two control inputs TH_cmd and Liftin_cmd eliminating the mutual interaction, with a predetermined algorithm in which a predetermined response-specifying control algorithm (equations (2) to (8)) and a predetermined non-interacting control algorithm (equation (9)) are combined based on a plant model (equation (20)) formed by modeling the plant 90 into a discrete-time system model.

22 Claims, 30 Drawing Sheets

FOREIGN PATENT DOCUMENTS

| | | |
|---|---|---|
| JP | 11-297012 A | 10/1999 |
| JP | 2000-110656 A | 4/2000 |
| JP | 2001-227396 A | 8/2001 |
| JP | 2002-38982 A | 2/2002 |
| JP | 2003-49673 A | 2/2003 |
| JP | 2003-195907 A | 7/2003 |
| JP | 2003-254100 A | 9/2003 |

* cited by examiner

FIG. 5
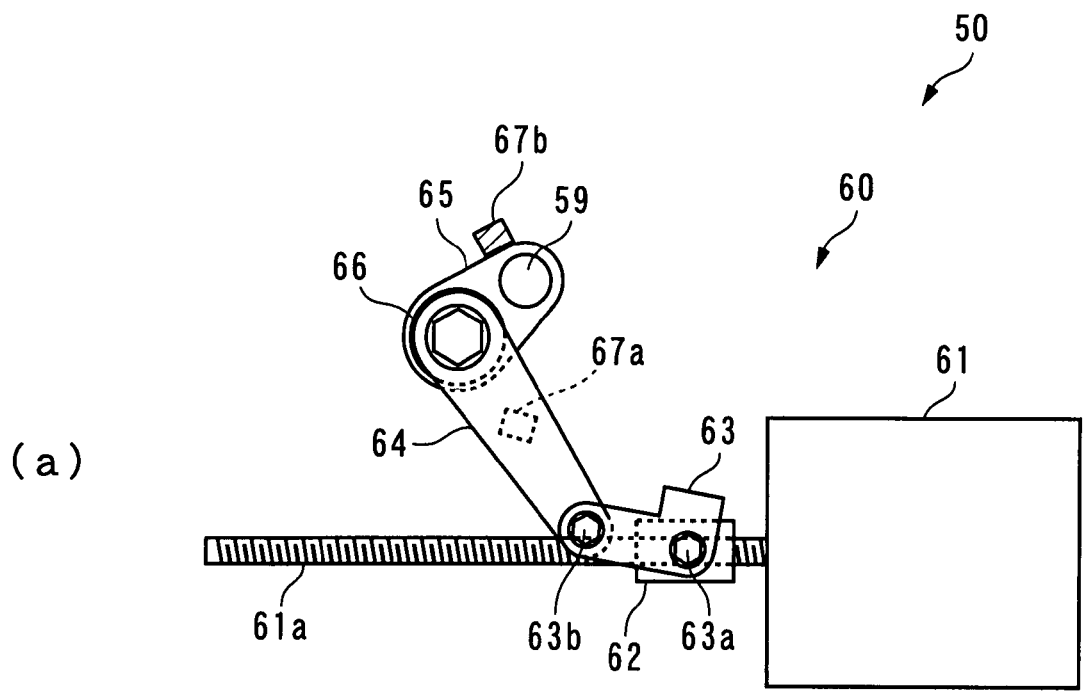
(a)
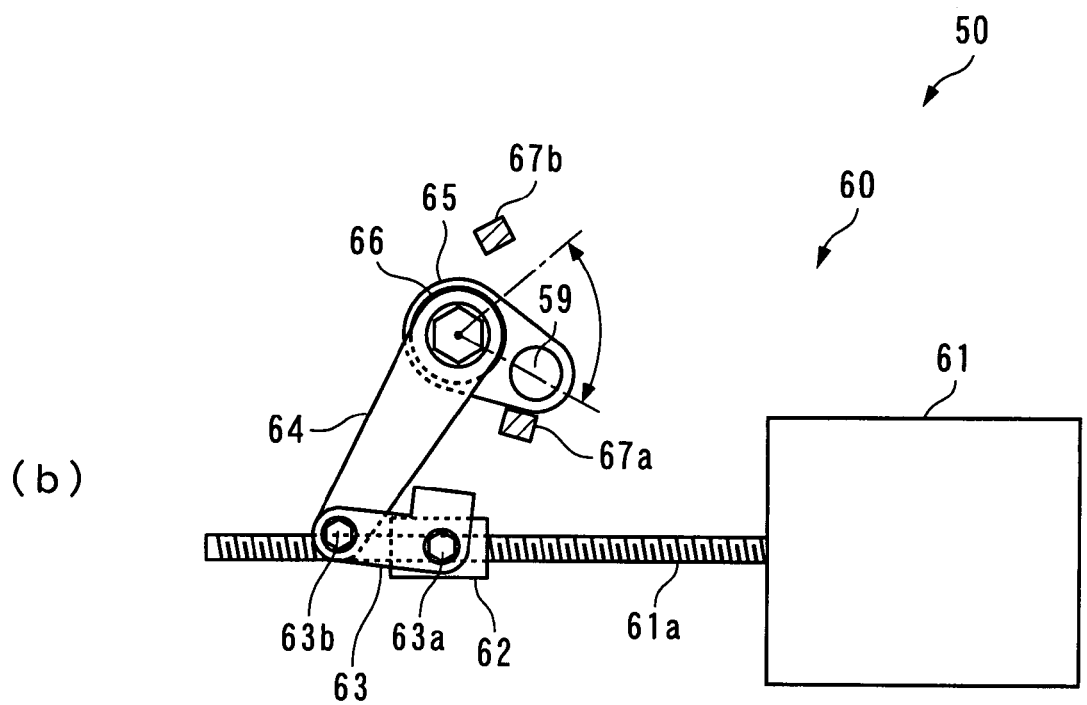
(b)

CONTROL SYSTEM FOR PLANT AND INTERNAL COMBUSTION ENGINE

CROSS-REFERENCE TO RELATED APPLICATION

This application is a National Stage entry of International Application No. PCT/JP2005/020108, filed Nov. 1, 2005, the entire specification claims and drawings of which are incorporated herewith by reference.

FIELD OF THE INVENTION

The present invention relates to a control system for a plant in which a mutual interaction exists between a plurality of control inputs and a plurality of control amounts, and a control system for an internal combustion engine, for controlling control amounts of the engine by respective control inputs.

BACKGROUND ART

Conventionally, a control system for controlling a polishing robot is known which is described in Patent Literature 1. This control system controls the polishing robot with a sliding mode non-interacting control algorithm in which a sliding mode control algorithm and a non-interacting control algorithm are combined, in the following manner:

First, a polishing system including the polishing robot is regarded as a plant to which driving forces fmx and fmy of the polishing robot in the X direction and the Y direction are inputted as two control inputs, and in which respective positions Px and Py of a work in the X direction and the Y direction are used as two control amounts, and in which a mutual interaction exists between the two control inputs fmx and fmy and the two control amounts Px and Py. Then, as plant models, there are used a continuous-time system model indicative of the relationship between the control input fmx and the control amount Px, and a continuous-time system model indicative of the relationship between the control input fmy and the control amount Py.

The control inputs fmx and fmy are determined with the sliding mode control algorithm such that the control amounts Px and Py are caused to converge to two target values, respectively, and are at the same time determined with the non-interacting control algorithm such that the mutual interaction existing between the two control inputs fmx and fmy and the two control amounts Px and Py is eliminated. More specifically, the control inputs fmx and fmy are determined with the sliding mode non-interacting control algorithm such that the control amounts Px and Py are caused to converge to the two target values, respectively, while eliminating the mutual interaction existing between the two control inputs fmx and fmy and the two control amounts Px and Py, whereby the polishing robot is controlled.

In the above conventional control system, since the continuous-time system models are used as the plant models, it is difficult to directly identify model parameters of the plant models directly from experimental data of the plant. For this reason, it is necessary, as a specific identification method, to approximately transform the continuous-time system models to discrete-time system models and identify the model parameters based on the discrete-time system models. Such approximate transform degrades the accuracy of identification of the model parameters. Furthermore, it is required to approximately transform the discrete-time system models to the continuous-time system models again, which increases modeling errors in the plant models. Consequently, to ensure a large margin of the stability of the control, it is necessary to reduce the controller gains, resulting in further degraded controllability and control accuracy.

Furthermore, when the continuous-time system models are employed, differential values of the control amounts are used as variables constituting switching functions, and when the control period is short, such differential values fail to indicate the rates of change in the control amounts, and are placed in a state close to noise components. As a result, the robustness as the advantageous feature of the sliding mode control is lost, which further degrades the controllability and the control accuracy.

Further, conventionally, a control system for an internal combustion engine is known which is described in Patent Literature 2. This control system controls an intake air amount, and is comprised of an air flow sensor for detecting the flow rate of air flowing through an intake passage of the engine, a crank angle sensor for detecting rotation of a crankshaft, an accelerator pedal opening sensor for detecting opening of an accelerator pedal (hereinafter referred to as "the accelerator pedal opening"), and a controller to which are inputted detection signals from these sensors. The controller calculates an engine speed based on the detection signal from the crank angle sensor, and the intake air amount based on the detection signal from the air flow sensor. Further, the engine is provided with a throttle valve mechanism and a variable valve lift mechanism as mechanisms for changing the intake air amount. The throttle valve mechanism changes the opening of a throttle valve disposed in the intake passage (hereinafter referred to as "the throttle valve opening"), as desired, to thereby change the intake air amount. Further, the variable valve lift mechanism changes the lift of intake valves (hereinafter referred to as "the valve lift") as desired, to thereby change the intake air amount.

In the control system, the controller controls the intake air amount in the following manner: First, it is determined based on the engine speed, the accelerator pedal opening, and the intake air amount, in what operating load region the engine is. Then, when it is determined that the engine is in a low-load region, the valve lift is controlled to a predetermined low lift by the variable valve lift mechanism, and the throttle valve opening is controlled to a value corresponding to the engine speed and the accelerator pedal opening, by the throttle valve mechanism. On the other hand, when it is determined that the engine is in medium-load and high-load regions, that is, when the engine is in a normal operating load region, the throttle valve is held in a fully-open state, and the valve lift is controlled to a value corresponding to the engine speed and the accelerator pedal opening.

Generally, in the engine, during operation thereof, intake pipe pressure very negatively pressurized is sometimes demanded by a master vac and an evaporative fuel processing system. In such a case, to ensure the negative pressure, it is necessary to control the throttle valve opening to a considerably small value (value on a closed side). For example, in the master vac, negative pressure stored therein is used as a power source of an assisting force for making up for a braking force, and therefore when the amount of the stored negative pressure becomes small, that is, when pressure rises, to avoid a state where the assisting force cannot be properly ensured, it is required to control the throttle valve opening to a considerably small value so as to introduce intake pipe pressure made very negative from the intake pipe.

Further, in the evaporative fuel processing system, evaporative fuel temporarily stored in a canister is released from the canister and introduced into the intake pipe by the negative pressure in the intake pipe, so that e.g. when a large amount of evaporative fuel has been generated, to change the intake pipe pressure to a very negative value, it is required to control the throttle valve opening to a considerably small value.

In the conventional control system, however, when the engine is in the normal operating load region, the intake air amount is controlled by changing the valve lift in a state where the throttle valve is held in the fully-open state. Therefore, in the above state of control of the intake air amount, if the throttle valve opening is controlled to a considerably small value so as to change the intake pipe pressure to a very negative value, the intake air amount varies due to the influence of the control of the throttle valve opening, which makes it impossible to properly control the intake air amount to the target value. Inversely, if the intake air amount is controlled, the intake pipe pressure varies due to the influence of the control of the intake air amount, which makes it impossible to properly control the intake pipe pressure to the target value.

More specifically, the above control system is configured as an interacting system in which a mutual interaction exists between the throttle valve opening and the valve lift as control inputs, and the intake pipe pressure and the intake air amount as control amounts. If the valve lift is changed, both the intake air amount and the intake pressure vary due to the influence of the change in the valve lift, and if the throttle valve opening is changed, both the intake pipe pressure and the intake air amount vary due to the influence of the change in the throttle valve.

The present invention has been made to provide a solution to the above-described problems, and a first object thereof is to provide a control system for a plant, which is capable of enhancing controllability and control accuracy when controlling a plurality of control amounts while eliminating a mutual interaction existing between a plurality of control inputs and the control amounts.

A second object of the present invention is to provide a control system for an internal combustion engine, which is capable of enhancing controllability and control accuracy when a mutual interaction exists between a plurality of control inputs and a plurality of control amounts of the engine.

[Patent Literature 1] Japanese Laid-Open Patent Publication (Kokai) No. H10-301602

[Patent Literature 2] Japanese Laid-Open Patent Publication (Kokai) No. 2003-254100

DISCLOSURE OF THE INVENTION

To attain the above first object, the invention as claimed in claim 1 provides a control system for a plant in which a mutual interaction exists between a plurality of control inputs and a plurality of control amounts, comprising target value-setting means for setting a plurality of target values that are targets of the respective control amounts, and non-interacting input-calculating means for calculating the control inputs as respective non-interacting inputs for causing the control amounts to follow the respective target values, the non-interacting inputs eliminating the mutual interaction, with a predetermined control algorithm based on a plant model formed by modeling the plant into a discrete-time system model, the predetermined control algorithm including a combination of a predetermined response-specifying control algorithm and a predetermined non-interacting control algorithm.

According to this control system, the control inputs are calculated as non-interacting inputs for causing the control amounts to follow the target values, the non-interacting inputs eliminating the mutual interaction, with a predetermined control algorithm formed based on a plant model formed by modeling a plant into a discrete-time system model, the predetermined control algorithm including a combination of a predetermined response-specifying control algorithm and a predetermined non-interacting control algorithm. Therefore, it is possible to cause the control amounts to accurately follow the target values, respectively, while eliminating the mutual interaction between the control inputs and the control amounts. Further, since the discrete-time system model is used in calculation of the non-interacting inputs, modeling errors can be reduced compared with the conventional control system employing the continuous-time system model, whereby it is possible to ensure a large margin of the stability of control while setting the controller gains to higher values. Furthermore, since the discrete-time system model is used, differently from the conventional control system employing the continuous-time system model, there is no need to employ differential values of the control amounts as variables forming switching functions, whereby even when the control period is short, it is possible to ensure robustness, which is the advantageous feature of the response-specifying control algorithm, such as a sliding mode control algorithm. As described above, the controllability and the control accuracy can be improved.

The invention as claimed in claim 2 is a control system as claimed in claim 1, characterized in that the plant model includes a plurality of non-interacting parameters for defining relationships between the control inputs and the control amounts, and the non-interacting input-calculating means calculates the respective non-interacting inputs with the predetermined control algorithm according to at least one of the non-interacting parameters and the control amounts, the control system further comprising identification means for sequentially identifying the non-interacting parameters according to at least one of the non-interacting inputs, the control amounts, and an internal variable of the plant.

According to this control system, the plant model includes a plurality of non-interacting parameters for defining relationships between the control inputs and the control amounts; the non-interacting inputs are calculated with the predetermined control algorithm according to at least one of the non-interacting parameters and the control amounts; and the non-interacting parameters are sequentially identified according to at least one of the non-interacting inputs, the control amounts, and the internal variable of the plant. As described above, since the non-interacting parameters which can cause direct modeling errors of the plant are sequentially identified, it is possible to calculate the non-interacting inputs, while compensating for modeling errors quickly and properly. As a result, in a plant in which the degree of the mutual interaction between the control inputs and the control amounts is considerably large, even when modeling errors are caused by aging and variations between individual component parts, it is possible to compensate for the modeling errors quickly and properly, thereby making it possible to ensure excellent controllability and control accuracy.

The invention as claimed in claim 3 is a control system as claimed in claim 2, characterized in that the identification means calculates reference values of the non-interacting parameters according to at least one of the non-interacting inputs, the control amounts, and the internal variable of the plant, calculates a plurality of correction values with a predetermined sequential identification algorithm according to at least one of the non-interacting inputs, the control amounts, and the internal variable of the plant, and identifies the non-interacting parameters by correcting the reference values of the non-interacting parameters by the correction values, respectively.

Generally, in a plant in which a mutual interaction exists between a plurality of control inputs and a plurality of control amounts, there are complicated relationships of mutual interaction between the control inputs and the control amounts. Therefore, when the non-interacting parameters are sequentially identified as in the control system as claimed in claim 2, the above tendency becomes more marked immediately after the start of identification in a state where modeling errors are large, so that there is a fear of erroneous identification of the non-interacting parameters. In contrast, according to this control system, the reference values of the non-interacting parameters are calculated according to at least one of the non-interacting inputs, the control amounts, and the internal variable of the plant; a plurality of correction values are calculated with a predetermined sequential identification algorithm according to at least one of the non-interacting inputs, the control amounts, and the internal variable of the plant; and the non-interacting parameters are identified by correcting the reference values of the non-interacting parameters by the correction values, respectively. Accordingly, the non-interacting parameters are identified as values close to the reference values immediately after the start of the identification, thereby making it possible to avoid erroneous identification to enhance accuracy of the identification. Further, for example, when predetermined forgetting effects are added to correction terms, the non-interacting parameters are identified in a state bound to the vicinity of the reference values, and hence it is possible to prevent the non-interacting parameters from being identified as a wrong combination of values (that is, to prevent drifts of the non-interacting parameters), thereby making it possible to ensure the stability of the control system, and enhance the accuracy of the identification.

To attain the above first object, the invention as claimed in claim 4 provides a control system for a plant in which a mutual interaction exists between a plurality of control inputs and a plurality of control amounts, comprising target value-setting means for setting a plurality of target values that are targets of the respective control amounts, and non-interacting input-calculating means for calculating the control inputs as respective non-interacting inputs for causing the control amounts to follow the respective target values, the non-interacting inputs eliminating the mutual interaction, with a predetermined control algorithm based on a plant model formed by modeling the plant, the predetermined control algorithm including a combination of a predetermined two-degree-of-freedom control algorithm and a predetermined non-interacting control algorithm, wherein the predetermined two-degree-of-freedom control algorithm is an algorithm formed by combing a predetermined target value filter algorithm and a predetermined feedback control algorithm.

According to this control system, the control inputs are calculated as non-interacting inputs for causing the control amounts to follow the target values, the non-interacting inputs eliminating the mutual interaction, with a predetermined control algorithm formed based on a plant model formed by modeling a plant, the predetermined control algorithm including a combination of a predetermined two-degree-of-freedom control algorithm and a predetermined non-interacting control algorithm. Since the predetermined two-degree-of-freedom control, algorithm is a combination of a predetermined target value filter algorithm and a predetermined feedback control algorithm, the non-interacting inputs can be calculated with the predetermined feedback control algorithm as values which are capable of enhancing a disturbance-suppressing capability and suppressing degradation of controllability due to modeling errors, and at the same time with the predetermined target value filter algorithm as values which are capable of moderating responsiveness of the control amounts to the target values. This makes it possible to calculate the non-interacting inputs as values small in the amount of change and the rate of change while ensuring their high disturbance-suppressing capabilities. As a result, even when differences occur between the control amounts and the target values due to errors of the non-interacting control algorithm, it is possible to hold the amounts and the rates of changes in the non-interacting inputs at small values, and properly suppress increases in the differences by the high disturbance-suppressing capabilities of the non-interacting inputs. Thus, it is possible to cause the control amounts to accurately follow the target values, respectively, while eliminating the mutual interaction between the control inputs and the control amounts, thereby making it possible to enhance controllability and control accuracy.

The invention as claimed in claim 5 is a control system as claimed in claim 4, characterized in that the predetermined feedback control algorithm is a predetermined response-specifying control algorithm.

According to this control system, a plurality of input values are calculated with a two-degree-of-freedom control algorithm as a combination of a predetermined target value filter algorithm and a predetermined response-specifying control algorithm, and hence compared with the case where there is employed a two-degree-of-freedom control algorithm as a combination of a general feedback control algorithm and a general target value filter algorithm, it is possible to make more moderate the behavior of differences between the control amounts and the target values, and further enhance the disturbance-suppressing capabilities. This makes it possible to further enhance the capability of suppressing the differences between the control amounts and the target values.

The invention as claimed in claim 6 is a control system as claimed in claim 4, characterized in that the plant model includes a plurality of non-interacting parameters for defining relationships between the control inputs and the control amounts, and the non-interacting input-calculating means calculates the respective non-interacting inputs with the predetermined control algorithm according to at least one of the non-interacting parameters and the control amounts, the control system further comprising identification means for sequentially identifying the non-interacting parameters according to at least one of the non-interacting inputs, the control amounts, and an internal variable of the plant.

According to this control system, the plant model includes a plurality of non-interacting parameters for defining relationships between the control inputs and the control amounts; the non-interacting inputs are calculated with the predetermined control algorithm according to at least one of the non-interacting parameters and the control amounts; and the non-interacting parameters are sequentially identified according to at least one of the non-interacting inputs, the control amounts, and the internal variable of the plant. As described above, since the non-interacting parameters which can cause direct modeling errors of the plant are sequentially identified, it is possible to calculate the non-interacting inputs, while compensating for modeling errors quickly and properly. As a result, in a plant in which the degree of the mutual interaction between the control inputs and the control amounts is considerably large, even when modeling errors are caused by aging and variations between individual component parts, it is possible to compensate for the modeling errors quickly and properly, thereby making it possible to ensure excellent controllability and control accuracy.

The invention as claimed in claim 7 is a control system as claimed in claim 6, characterized in that the identification means calculates reference values of the non-interacting parameters according to at least one of the non-interacting inputs, the control amounts, and the internal variable of the plant, calculates a plurality of correction values with a predetermined sequential identification algorithm according to at least one of the non-interacting inputs, the control amounts, and the internal variable of the plant, and identifies the non-interacting parameters by correcting the reference values of the non-interacting parameters by the correction values, respectively.

Generally, in a plant in which a mutual interaction exists between a plurality of control inputs and a plurality of control amounts, there are complicated relationships of mutual interaction between the control inputs and the control amounts. Therefore, when the non-interacting parameters are sequentially identified as in the control system as claimed in claim 6, the above tendency becomes more marked immediately after the start of identification in a state where modeling errors are large, so that there is a fear of erroneous identification of the non-interacting parameters. In contrast, according to this control system, the reference values of the non-interacting parameters are calculated according to at least one of the non-interacting inputs, the control amounts, and the internal variable of the plant; a plurality of correction values are calculated with a predetermined sequential identification algorithm according to at least one of the non-interacting inputs, the control amounts, and the internal variable of the plant; and the non-interacting parameters are identified by correcting the reference values of the non-interacting parameters by the correction values, respectively. Accordingly, the non-interacting parameters are identified as values close to the reference values immediately after the start of the identification, thereby making it possible to avoid erroneous identification to enhance accuracy of the identification. Further, for example, when predetermined forgetting effects are added to correction terms, the non-interacting parameters are identified in a state bound to the vicinity of the reference values, and hence it is possible to prevent the non-interacting parameters from being identified as a wrong combination of values (that is, to prevent drifts of the non-interacting parameters), thereby making it possible to ensure the stability of the control system, and enhance the accuracy of the identification.

To attain the above first object, the invention as claimed in claim 8 provides a control system for a plant in which a mutual interaction exists between a plurality of control inputs and a plurality of control amounts, comprising non-interacting input-calculating means for calculating the control inputs as respective non-interacting inputs eliminating the mutual interaction with a predetermined control algorithm based on a plant model formed by modeling the plant, the predetermined control algorithm including a predetermined non-interacting control algorithm, wherein the plant model includes a plurality of non-interacting parameters for defining relationships between the control inputs and the control amounts, wherein the non-interacting input-calculating means calculates the respective non-interacting inputs with the predetermined control algorithm according to at least one of the non-interacting parameters and the control amounts, the control system further comprising identification means for sequentially identifying the non-interacting parameters according to at least one of the non-interacting inputs, the control amounts, and an internal variable of the plant.

According to this control system, the control inputs are calculated as a plurality of non-interacting inputs eliminating the mutual interaction, with a predetermined control algorithm formed based on a plant model formed by modeling a plant and including a predetermined non-interacting control algorithm. The plant model includes a plurality of non-interacting parameters for defining relationships between the control inputs and the control amounts; the non-interacting inputs are calculated with the predetermined control algorithm according to at least one of the non-interacting parameters and the control amounts; and the non-interacting parameters are sequentially identified according to at least one of the non-interacting inputs, the control amounts, and the internal variable of the plant. As described above, since the non-interacting parameters which can cause direct modeling errors of the plant are sequentially identified, it is possible to calculate the non-interacting inputs, while compensating for modeling errors quickly and properly. As a result, in a plant in which the degree of mutual interaction between the control inputs and the control amounts is considerably large, even when modeling errors are caused by aging and variations between individual component parts, it is possible to compensate for the modeling errors quickly and properly, thereby making it possible to ensure excellent controllability and control accuracy.

The invention as claimed in claim 9 is a control system as claimed in claim 8, characterized in that the identification means calculates reference values of the non-interacting parameters according to at least one of the non-interacting inputs, the control amounts, and the internal variable of the plant, calculates a plurality of correction values with a predetermined sequential identification algorithm according to at least one of the non-interacting inputs, the control amounts, and the internal variable of the plant, and identifies the non-interacting parameters by correcting the reference values of the non-interacting parameters by the correction values, respectively.

Generally, in a plant in which a mutual interaction exists between a plurality of control inputs and a plurality of control amounts, there are complicated relationships of mutual interaction between the control inputs and the control amounts. Therefore, when the non-interacting parameters are sequentially identified as in the control system as claimed in claim 8, the above tendency becomes more marked immediately after the start of identification in a state where modeling errors are large, so that there is a fear of erroneous identification of the non-interacting parameters. In contrast, according to this control system, the reference values of the non-interacting parameters are calculated according to at least one of the non-interacting inputs, the control amounts, and the internal variable of the plant; a plurality of correction values are calculated with a predetermined sequential identification algorithm according to at least one of the non-interacting inputs, the control amounts, and the internal variable of the plant; and the non-interacting parameters are identified by correcting the reference values of the non-interacting parameters by the correction values, respectively. Accordingly, the non-interacting parameters are identified as values close to the reference values immediately after the start of the identification, thereby making it possible to avoid erroneous identification to enhance accuracy of the identification. Further, for example, when predetermined forgetting effects are added to correction terms, the non-interacting parameters are identified in a state bound to the vicinity of the reference values, and hence it is possible to prevent the non-interacting parameters from being identified as a wrong combination of values (that is, to prevent drifts of the non-interacting parameters), thereby making it possible to ensure the stability of the control system, and enhance the accuracy of the identification.

To attain the above second object, the invention as claimed in claim 10 provides a control system for an internal combustion engine, for controlling a plurality of control amounts therein by a plurality of control inputs, respectively, in which a mutual interaction exists between the control amounts and the control inputs, comprising target value-setting means for setting a plurality of target values that are targets of the respective control amounts, and non-interacting input-calculating means for calculating the control inputs as respective non-interacting inputs for causing the control amounts to follow the respective target values, the non-interacting inputs eliminating the mutual interaction, with a predetermined control algorithm including a predetermined non-interacting control algorithm.

According to this control system, the control inputs are calculated as a plurality of non-interacting inputs for causing the control amounts to follow up respective target values, the non-interacting inputs eliminating the mutual interaction, with a predetermined control algorithm including a predetermined non-interacting control algorithm. Therefore, it is possible to cause the control amounts to follow the respective target values for the engine, while eliminating the mutual interaction between the control inputs and the control amounts. That is, it is possible to cause the control amounts to follow the respective target values thereof independently of each other, thereby making it possible to enhance the accuracy and the response of the control.

The invention as claimed in claim 11 is a control system as claimed in claim 10, characterized in that the non-interacting input-calculating means calculates the respective non-interacting inputs with the predetermined control algorithm according to at least one of the control amounts and at least one of the control inputs and an operating condition parameter indicative of an operating condition of the engine.

According to this control system, the non-interacting inputs are calculated with the predetermined control algorithm according to at least one of the control amounts, and at least one of the control inputs and an operating condition parameter indicative of an operating condition of the engine. Therefore, when the control amounts have changed, it is possible to calculate the non-interacting inputs such that the mutual interaction is eliminated, while coping with the change in the control amounts. As a result, compared with a method of controlling the control amounts such that the mutual interaction is eliminated by regarding the influence of the mutual interaction as disturbance, it is possible to attain avoidance of the mutual interaction or non-interacting operation, thereby making it possible to further enhance the accuracy and the response of the control.

The invention as claimed in claim 12 is a control system as claimed in claim 11, characterized in that the predetermined non-interacting control algorithm is an algorithm based on a plant model defining relationships between the control amounts and the control inputs, wherein the plant model includes a plurality of non-interacting parameters for defining relationships between the control inputs and the control amounts, wherein the non-interacting input-calculating means calculates the non-interacting inputs with the predetermined control algorithm further according to the non-interacting parameters, respectively, the control system further comprising identification means for sequentially identifying the non-interacting parameters according to at least one of the non-interacting inputs, the control amounts, and the operating condition parameter.

According to this control system, the predetermined non-interacting control algorithm is an algorithm based on a plant model defining the relationships between the control amounts and the control inputs; the plant model includes a plurality of non-interacting parameters for defining relationships between the control inputs and the control amounts; the non-interacting inputs are calculated with the predetermined control algorithm further according to the non-interacting parameters; and the non-interacting parameters are sequentially identified according to at least one of the non-interacting inputs, the control amounts, and the operating condition parameter. As described above, since the non-interacting parameters which can cause direct modeling errors of the plant are sequentially identified, it is possible to calculate the non-interacting inputs, while compensating for modeling errors quickly and properly. As a result, in a plant in which the degree of mutual interaction between the control inputs and the control amounts is considerably large, even when modeling errors are caused by aging and variations between individual component parts, it is possible to compensate for the modeling errors quickly and properly, thereby making it possible to ensure excellent controllability and control accuracy.

The invention as claimed in claim 13 is a control system as claimed in claim 12, characterized in that the identification means calculates reference values of the non-interacting parameters according to at least one of the non-interacting inputs, the control amounts, and the operating condition parameter, calculates a plurality of correction values with a predetermined sequential identification algorithm according to at least one of the non-interacting inputs, the control amounts, and the operating condition parameter, and identifies the non-interacting parameters by correcting the reference values of the non-interacting parameters by the correction values, respectively.

Generally, when a mutual interaction exists between a plurality of control inputs and a plurality of control amounts of an internal combustion engine, there are complicated relationships of mutual interaction between the control inputs and the control amounts. Therefore, when the non-interacting parameters are sequentially identified as in the control system as claimed in claim 12, the above tendency becomes more marked immediately after the start of identification in a state where modeling errors are large, so that there is a fear of erroneous identification of the non-interacting parameters. In contrast, according to this control system, the reference values of the non-interacting parameters are calculated according to at least one of the non-interacting inputs, the control amounts, and the operating condition parameter; a plurality of correction values are calculated with a predetermined sequential identification algorithm according to at least one of the non-interacting inputs, the control amounts, and the operating condition parameter; and the non-interacting parameters are identified by correcting the reference values of the non-interacting parameters by the correction values, respectively. Accordingly, the non-interacting parameters are identified as values close to the reference values immediately after the start of the identification, thereby making it possible to avoid erroneous identification to enhance accuracy of the identification. Further, for example, when predetermined forgetting effects are added to correction terms, the non-interacting parameters are identified in a state bound to the vicinity of the reference values, and hence it is possible to enhance the accuracy of the identification.

The invention as claimed in claim 14 is a control system as claimed in claim 10, characterized in that the engine includes a throttle valve mechanism for changing an opening of a throttle valve, and a variable valve lift mechanism for changing a lift of an intake valve, that the control amounts are pressure in an intake passage of the engine and an amount of intake air, and that the control inputs are an opening control value for controlling the opening of the throttle valve and a lift control value for controlling the lift of the intake valve.

According to this control system, an opening control value for controlling the opening of the throttle valve and a lift control value for controlling the lift of the intake valve are calculated as values eliminating the mutual interaction between the control values, and pressure in an intake passage of the engine and an intake air amount, and hence it is possible to control the pressure in the intake passage and the intake air amount independently of each other while securing high responsiveness. As a result, normally, by suppressing the degree of negative pressurization in the intake passage, it is possible to reduce the pumping loss to thereby improve fuel economy, and when the pressure in the intake passage made more negative is required (e.g. when negative pressure is demanded by a master vac and an evaporative fuel processing system), it is possible to properly secure such pressure in the intake passage.

The invention as claimed in claim 15 is a control system as claimed in claim 14, characterized in that the engine further includes an evaporative fuel processing system for temporarily adsorbing evaporative fuel generated within a fuel chamber and delivering the adsorbed evaporative fuel into the intake passage by the pressure in the intake passage, and the target value-setting means sets a target value of the pressure in the intake passage to a lower value until a predetermined time period has elapsed after a start of the engine than after the predetermined time period has elapsed.

According to this control system, the target value of the pressure in the intake passage is set to a lower value until a predetermined time period has elapsed after the start of the engine than after the predetermined time period has elapsed. Therefore, by setting the pressure in the intake passage to such a target value, evaporative fuel adsorbed by the evaporative fuel processing system during stoppage of the engine can be delivered into the intake passage quickly and effectively. Further, both the opening of the throttle valve and the lift of the intake valve are controlled, and hence compared with the case where the pressure in the intake passage is controlled only by controlling the opening of the throttle valve, it is possible to reduce the pumping loss, thereby making it possible to improve fuel economy.

The invention as claimed in claim 16 is a control system as claimed in claim 14, characterized in that the engine further includes an evaporative fuel processing system for temporarily adsorbing evaporative fuel generated within a fuel chamber, and delivering the adsorbed evaporative fuel into the intake passage by the pressure in the intake passage, and generation rate parameter-detecting means for detecting a generation rate parameter indicative of a rate of generation of evaporative fuel within the fuel chamber of the engine, and the target value-setting means sets a target value of the pressure in the intake passage to a lower value as the rate of generation of evaporative fuel indicated by the detected generation rate parameter is larger.

According to this control system, the target value of the pressure in the intake passage is set to a lower value as the rate of generation of evaporative fuel indicated by the detected generation rate parameter is larger. Therefore, even when the rate of generation of evaporative fuel is large, and a large amount of evaporative fuel has been adsorbed by the evaporative fuel processing system, the evaporative fuel can be delivered into the intake passage quickly and effectively. Further, for the same reason, it is possible to reduce the pumping loss, thereby making it possible to improve fuel economy, compared with the case in which the pressure in the intake passage is held at a constant value that is capable of coping with a state where the rate of generation of evaporative fuel becomes maximum, irrespective of the rate of generation of the evaporative fuel. Further, as a matter of course, when a large amount of evaporative fuel is generated, it is possible to improve fuel economy compared with the case where intake air amount control by control of the lift of the intake valve is stopped to switch the control to intake air amount control by control of the opening of the throttle valve, and the pressure in the intake passage is controlled to be more negative. It should be noted that throughout the specification, "to detect the generation rate parameter" includes not only to directly detect the generation rate parameter by a sensor but also to calculate or estimate the same.

The invention as claimed in claim 17 is a control system as claimed in claim 14, characterized in that the engine is used as a drive source of a vehicle, that an assisting force-generating device for generating an assisting force for making up for a braking force of the vehicle is connected to the intake passage of the engine, as a power source, and that the target value-setting means sets a target value of the pressure in the intake passage to a lower value when conditions for supplying negative pressure to the assisting force-generating device are satisfied than when the conditions are not satisfied.

According to this control system, since the target value of the pressure in the intake passage is set to a lower value when conditions for supplying negative pressure to the assisting force-generating device are satisfied than when they are not satisfied, it is possible to properly set the degree of negative pressurization in the intake passage according to whether or not the negative pressure is required to be supplied to the assisting force-generating device. As a result, it is possible to attain securing of the assisting force and reduction of the pumping loss by avoiding generation of unnecessary negative pressure, in a compatible manner.

The invention as claimed in claim 18 is a control system as claimed in claim 17, characterized in that the target value-setting means sets the target value of the pressure in the intake passage to a lower value as a speed of the vehicle is higher, when the conditions for supplying negative pressure to the assisting force-generating device are satisfied.

According to this control system, the target value of the pressure in the intake passage is set to a lower value as the speed of the vehicle is higher, when the conditions for supplying negative pressure to the assisting force-generating device are satisfied. This makes it possible to properly secure the assisting force for making up for the braking force according to the varying speed of the vehicle.

The invention as claimed in claim 19 is a control system as claimed in claim 11, characterized in that the engine includes a throttle valve mechanism for changing an opening of a throttle valve, and a variable valve lift mechanism for changing a lift of an intake valve, that the control amounts are pressure in an intake passage of the engine and an amount of intake air, that the control inputs are an opening control value for controlling the opening of the throttle valve and a lift control value for controlling the lift of the intake valve, that the operating condition parameter is rotational speed of the engine, and that the non-interacting input-calculating means calculates the non-interacting inputs according to the rotational speed of the engine, and at least one of the control amounts and the control inputs.

According to this control system, the non-interacting inputs are calculated according to at least one of the rotational speed of the engine, the control amounts, and the control inputs. In this case, since the control amounts are pressure in the intake passage of the engine and the intake air amount, and the control inputs are the opening control value for controlling the opening of the throttle valve and the lift control value for controlling the lift of the intake valve, the relationship of the mutual interaction between the control amounts and the control inputs varies with the rotational speed of the engine, and the rotational speed of the engine varies over a wide range during operation thereof, and accordingly the degree of change in the mutual interaction also increases. Therefore, by calculating the non-interacting inputs according to the rotational speed of the engine, it is possible to calculate the non-interacting inputs as appropriate values dependent on the degree of change in the mutual interaction in accordance with the change in the rotational speed of the engine, thereby making it possible to properly eliminate the mutual interaction. This makes it possible to further enhance the accuracy and the response of the control.

The invention as claimed in claim 20 is a control system as claimed in claim 10, characterized in that the engine includes an EGR device for changing an EGR amount, and a supercharger for changing boost pressure, that the control amounts are the EGR amount and the boost pressure, and that the control inputs are an EGR control value for controlling the EGR amount by the EGR device and a boost pressure control value for controlling the boost pressure by the supercharger.

According to this control system, the control amounts are the EGR amount and the boost pressure, and the control inputs are an EGR control value for controlling the EGR amount by the EGR device and a boost pressure control value for controlling the boost pressure by the supercharger. This makes it possible to cause the EGR amount and the boost pressure to properly follow target values thereof, respectively. That is, EGR control an object of which is to ensure excellent fuel economy and reduce exhaust emissions, and boost pressure control an object of which is to ensure a driving force can be performed with high control accuracy and high controllability, whereby it is possible not only to ensure excellent fuel economy and reduce exhaust emissions but also to ensure excellent drivability.

The invention as claimed in claim 21 is a control system as claimed in claim 11, characterized in that the engine includes a turbocharger system for changing boost pressure, that one of the control amounts is the boost pressure, that one of the control inputs is a boost pressure control value for controlling the boost pressure by the turbocharger system, that the operating condition parameter is pressure in an exhaust passage of the engine, and that the non-interacting input-calculating means calculates the boost pressure control value as one of the non-interacting inputs according to the pressure in the exhaust passage of the engine, and at least one of the control amounts and the control inputs.

According to this control system, one of the control amounts is the boost pressure; one of the control inputs is a boost pressure control value for controlling the boost pressure by the turbocharger system; the operating condition parameter is pressure in an exhaust passage of the engine; and the boost pressure control value is calculated as one of the non-interacting inputs according to at least one of the pressure in the exhaust passage of the engine, the control amounts, and the control inputs. Generally, when the boost pressure is controlled by the turbocharger system, there is a relationship between the pressure in the exhaust passage of the engine and the control characteristics of the boost pressure that when the pressure in the exhaust passage of the engine has changed, the control characteristics of the boost pressure also dramatically change. Therefore, there is a fear that if the control of the boost pressure is carried out independently of the pressure in the exhaust passage, it becomes impossible not only to properly control the boost pressure but also to eliminate the mutual interaction between the control inputs and the control amounts. In contrast, according to the control system, since the boost pressure control value as one of the non-interacting inputs is calculated according to the pressure in the exhaust passage of the engine, it is possible to properly control the boost pressure, while eliminating the mutual interaction. As a result, it is possible to further enhance the accuracy and the response of the control.

The invention as claimed in claim 22 is a control system as claimed in claim 11, characterized in that the engine includes a supercharger for changing boost pressure, and a variable valve timing mechanism for changing valve timing of an intake valve, that one of the control amounts is the boost pressure, that one of the control inputs is a boost pressure control value for controlling the boost pressure by the supercharger, that the operating condition parameter is valve timing of the intake valve, and that the non-interacting input-calculating means calculates the boost pressure control value as one of the non-interacting inputs according to the valve timing of the intake valve, and at least one of the control amounts, and the control inputs.

According to this control system, one of the control amounts is the boost pressure; one of the control inputs is a boost pressure control value for controlling the boost pressure by the supercharger; the operating condition parameter is valve timing of the intake valve; and the boost pressure control value is calculated as one of the non-interacting inputs according to at least one of the valve timing of the intake valve, the control amounts, and the control inputs. Generally, when the boost pressure is controlled by the supercharger, there is a relationship between the valve timing of the intake valve and the control characteristics of the boost pressure that when the valve timing of the intake valves has changed, the control characteristics of the boost pressure also change. Therefore, there is a fear that if the control of the boost pressure is carried out independently of the valve timing of the intake valve, it becomes impossible not only to properly control the boost pressure but also to eliminate the mutual interaction between the control inputs and the control amounts. In contrast, according to the control system, it is possible to properly control the boost pressure, while eliminating the mutual interaction, since the boost pressure control value as one of the non-interacting inputs is calculated according to the valve timing of the intake valve. As a result, it is possible to further enhance the accuracy and the response of the control.

BRIEF DESCRIPTION OF THE DRAWINGS

FIG. 5(*a*) is a diagram showing a lift actuator in a state in which a short arm thereof is in abutment with a maximum lift stopper, and FIG. 5(*b*) is a diagram showing the lift actuator in a state in which the short arm thereof is in abutment with a minimum lift stopper;

BEST MODE FOR CARRYING OUT THE INVENTION

Figure 2:
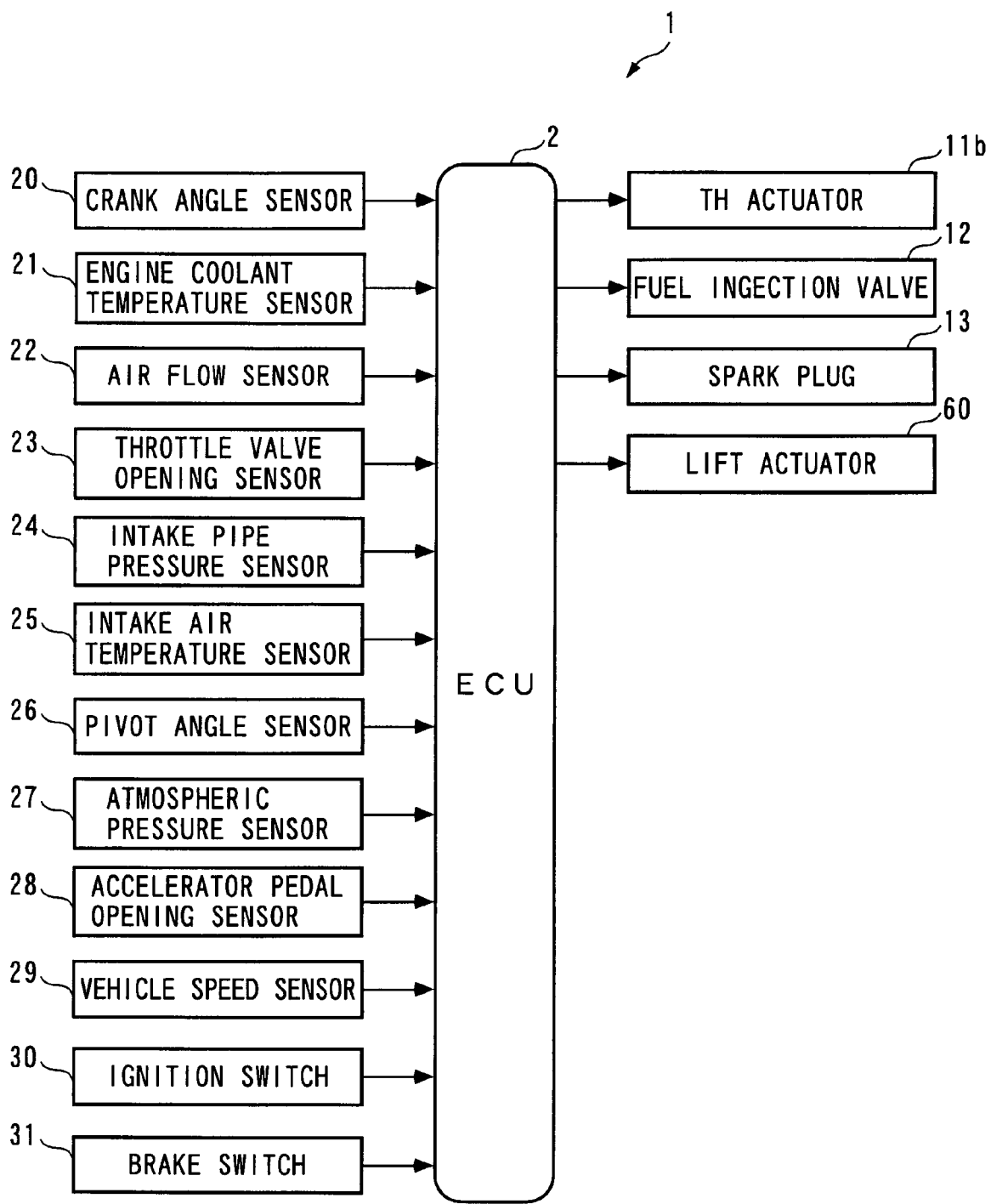
FIG. 2 is a block diagram schematically showing the configuration of the control system.

Hereafter, a control system according to a first embodiment of the present invention will be described with reference to drawings. The control system 1 includes an ECU 2, as shown in FIG. 2. As described hereinafter, the ECU 2 carries out control processes, such as a variable mechanism control process, depending on operating conditions of an internal combustion engine (hereinafter simply referred to as "the engine") 3.

Figure 1:
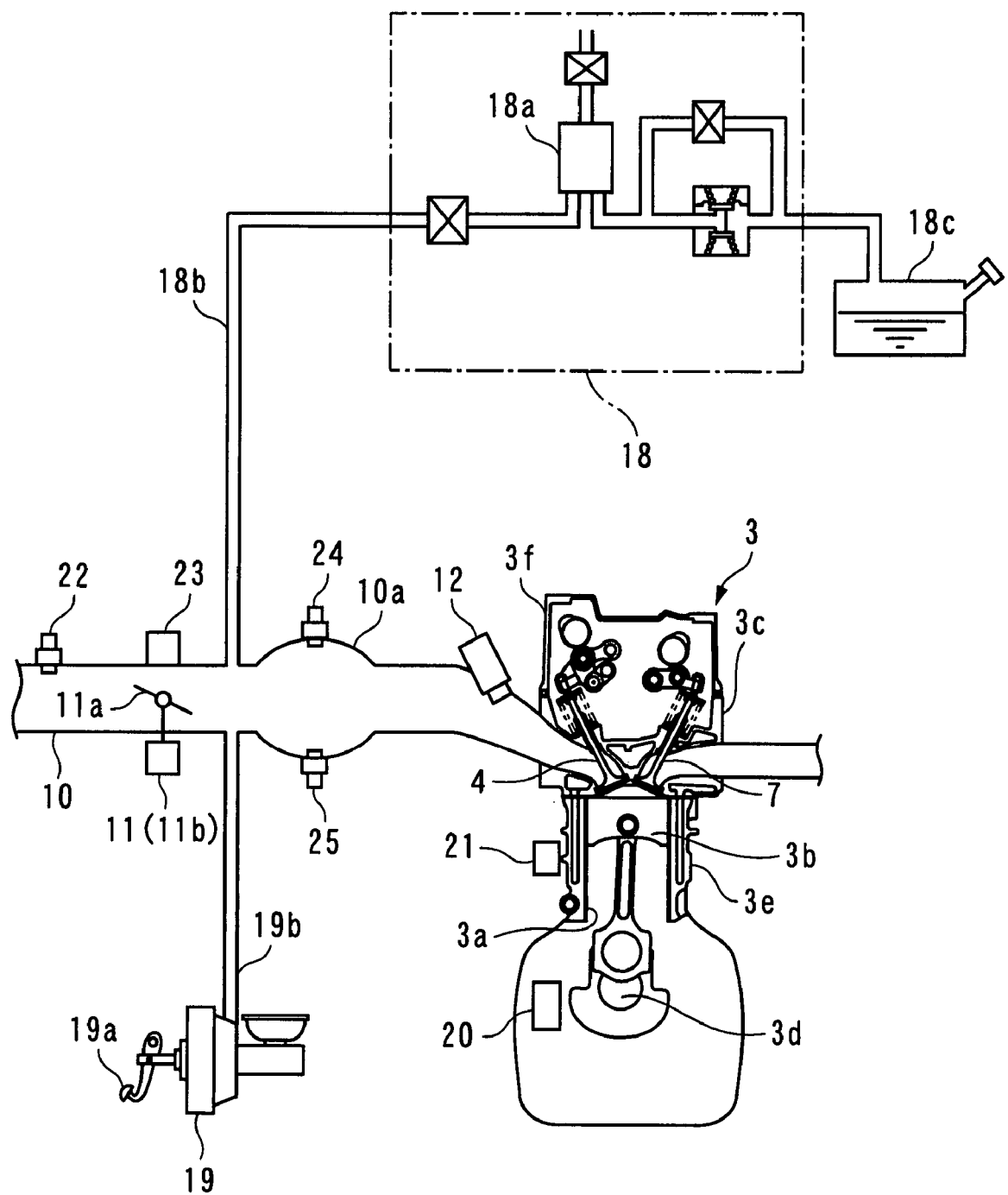
FIG. 1 is a diagram schematically showing the arrangement of an internal combustion engine to which is applied a control system according to a first embodiment of the present invention.
Figure 3:
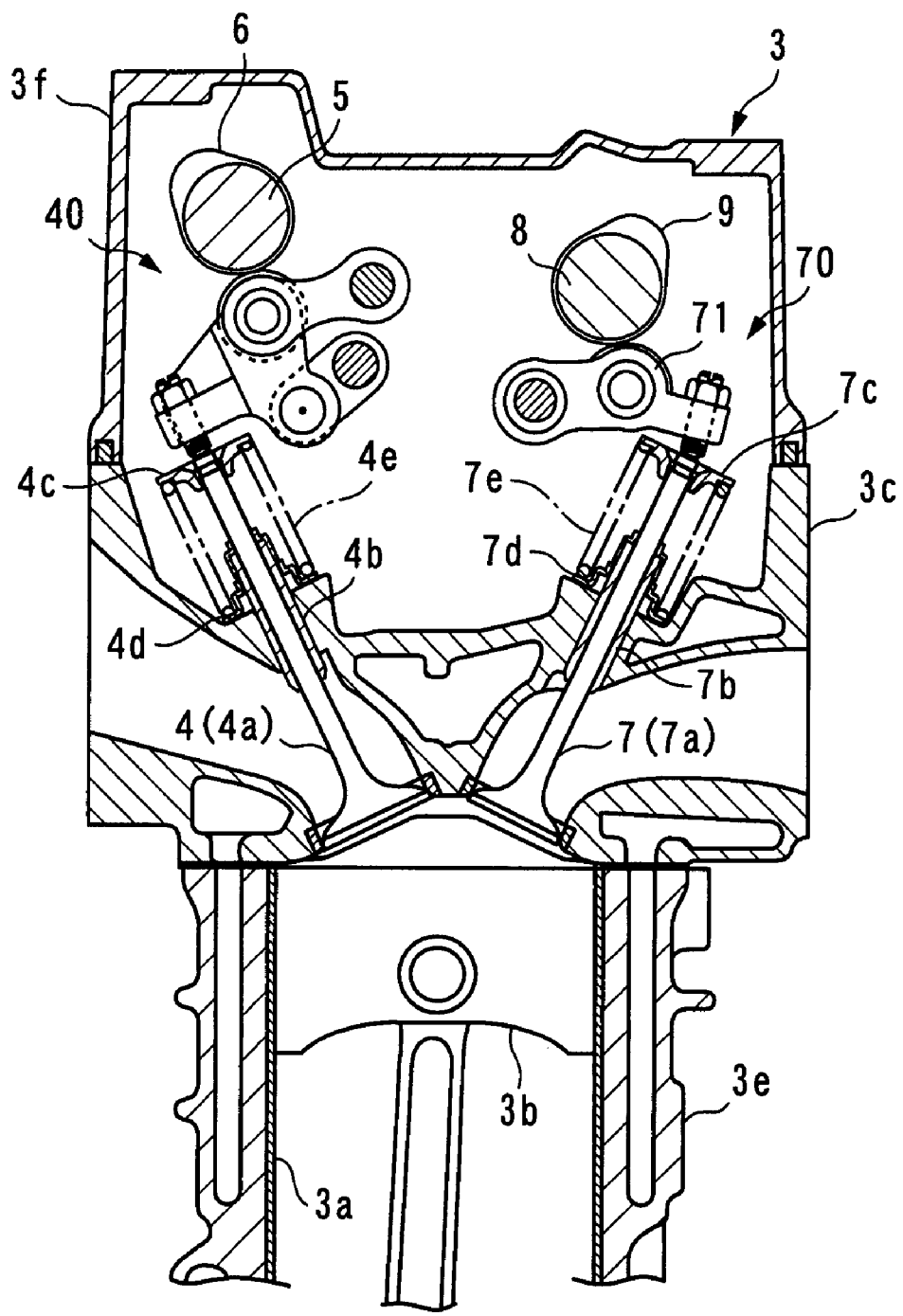
FIG. 3 is a cross-sectional view schematically showing the arrangement of a variable intake valve-actuating mechanism and an exhaust valve-actuating mechanism of the engine.

Referring to FIGS. 1 and 3, the engine 3 is an in-line four-cylinder gasoline engine having four pairs of cylinders 3a and pistons 3b (only one pair of which is shown), and installed on a vehicle, not shown. The engine 3 includes an intake valve 4 and an exhaust valve 7 provided for each cylinder 3a, for opening and closing an intake port and an exhaust port thereof, respectively, an intake camshaft 5 and intake cams 6 that actuate the intake valves 4, a variable intake valve-actuating mechanism 40 that actuates the intake valves 4 to open and close the same, an exhaust camshaft 8 and exhaust cams 9 that actuate the exhaust valves 7, an exhaust valve-actuating mechanism 70 that actuates the exhaust valves 7 to open and close the same, and so forth.

Figure 4:
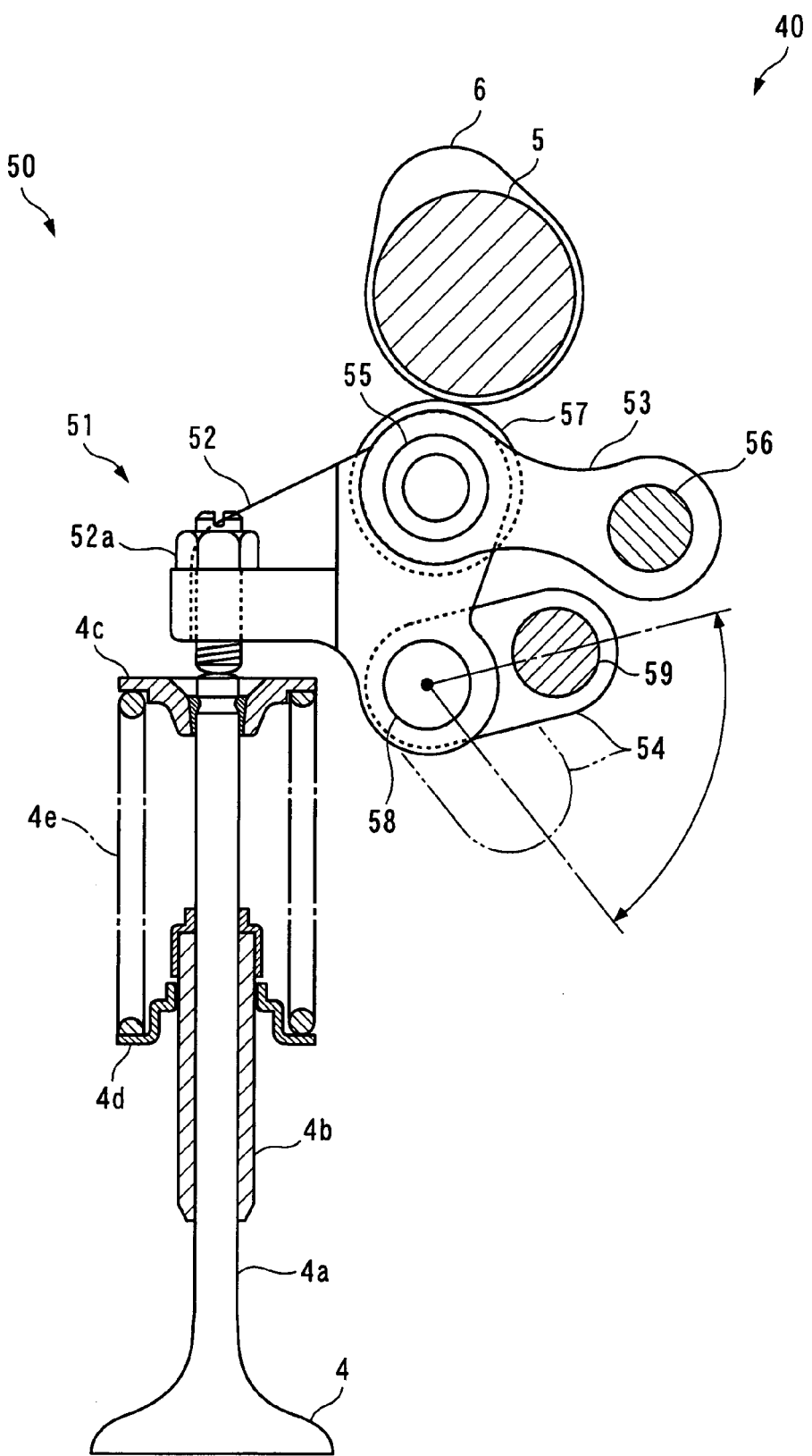
FIG. 4 is a cross-sectional view schematically showing the construction of a variable valve lift mechanism of the variable intake valve-actuating mechanism.

The intake valve 4 has a stem 4a thereof slidably fitted in a guide 4b. The guide 4b is rigidly fixed to a cylinder head 3c. Further, as shown in FIG. 4, the intake valve 4 includes upper and lower spring sheets 4c and 4d, and a valve spring 4e disposed therebetween, and is urged by the valve spring 4e in the valve-closing direction.

Further, the intake camshaft 5 and the exhaust camshaft 8 are rotatably mounted through the cylinder head 3c via holders, not shown. The intake camshaft 5 has an intake sprocket (not shown) coaxially fixed to one end thereof, and is connected to a crankshaft 3d by the intake sprocket and a timing belt (not shown), whereby the intake camshaft 5 performs one rotation per two rotations of the crankshaft 3d. Further, the intake cam 6 is provided on the intake camshaft 5 for each cylinder 3a such that the intake cam 6 rotates in unison with the intake camshaft 5.

Furthermore, the variable intake valve-actuating mechanism 40 is provided for actuating the intake valve 4 of each cylinder 3a so as to open and close the same, in accordance with rotation of the intake camshaft 5, and continuously changing the lift of the intake valve 4 to thereby change an intake air amount, as will be described in detail hereinafter. It should be noted that in the present embodiment, "the lift of the intake valve 4 (hereinafter referred to as "the valve lift")" is assumed to represent the maximum lift of the intake valve 4.

On the other hand, the exhaust valve 7 has a stem 7a thereof slidably fitted in a guide 7b. The guide 7b is rigidly fixed to the cylinder head 3c. Further, the exhaust valve 7 includes upper and lower spring sheets 7c and 7d, and a valve spring 7e disposed therebetween, and is urged by the valve spring 7e in the valve-closing direction.

Further, the exhaust camshaft 8 has an exhaust sprocket (not shown) integrally formed therewith, and is connected to the crankshaft 3d by the exhaust sprocket and a timing belt, not shown, whereby the exhaust camshaft 8 performs one rotation per two rotations of the crankshaft 3d. Further, the exhaust cam 9 is disposed on the exhaust camshaft 8 for each cylinder 3a such that the exhaust cam 9 rotates in unison with the exhaust camshaft 8.

Furthermore, the exhaust valve-actuating mechanism 70 includes rocker arms 71. Each rocker arm 71 is pivotally moved in accordance with rotation of the associated exhaust cam 9 to thereby actuate the exhaust valve 7 for opening and closing the same against the urging force of the valve spring 7e.

Further, the engine 3 is provided with a crank angle sensor 20 and an engine coolant temperature sensor 21. The crank angle sensor 20 delivers a CRK signal and a TDC signal, which are both pulse signals, to the ECU 2 in accordance with rotation of the crankshaft 3d. Each pulse of the CRK signal is generated whenever the crankshaft 3d rotates through a predetermined angle (e.g. 10 degrees). The ECU 2 determines the rotational speed NE of the engine 3 (hereinafter referred to as "the engine speed NE") based on the CRK signal. Further, the TDC signal indicates that each piston 3b in the associated cylinder 3a is in a predetermined crank angle position slightly before the TDC position at the start of the intake stroke, and each pulse of the TDC signal is generated whenever the crankshaft 3d rotates through a predetermined crank angle.

On the other hand, the engine coolant temperature sensor 21 is implemented e.g. by a thermistor mounted in a cylinder block 3e of the engine 3, and detects an engine coolant temperature TW which is the temperature of an engine coolant circulating through the cylinder block 3e, to deliver a signal indicative of the sensed engine coolant temperature TW to the ECU 2.

Further, in an intake pipe 10 of the engine 3, there are arranged an air flow sensor 22, a throttle valve mechanism 11, a throttle valve opening sensor 23, an intake pipe pressure sensor 24, a fuel injection valve 12 and so forth, from upstream to downstream in the mentioned order at respective locations of the intake pipe 10. The air flow sensor 22 is formed by a hot-wire air flow meter, and detects the flow rate Qin of air flowing through the intake pipe 10 (hereinafter referred to as "the air flow rate Qin") to deliver a signal indicative of the sensed air flow rate Qin to the ECU 2. The ECU 2 determines, based on the air flow rate Qin, the intake air amount Gcyl estimated to be actually sucked into the cylinders 3a, as described hereinafter.

The throttle valve mechanism 11 includes a throttle valve 11a, and a TH actuator 11b that actuates the throttle valve 11a to open and close the same. The throttle valve 11a is pivotally disposed across an intermediate portion of the intake pipe 10 such that the degree of opening thereof is changed by the pivotal motion thereof to thereby change the intake air amount. The TH actuator 11b is implemented by a combination of a motor, not shown, connected to the ECU 2, and a gear mechanism, not shown, and driven by an opening control input Uth from the ECU 2 to thereby change the degree of opening of the throttle valve 11a.

Further, the throttle valve 11a has two springs (neither of which is shown) mounted thereto for urging the throttle valve 11a in the valve-opening direction and, the valve-closing direction, respectively. When the opening control input Uth is set to a value of 0, or when the opening control input Uth is not inputted to the TH actuator 11b, the throttle valve 11a is held at a predetermined initial degree of opening thereof by the urging forces of the above two springs, as described hereinafter. The initial degree is set to a value (e.g. 6°) which corresponds to an almost fully-closed state, but at the same time can ensure the amount of intake air large enough to suitably carry out idling or starting of the engine 3 during stoppage of the vehicle, and at the same time hold the vehicle in a state of low-speed traveling when the vehicle is traveling.

Furthermore, in the vicinity of the throttle valve 11a in the intake pipe 10, there is provided a throttle valve opening sensor 23 implemented e.g. by a potentiometer. The throttle valve opening sensor 23 detects the degree TH of opening of the throttle valve 11a (hereinafter referred to as "the throttle valve opening TH") and delivers a signal indicative of the sensed throttle valve opening TH to the ECU 2.

On the other hand, a portion of the intake pipe 10 downstream of the throttle valve 11a forms a surge tank 10a into which are inserted the intake pipe pressure sensor 24 and an intake air temperature sensor 25.

The intake pipe pressure sensor 24 is implemented e.g. by a semiconductor pressure sensor, and detects pressure PB within the intake pipe 10 (hereinafter referred to as "the intake pipe pressure PB"), to deliver a signal indicative of the sensed intake pipe pressure PB to the ECU 2. It should be noted that the intake pipe pressure PB is detected as absolute pressure. Further, the intake air temperature sensor 25 detects the temperature TA of air flowing through the intake pipe 10 (hereinafter referred to as "the intake air temperature TA"), and deliver a signal indicative of the intake air temperature TA to the ECU 2. It should be noted that in the present embodiment, the intake pipe pressure PB corresponds to pressure within an intake passage, the intake air temperature sensor 25 to generation rate parameter-detecting means, and the intake air temperature TA to a generation rate parameter.

The fuel injection valve 12 is driven by a drive signal indicative of a fuel injection amount, supplied from the ECU 2, and injects fuel into the intake pipe 10.

Spark plugs 13 (see FIG. 2) are mounted through the cylinder head 3c of the engine 3. Each spark plug 13 is connected to the ECU 2 via an ignition coil, not shown. When a drive signal (voltage signal) from the ECU 2 is applied in timing corresponding to ignition timing, the spark plug 13 causes a spark discharge, thereby burning a mixture in a combustion chamber.

Further, the engine 3 is provided with an evaporative fuel processing system 18. The evaporative fuel processing system 18 is provided for preventing evaporative fuel generated in a fuel tank 18c (fuel chamber) from being released into the atmosphere, and includes a canister 18a for temporarily adsorbing fuel components of the evaporative fuel, and a negative pressure-introducing pipe 18b for connecting between the canister 18a and the intake pipe 10. In the evaporative fuel processing system 18, the fuel components of the evaporative fuel, after being temporarily adsorbed by the canister 18a, are desorbed from the canister 18a by negative pressure within the intake pipe 10, introduced into the intake pipe 10 though the introducing pipe 18b, and sucked into the combustion chamber together with air.

Furthermore, the engine 3 is provided with a master vac 19 (assisting force-generating device). The master vac 19 is connected to the intake pipe 10 via a negative pressure-introducing pipe 19b. The negative pressure within the intake pipe 10 is introduced into a negative pressure chamber (not shown) in the master vac 19 via the introducing pipe 19b, and stored therein. When a brake pedal 19a is stepped on, the master vac 19 generates an assisting force for assisting a braking force using the negative pressure stored in the negative pressure chamber as a power source. The assisting force is configured to have a larger value as the negative pressure stored in the negative pressure chamber is larger, that is, as pressure in the negative pressure chamber is lower.

Next, a description will be given of the aforementioned variable intake valve-actuating mechanism 40. As shown in FIG. 4, the variable intake valve-actuating mechanism 40 is comprised of the intake camshaft 5, the intake cams 6, and a variable valve lift mechanism 50.

The variable valve lift mechanism 50 is provided for actuating the intake valves 4 to open and close the same, in accordance with rotation of the intake camshaft 5, and continuously changing the valve lift Liftin between a predetermined maximum value Liftin_H and a predetermined minimum value Liftin_L. The variable valve lift mechanism 50 is comprised of rocker arm mechanisms 51 of a four joint link type, provided for the respective cylinders 3a, and a lift actuator 60 (see FIGS. 5(a) and 5(b)) simultaneously actuating these rocker arm mechanisms 51.

Each rocker arm mechanism 51 is comprised of a rocker arm 52, and upper and lower links 53 and 54. The upper link 53 has one end thereof pivotally mounted to an upper end of the rocker arm 52 by an upper pin 55, and the other end thereof pivotally mounted to a rocker arm shaft 56. The rocker arm shaft 56 is mounted through the cylinder head 3c via holders, not shown.

Further, a roller 57 is pivotally disposed on the upper pin 55 of the rocker arm 52. The roller 57 is in contact with a cam surface of the intake cam 6. As the intake cam 6 rotates, the roller 57 rolls on the intake cam 6 while being guided by the cam surface of the intake cam 6. As a result, the rocker arm 52 is vertically driven, and the upper link 53 is pivotally moved about the rocker arm shaft 56.

Furthermore, an adjusting bolt 52a is mounted to an end of the rocker arm 52 toward the intake valve 4. When the rocker arm 52 is vertically moved in accordance with rotation of the intake cam 6, the adjusting bolt 52a vertically drives the stem 4a to open and close the intake valve 4, against the urging force of the valve spring 4e.

Further, the lower link 54 has one end thereof pivotally mounted to a lower end of the rocker arm 52 by a lower pin 58, and the other end of the lower link 54 has a connection shaft 59 pivotally mounted thereto. The lower link 54 is connected to a short arm 65, described hereinafter, of the lift actuator 60 by the connection shaft 59.

On the other hand, as shown in FIGS. 5(a) and 5(b), the lift actuator 60 is comprised of an electric motor 61, a nut 62, a link 63, a long arm 64, and the short arm 65. The electric motor 61 is connected to the ECU 2, and disposed outside a head cover 3f of the engine 3. The rotating shaft of the electric motor 61 is a screw shaft 61a formed with a male screw and the nut 62 is screwed onto the screw shaft 61a. The nut 62 is connected to the long arm 64 by the link 63. The link 63 has one end thereof pivotally mounted to the nut 62 by a pin 63a, and the other end thereof pivotally mounted to one end of the long arm 64 by a pin 63b.

Further, the other end of the long arm 64 is attached to one end of the short arm 65 by a pivot shaft 66. The pivot shaft 66 is circular in cross section, and extends through the head cover 3f of the engine 3 such that it is pivotally supported by the head cover 3f. The long arm 64 and the short arm 65 are pivotally moved in unison with the pivot shaft 66 in accordance with pivotal motion of the pivot shaft 66.

Furthermore, the aforementioned connection shaft 59 pivotally extends through the other end of the short arm 65, whereby the short arm 65 is connected to the lower link 54 by the connection shaft 59. A minimum lift stopper 67a and a maximum lift stopper 67b are arranged in the vicinity of the short arm 65 with a space therebetween, and the range of pivotal motion of the short arm 65 is restricted by the two stoppers 67a and 67b, as described hereinafter.

Next, a description will be given of the operation of the variable valve lift mechanism 50 configured as above. In the variable valve lift mechanism 50, when a lift control input Uliftin, described hereinafter, is inputted from the ECU 2 to the lift actuator 60, the screw shaft 61a rotates, and the nut 62 is moved in accordance with the rotation of the screw shaft 61a, whereby the long arm 64 and the short arm 65 are pivotally moved about the pivot shaft 66, and in accordance with the pivotal motion of the short arm 65, the lower link 54 of the rocker arm mechanism 51 is pivotally moved about the lower pin 58. That is, the lower link 54 is driven by the lift actuator 60.

As shown in FIG. 5(a), when the short arm 65 is pivotally moved counterclockwise, as viewed therein, the short arm 65 is brought into abutment with the maximum lift stopper 67b, and stopped thereat, whereby the lower link 54 as well is stopped at a maximum lift position indicated by a solid line in FIG. 4. On the other hand, as shown in FIG. 5(b), when the short arm 65 is pivotally moved clockwise, as viewed therein, the short arm 65 is brought into abutment with the minimum lift stopper 67a, and stopped thereat. As a result, the lower link 54 as well is stopped at a minimum lift position indicated by a two-dot chain line in FIG. 4.

As described above, the range of the pivotal motion of the short arm 65 is restricted by the stoppers 67a and 67b between a maximum lift position shown in FIG. 5(a) and a minimum lift position shown in FIG. 5(b), whereby the range of pivotal motion of the lower link 54 is also restricted between the maximum lift position indicated by the solid line in FIG. 4 and the minimum lift position indicated by the two-dot chain line in FIG. 4.

Figure 6:
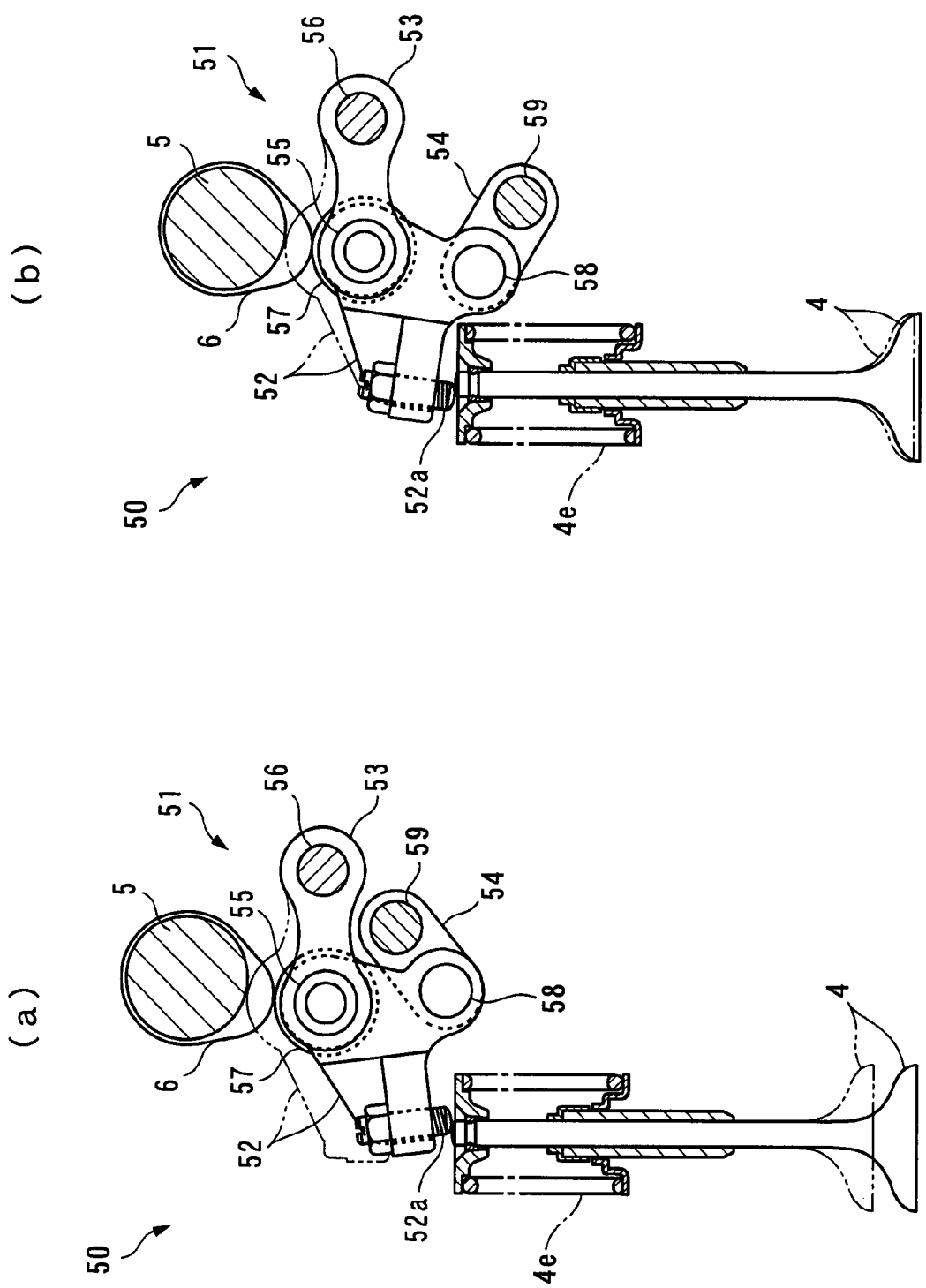
FIG. 6(*a*) is a diagram showing an intake valve placed in an open state when a lower link of the variable valve lift mechanism is in a maximum lift position, and FIG. 6(*b*) is a diagram showing the intake valve placed in an open state when the lower link of the variable valve lift mechanism is in a minimum lift position.

The four joint link formed by the rocker arm shaft 56, the upper and lower pins 55 and 58, and the connection shaft 59 is configured such that when the lower link 54 is in the maximum lift position, the distance between the center of the upper pin 55 and the center of the lower pin 58 becomes longer than the distance between the center of the rocker arm shaft 56 and the center of the connection shaft 59, whereby as shown in FIG. 6(*a*), when the intake cam 6 rotates, the amount of movement of the adjusting bolt 52*a* becomes larger than the amount of movement of a contact point where the intake cam 6 and the roller 57 are in contact with each other.

On the other hand, the four joint link is configured such that when the lower link 54 is in the minimum lift position, the distance between the center of the upper pin 55 and the center of the lower pin 58 becomes shorter than the distance between the center of the rocker arm shaft 56 and the center of the connection shaft 59, whereby as shown in FIG. 6(*b*), when the intake cam 6 rotates, the amount of movement of the adjusting bolt 52*a* becomes smaller than the amount of movement of the contact point where the intake cam 6 and the roller 57 are in contact with each other.

Figure 7:
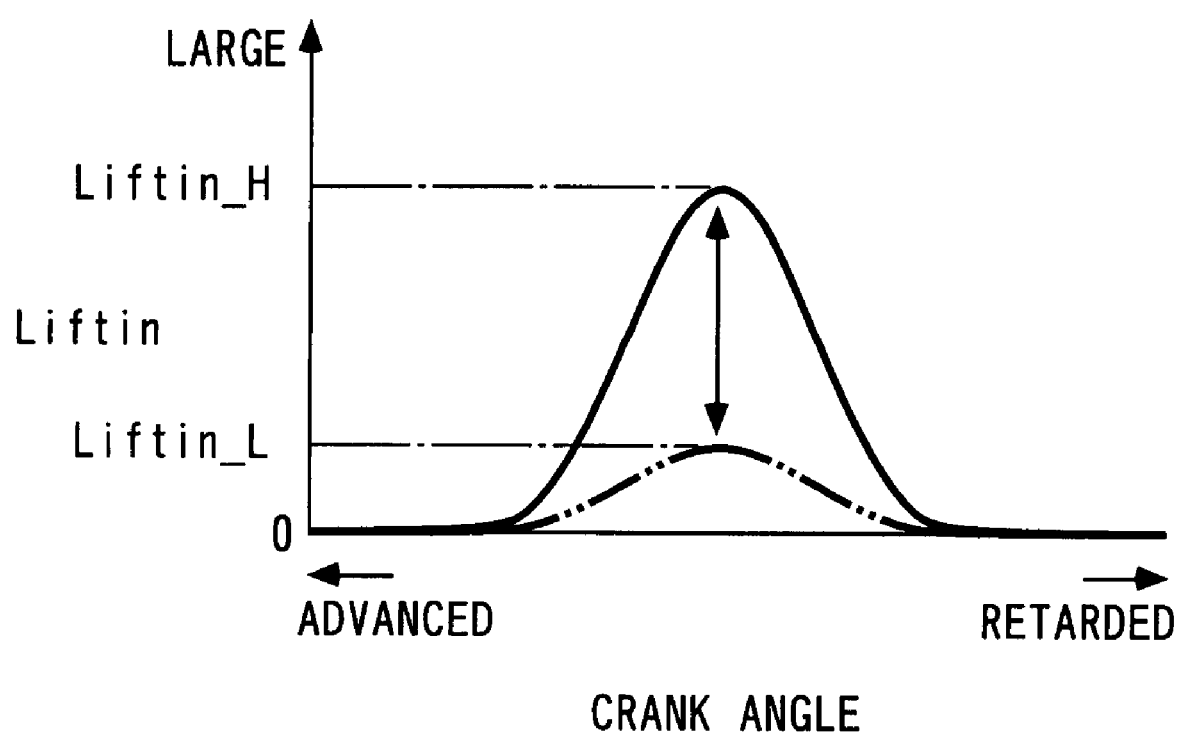
FIG. 7 is a diagram showing a valve lift curve (solid line) which the valve lift of the intake valve assumes when the lower link of the variable valve lift mechanism is in the maximum lift position, and a valve lift curve (two-dot chain line) which the valve lift of the intake valve assumes when the lower link of the variable valve lift mechanism is in the minimum lift position.

For the above reason, when the lower link 54 is in the maximum lift position, the intake valve 4 is opened with a larger valve lift Liftin than when the lower link 54 is in the minimum lift position. More specifically, during rotation of the intake cam 6, when the lower link 54 is in the maximum lift position, the intake valve 4 is opened according to a valve lift curve indicated by a solid line in FIG. 7, and the valve lift Liftin assumes its maximum value Liftin_H. On the other hand, when the lower link 54 is in the minimum lift position, the intake valve 4 is opened according to a valve lift curve indicated by a two-dot chain line in FIG. 7, and the valve lift Liftin assumes its minimum value Liftin_L.

As described hereinabove, in the variable valve lift mechanism 50, the lower link 54 is pivotally moved by the lift actuator 60 between the maximum lift position and the minimum lift position, whereby it is possible to continuously change the valve lift Liftin between the maximum value Liftin_H and the minimum value Liftin_L.

It should be noted that the variable valve lift mechanism 50 is provided with a lock mechanism, not shown, which locks the operation of the variable valve lift mechanism 50, as described hereinafter, when the lift control input ULiftin is set to a value of 0, or when the lift control input ULiftin is not inputted from the ECU 2 to the lift actuator 60 e.g. due to a disconnection. More specifically, the variable valve lift mechanism 50 is inhibited from changing the valve lift Liftin, whereby the valve lift Liftin is held at the minimum value Liftin_L. It should be noted that the minimum value Liftin_L is set to a value which is capable of ensuring a predetermined failure time value as the intake air amount. The predetermined failure time value is set to a value which is capable of suitably carrying out idling or starting of the engine 3 during stoppage of the vehicle, and at the same time holding a low-speed traveling state of the vehicle during traveling of the vehicle.

Further, the engine 3 is provided with a pivot angle sensor 26 (see FIG. 2). The pivot angle sensor 26 detects a pivot angle of the short arm 65, and delivers a signal indicative of the sensed pivot angle to the ECU 2. The ECU 2 calculates the valve lift Liftin based on the pivot angle of the short arm 65.

Furthermore, as shown in FIG. 2, connected to the ECU 2 are an atmospheric pressure sensor 27, an accelerator pedal opening sensor 28, a vehicle speed sensor 29, an ignition switch (hereinafter referred to as "the IG•SW") 30, and a brake switch 31.

The atmospheric pressure sensor 27 is implemented by a semiconductor pressure sensor, and detects atmospheric pressure PA to deliver a signal indicative of the sensed atmospheric pressure PA to the ECU 2. The accelerator pedal opening sensor 28 detects a stepped-on amount AP of an accelerator pedal, not shown, of the vehicle (hereinafter referred to as "the accelerator pedal opening AP"), and delivers a signal indicative of the sensed accelerator pedal opening AP to the ECU 2.

Further, the vehicle speed sensor 29 is attached to an axle, not shown, of the vehicle, and detects a vehicle speed VP, which is a traveling speed of the vehicle, to deliver a signal indicative of the sensed vehicle speed VP to the ECU 2. Furthermore, the IG•SW 30 is turned on or off by the operation of an ignition key, not shown, and delivers a signal indicative of the ON/OFF state thereof to the ECU 2. Further, the brake switch 31 is disposed in the vicinity of the brake pedal 19*a*. When the brake pedal 19*a* is stepped on by an amount equal to or larger than a predetermined amount, the brake switch 31 delivers an ON signal, and otherwise it delivers an OFF signal.

The ECU 2 is implemented by a microcomputer comprised of a CPU, a RAM, a ROM, and an I/O interface (none of which are shown). The ECU 2 determines operating conditions of the engine 3 based on the detection signals from the above-mentioned sensors 20 to 29 and the ON/OFF signals from the above-mentioned switches 30 and 31, and executes the variable mechanism control process. In the variable mechanism control process, as described hereinafter, the throttle valve opening TH and the valve lift Liftin are controlled by the throttle valve mechanism 11 and the variable valve lift mechanism 50, respectively, whereby the intake pipe pressure PB and the intake air amount Gcyl are controlled, respectively.

It should be noted that in the present embodiment, the ECU 2 corresponds to target value-setting means, non-interacting input-calculating means, and identification means.

Figure 8:
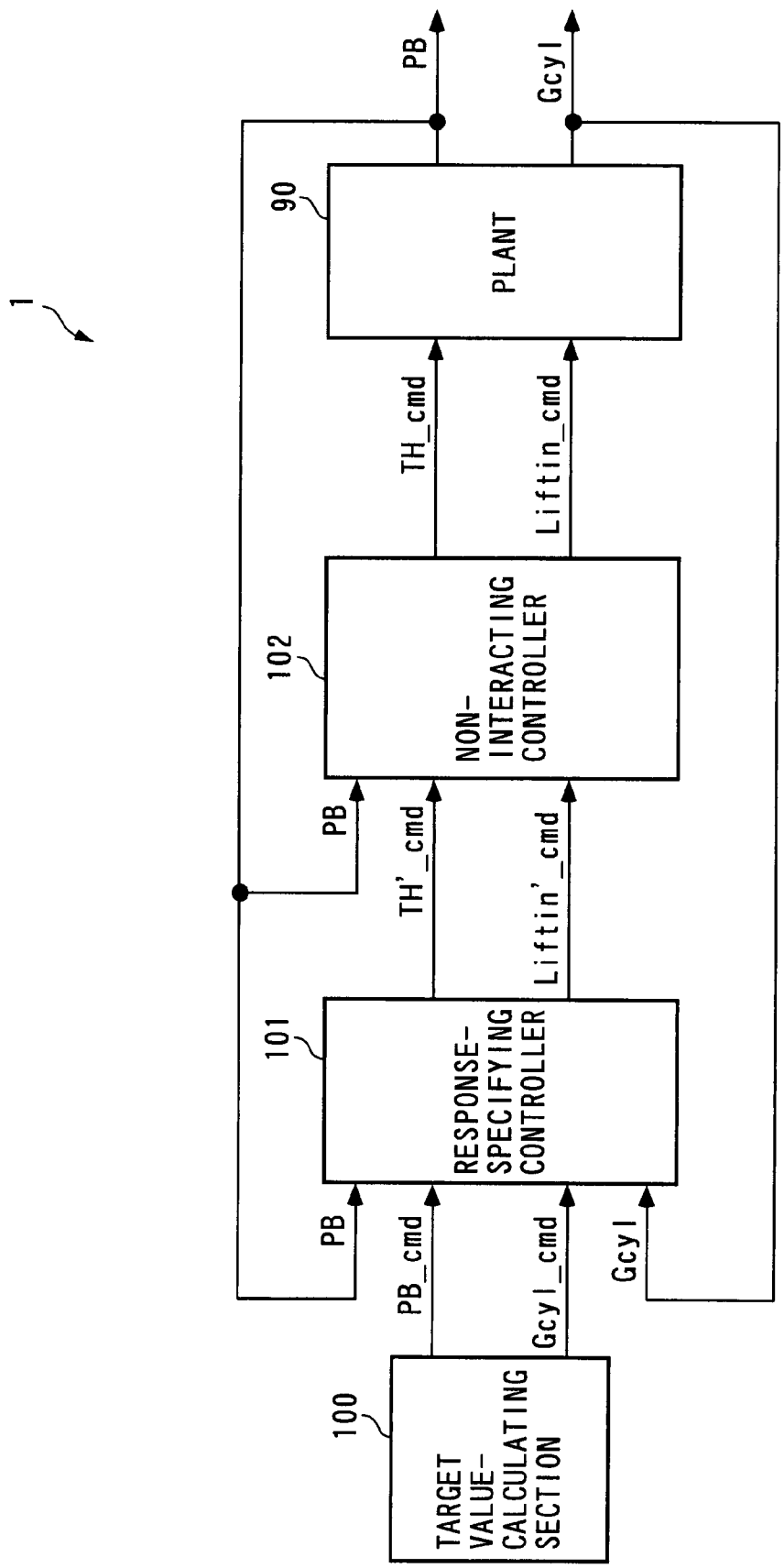
FIG. 8 is a functional block diagram schematically showing the configuration of the control system.

Next, a description will be given of the control system 1 according to the present embodiment. Referring to FIG. 8, the control system 1 is provided for controlling a plant 90, and comprised of a target value-calculating section 100, a response-specifying controller 101, and a non-interacting controller 102. It should be noted that the calculating section 100 and the controllers 101 and 102 are all implemented by the ECU 2.

Figure 9:
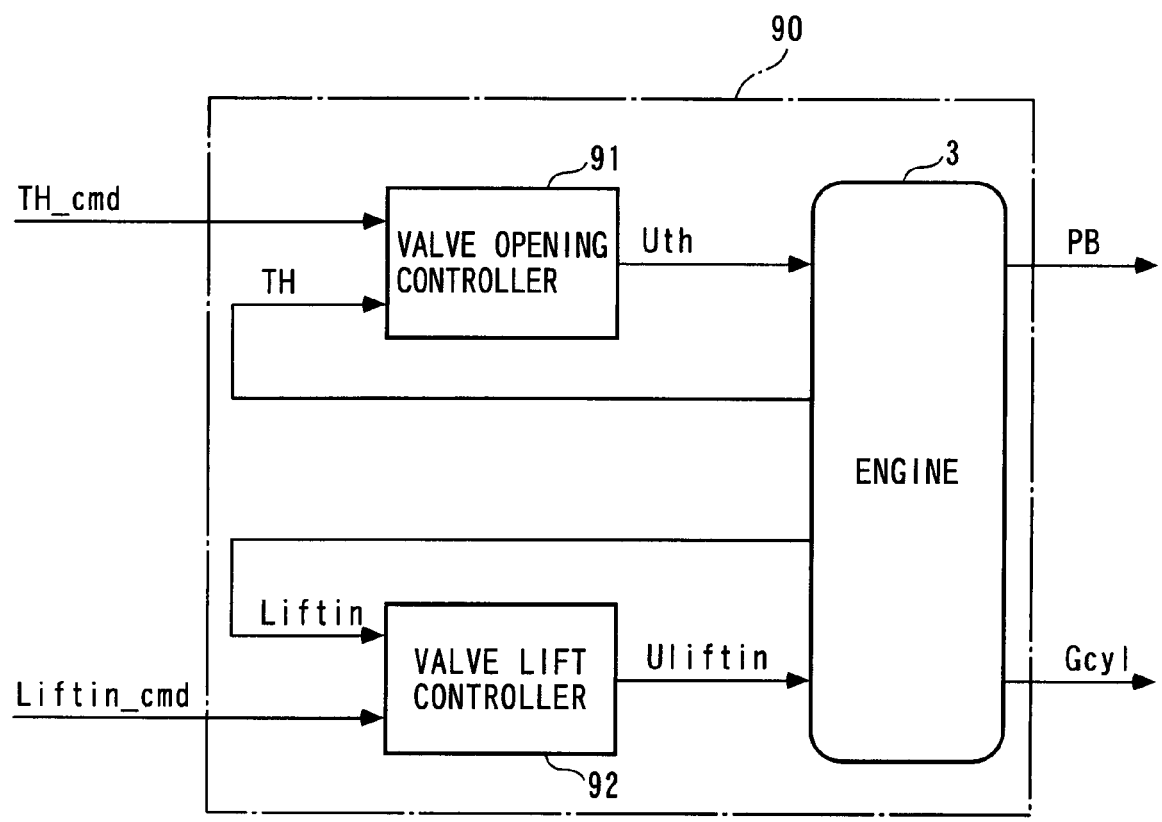
FIG. 9 is a block diagram useful in explaining a plant.

As shown in FIG. 9, the plant 90 is defined as an interacting system to which a target throttle valve opening TH_cmd and a target valve lift Liftin_cmd are inputted as control inputs, and in which the intake pipe pressure PB and the intake air amount Gcyl are used as control amounts, and specifically, is comprised of a valve opening controller 91, a valve lift controller 92, and the engine 3. It should be noted that the controllers 91 and 92 are both implemented by the ECU 2.

The target throttle valve opening TH_cmd and the target valve lift Liftin_cmd are target values of the valve lift Liftin and the throttle valve opening TH, and calculated as described hereinafter.

Further, in the valve opening controller 91, the opening control input Uth is calculated with a target value filter-type two-degree-of-freedom response-specifying control algorithm [equations (29) to (32) described hereinafter], and inputted to the throttle valve mechanism 11, whereby the throttle valve opening TH is controlled such that it follows the target throttle valve opening TH_cmd.

Furthermore, in the valve lift controller 92, the lift control input ULiftin is calculated with a target value filter-type two-degree-of-freedom response-specifying control algorithm [equations (33) to (36) described hereinafter], and inputted to the variable valve lift mechanism 50, whereby the valve lift Liftin is controlled such that it follows the target valve lift Liftin_cmd.

In the plant 90 configured as above, when the throttle valve opening TH is controlled such that it follows the target throttle valve opening TH_cmd, both the intake pipe pressure PB and the intake air amount Gcyl accordingly change. Still further, when the valve lift Liftin is controlled such that it follows the target valve lift Liftin_cmd, both the intake pipe pressure PB and the intake air amount Gcyl accordingly change. That is, the plant 90 is configured as an interacting system in which a mutual interaction exists between the target throttle valve opening TH_cmd and the target valve lift Liftin_cmd as control inputs, and the intake pipe pressure PB and the intake air amount Gcyl as control amounts.

Therefore, in the control system 1 according to the present embodiment, the plant 90 of the interacting system configured as above calculates the target throttle valve opening TH_cmd and the target valve lift Liftin_cmd as control inputs or non-interacting inputs which are capable of controlling both the intake pipe pressure PB and the intake air amount Gcyl independently of each other, while avoiding the above-mentioned mutual interaction.

More specifically, first, the target value-calculating section 100 (target value-setting means) calculates a target intake air amount Gcyl_cmd and a target intake pipe pressure PB_cmd as the target values of the intake pipe pressure PB and the intake air amount Gcyl, respectively, each by searching either a table or a map, as described hereinafter.

Then, the response-specifying controller 101 (non-interacting input-calculating means) calculates a follow-up input vector W defined by the following equation (1):

$$W(k) = \begin{bmatrix} TH'\_cmd(k) \\ Liftin'\_cmd(k) \end{bmatrix} \quad (1)$$

In the above equation (1), TH'_cmd represents a follow-up input for causing the intake pipe pressure PB to follow the target intake pipe pressure PB_cmd, and Liftin'_cmd represents a follow-up input for causing the intake air amount Gcyl to follow the target intake air amount Gcyl_cmd. Further, discrete data with a symbol (k) indicates that it is data sampled or calculated in synchronism with a predetermined control period ΔT (e.g. 10 msec in the present embodiment). The symbol k indicates a position in the sequence of sampling cycles of respective discrete data. For example, the symbol k indicates that discrete data therewith is a value sampled in the current control timing, and a symbol k−1 indicates that discrete data therewith is a value sampled in the immediately preceding control timing. This applies to the following discrete data. It should be noted that in the following description, the symbol k and the like provided for the discrete data are omitted as deemed appropriate.

More specifically, the above follow-up input vector W is calculated with a response-specifying control algorithm expressed by equations (2) to (8).

$$W(k) = Weq(k) + Wrch(k) + Wadp(k) \quad (2)$$

$$Weq(k) = \begin{bmatrix} (1-Sp) \cdot PB(k) + Sp \cdot PB(k-1) + \\ PB\_cmd(k) + (Sp-1) \cdot PB\_cmd(k-1) - Sp \cdot PB\_cmd(k-2) \\ (1-Sg) \cdot Gcyl(k) + Sg \cdot Gcyl(k-1) + \\ Gcyl\_cmd(k) + (Sg-1) \cdot Gcyl\_cmd(k-1) - Sg \cdot Gcyl\_cmd(k-2) \end{bmatrix} \quad (3)$$

$$Wrch(k) = \begin{bmatrix} -Krch\_p \cdot \sigma p(k) \\ -Krch\_g \cdot \sigma g(k) \end{bmatrix} \quad (4)$$

$$Wadp(k) = \begin{bmatrix} -Kadp\_p \cdot \sum_{i=0}^{k} \sigma p(i) \\ -Kadp\_g \cdot \sum_{i=0}^{k} \sigma g(i) \end{bmatrix} \quad (5)$$

$$\sigma(k) = \begin{bmatrix} \sigma p(k) \\ \sigma g(k) \end{bmatrix} \quad (6)$$

$$= \begin{bmatrix} Ep'(k) + Sp \cdot Ep'(k-1) \\ Eg'(k) + Sg \cdot Eg'(k-1) \end{bmatrix}$$

$$= E'(k) + S \cdot E'(k-1)$$

$$S = \begin{bmatrix} Sp & 0 \\ 0 & Sg \end{bmatrix} \quad (7)$$

$$E'(k) = \begin{bmatrix} Ep'(k) \\ Eg'(k) \end{bmatrix} \quad (8)$$

$$= \begin{bmatrix} PB(k) - PB\_cmd(k-1) \\ Gcyl(k) - Gcyl\_cmd(k-1) \end{bmatrix}$$

As expressed by the above equation (2), the follow-up input vector W is calculated as the sum of an equivalent control input vector Weq, a reaching law input vector Wrch, and an adaptive law input vector Wadp. The equivalent control input vector Weq is calculated by the above-described equation (3). In the equation (3), Sp and Sg represent switching function-setting parameters, respectively, and are set such that −1<Sp<0 and −1<Sg<0 hold.

Further, the reaching law input vector Wrch in the equation (2) is calculated by the aforementioned equation (4). In the equation (4), Krch_p and Krch_g represent predetermined reaching law gains. Further, σp and σg represent switching functions, and a switching function vector σ including the switching functions σp and σg as elements is calculated by the aforementioned equation (6). In the equation (6), S represents a matrix defined by the above equation (7), and E' represents a difference vector defined by the above-described equation (8).

Furthermore, the adaptive law input vector Wadp in the equation (2) is calculated by the aforementioned equation (5). In the equation (5), Kadp_p and Kadp_g represent predetermined adaptive law gains.

Further, the non-interacting controller 102 (non-interacting input-calculating means) calculates a non-interacting input vector U with a non-interacting control algorithm expressed by the following equation (9) using the follow-up input vector W calculated by the response-specifying controller 101, that is, using the two follow-up inputs TH'_cmd and Liftin'_cmd. The non-interacting input vector U is defined by the following equation (10).

$$U(k) = \begin{bmatrix} \frac{1}{Rt \cdot Fth(k)} \{-PB(k) + Rt \cdot Flf(k-1) \cdot Liftin\_cmd(k-1) + TH'\_cmd(k)\} \\ \frac{1}{Flf(k)} Liftin'\_cmd(k) \end{bmatrix} \quad (9)$$

$$U(k) = \begin{bmatrix} TH\_cmd(k) \\ Liftin\_cmd(k) \end{bmatrix} \quad (10)$$

In the above equation (9), Fth represents a non-interacting interacting parameter, and as described hereinafter, is the value of a nonlinear function calculated according to the intake pipe pressure PB and the atmospheric pressure PA. Further, Flf as well is a non-interacting parameter, and as described hereinafter, is the value of a nonlinear function calculated according to the intake pipe pressure PB and the engine speed NE. Furthermore, Rt represents a coefficient defined as described hereinafter. It should be noted that in the present embodiment, the atmospheric pressure PA and the engine speed NE correspond to an internal variable of the plant.

As described above, the control system 1 calculates the non-interacting input vector U (i.e. the non-interacting input target throttle valve opening TH_cmd and the non-interacting input target valve lift Liftin_cmd) with a control algorithm expressed by the aforementioned equations (2) to (9), that is, a control algorithm in which the response-specifying control algorithm and the non-interacting control algorithm are combined. The control algorithm expressed by the equations (2) to (9) is derived as described hereafter.

First, equations for calculating the intake air amount Gcyl to be sucked into the engine 3 are defined by the following equations (11) to (13).

$$Gcyl(k) = Gth(k) - Qin(k) Rt' \cdot \{PB(k) - PB(k-1)\} \quad (11)$$

$$Gth(k) = \frac{Gth\_Qin(k)}{2 \cdot NE(k)} \quad (12)$$

$$Rt' = \frac{Vb \cdot 60}{R \cdot TA(k) \cdot 2 \cdot NE(k)} \quad (13)$$

In the equation (11), Gth represents a TH passing intake air amount estimated to flow through the throttle valve 11a, and is calculated by the equation (12). Further, in the equation (11), Rt' represents a coefficient calculated by the equation (13). In the equation (13), Vb and R represent the volume of the inside of the intake pipe, and a predetermined gas constant, respectively.

When the above equation (11) is shifted toward the future side by an amount corresponding to one discrete time period and modified, the following equation (14) is obtained. It should be noted that in the equation (14), Rt represents a coefficient defined by the following equation (15).

$$PB(k+1) = PB(k) + \frac{1}{Rt'} Gth(k+1) - \frac{1}{Rt'} Gcyl(k+1)$$
$$= PB(k) + Rt \cdot Gth(k+1) - Rt \cdot Gcyl(k+1) \quad (14)$$

$$Rt = \frac{1}{Rt'} \quad (15)$$

On the other hand, relationships expressed by the following equations (16) and (17) hold between Gth and TH_cmd and between Gcyl and Liftin_cmd, respectively.

$$Gth(k+1) = Fth(k) \cdot TH\_cmd(k) \quad (16)$$

$$Gcyl(k+1) = Flf(k) \cdot Liftin\_cmd(k) \quad (17)$$

When the right sides of the above equations (16) and (17) are substituted for Gth and Gcyl of the equation (14), respectively, the following equation (18) is obtained.

$$PB(k+1) = \quad (18)$$
$$PB(k) + Rt \cdot Fth(k) \cdot TH\_cmd(k) - Rt \cdot Flf(k) \cdot Liftin\_cmd(k)$$

When the above equations (17) and (18) are collectively represented by one equation, the following equation (19) is obtained.

$$\begin{bmatrix} PB(k+1) \\ Gcyl(k+1) \end{bmatrix} = \begin{bmatrix} 1 & -Rt \\ 0 & 0 \end{bmatrix} \begin{bmatrix} PB(k) \\ Gcyl(k) \end{bmatrix} + \begin{bmatrix} Rt \cdot Fth(k) & 0 \\ 0 & Flf(k) \end{bmatrix} \begin{bmatrix} TH\_cmd(k) \\ Liftin\_cmd(k) \end{bmatrix} \quad (19)$$

The above equation (19) can be regarded as a model of the plant 90 in which PB and Gcyl are used as control amounts, and to which TH_cmd and Liftin_cmd are inputted as control inputs, and the non-interacting parameters Fth and Flf as model parameters of the model. The equation (19) can be expressed by the following equations (20) to (24). It should be noted that in the following description, X expressed by the equation (21) is referred to as "the control amount vector".

$$X(k+1) = A \cdot X(k) + B \cdot U(k) \quad (20)$$

$$X(k) = \begin{bmatrix} PB(k) \\ Gcyl(k) \end{bmatrix} \quad (21)$$

$$U(k) = \begin{bmatrix} TH\_cmd(k) \\ Liftin\_cmd(k) \end{bmatrix} \quad (22)$$

$$A = \begin{bmatrix} 1 & -Rt \\ 0 & 0 \end{bmatrix} \quad (23)$$

$$B = \begin{bmatrix} Rt \cdot Fth(k) & 0 \\ 0 & Flf(k) \end{bmatrix} \quad (24)$$

To convert the plant 90 of an interacting system expressed by the equation (20) to a linear system free from mutual interaction, the non-interacting input vector U calculated by the following equation (25) is used as a control input vector U. It should be noted that the equation (25) is derived by a non-interacting control law (cross-controller).

$$U(k) = B^{-1}\{-A \cdot X(k) + W(k)\} \quad (25)$$

When the right sides of the above equations (21), (23), (24), and the right side of the aforementioned equation (1) are substituted into X, A, B, and W of the equation (25), respectively, the following equation (26) is obtained.

$$U(k) = \begin{bmatrix} \frac{1}{Rt \cdot Fth(k)} & 0 \\ 0 & \frac{1}{Flf(k)} \end{bmatrix} \left\{ -\begin{bmatrix} 1 & -Rt \\ 0 & 0 \end{bmatrix} \begin{bmatrix} PB(k) \\ Gcyl(k) \end{bmatrix} + \begin{bmatrix} TH'\_cmd(k) \\ Liftin'\_cmd(k) \end{bmatrix} \right\} \quad (26)$$
$$= \begin{bmatrix} \frac{1}{Rt \cdot Fth(k)}\{-PB(k) + Rt \cdot Gcyl(k) + TH'\_cmd(k)\} \\ \frac{1}{Flf(k)} Liftin'\_cmd(k) \end{bmatrix}$$

Further, when the right side of the aforementioned equation (17) is substituted for Gcyl of the equation (26), the following equation (27), that is, the aforementioned equation (9) is obtained.

$$U(k) = \begin{bmatrix} \frac{1}{Rt \cdot Fth(k)} \{-PB(k) + Rt \cdot Flf(k-1) \cdot \text{Liftin\_cmd}(k-1) + TH'\_cmd(k)\} \\ \frac{1}{Flf(k)} \text{Liftin'\_cmd}(k) \end{bmatrix} \quad (27)$$

Furthermore, when the right side of the aforementioned equation (27) is substituted into the aforementioned equation (20) for arrangement, the following equation (28) is obtained.

$$X(k+1) = A \cdot X(k) + B \cdot U(k)$$

$$= \begin{bmatrix} PB(k) - Rt \cdot Gcylk(k) + \\ Rt \cdot Fth(k) \left\{ \frac{1}{Rt \cdot Fth(k)} (-PB(k) + Rt \cdot Gcyl(k) + TH'\_cmd(k)) \right\} \\ Flf(k) \left\{ \frac{1}{Flf(k)} \text{Liftin'\_cmd}(k) \right\} \end{bmatrix}$$

$$= \begin{bmatrix} TH'\_cmd(k) \\ \text{Liftin'\_cmd}(k) \end{bmatrix}$$

$$= W(k)$$

The equation (28) represents a model of a linear imaginary plant free from mutual interaction, in which the follow-up input vector W serves as a control amount vector X. The imaginary plant corresponds to a combination of the above-described plant 90 and non-interacting controller 102. A linear controller can be designed for such a linear imaginary plant free from mutual interaction, so that when a response-specifying control law is applied to the imaginary plant expressed by the equation (28) such that the intake pipe pressure PB is caused to follow the target intake pipe pressure PB_cmd, and the intake air amount Gcyl is caused to follow the target intake air amount Gcyl_cmd, the aforementioned equations (2) to (8) are obtained.

As described above, the system in which the above-described plant 90 and non-interacting controller 102 are combined becomes a linear imaginary plant free from mutual interaction, and hence the follow-up input vector W calculated with the response-specifying control algorithm expressed by the equations (2) to (8) is inputted to the imaginary plant, whereby it is possible to control both the intake pipe pressure PB and the intake air amount Gcyl, as the control amounts, independently of each other without causing any mutual interaction. That is, when the follow-up input vector W is inputted to the non-interacting controller 102, the non-interacting input vector U calculated with the non-interacting control algorithm expressed by the above-described equation (9) is inputted to the plant 90, whereby it is possible to control both the intake pipe pressure PB and the intake air amount Gcyl independently of each other without causing any mutual interaction. More specifically, it is possible to control the intake pipe pressure PB by the target throttle valve opening TH_cmd such that the intake pipe pressure PB follows the target intake pipe pressure PB_cmd without adversely affecting the intake air amount Gcyl, while it is possible to control the intake air amount Gcyl by the target valve lift Liftin_cmd such that the intake air amount Gcyl follows the target intake air amount Gcyl_cmd without adversely affecting the intake pipe pressure PB.

Hereinafter, the variable mechanism control process carried out by the ECU 2 will be described with reference to FIG. 10. The present process is provided for calculating the two control inputs Uth and Uliftin for controlling the throttle valve mechanism 11 and the variable valve lift mechanism 50, respectively, and performed at a predetermined control period ΔT (10 msec).

In the above process, first, in a step 1, it is determined whether or not an engine start flag F_ENGSTAR is equal to 1. The engine start flag F_ENGSTART is set by determining in a determination process, not shown, whether or not engine starting control, i.e. cranking is being executed, based on the engine speed NE and the ON/OFF signal output from the IG·SW 30. More specifically, when the engine starting control is being executed, the engine start flag F_ENGSTART is set to 1, and otherwise set to 0.

Figure 11:
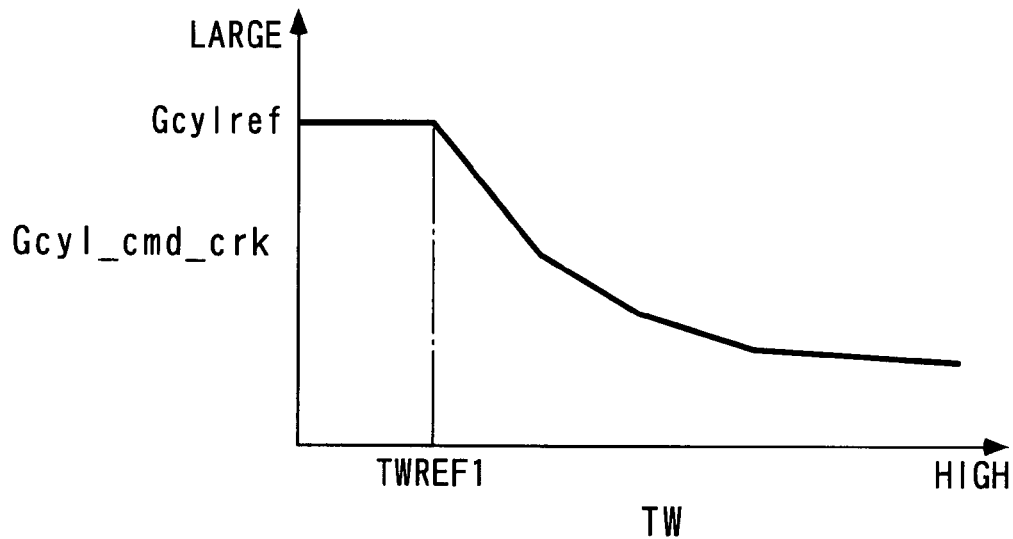
FIG. 11 is a diagram showing an example of a table for use in calculation of a start-time value Gcyl_cmd_crk of a target intake air amount during starting of the engine.

If the answer to the above question is affirmative (YES), i.e. if the engine starting control is being executed, the process proceeds to a step 2, wherein a start-time value Gcyl_cmd_crk of the target intake air amount is calculated by searching a table shown in FIG. 11 according to the engine coolant temperature TW.

In this table, in a range where the engine coolant temperature TW is higher than a predetermined value TWREF1, the start-time value Gcyl_cmd_crk is set to a larger value as the engine coolant temperature TW is lower, and in a range where TW≦TWREF1 holds, the start-time value Gcyl_cmd_crk is set to a predetermined value Gcylref. This is to compensate for an increase in friction of the variable valve lift mechanism 50, which is caused when the engine coolant temperature TW is low.

Then, in a step 3, the target intake air amount Gcyl_cmd is set to the above start-time value Gcyl_cmd_crk.

Figure 12:
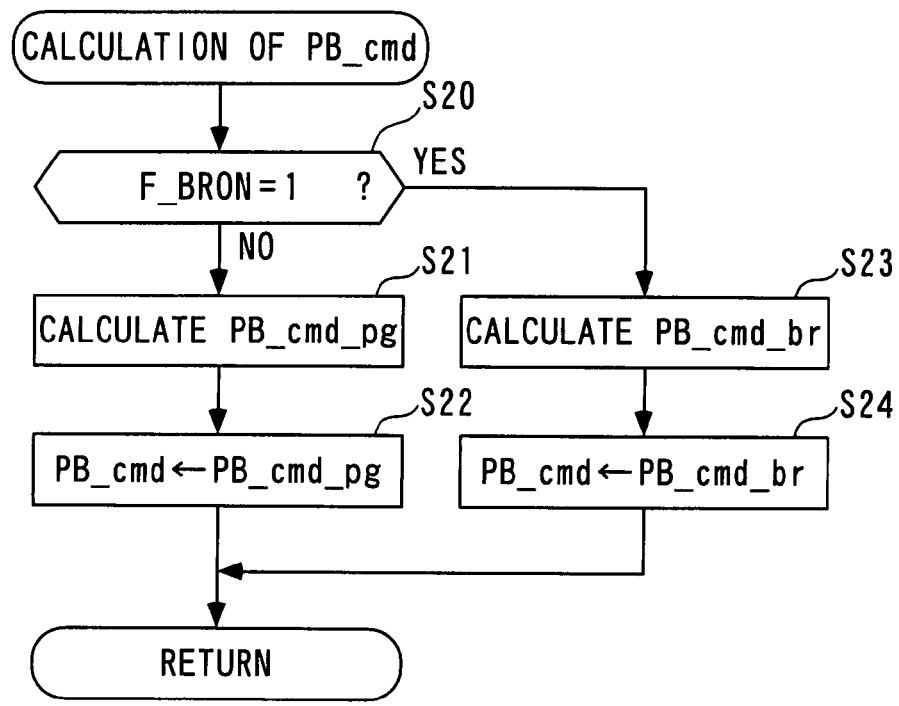
FIG. 12 is a flowchart showing a process for calculating a target intake pipe pressure PB_cmd.

Subsequently, the process proceeds to a step 4, wherein the target intake pipe pressure PB_cmd is calculated. More specifically, the target intake pipe pressure PB_cmd is calculated as shown in FIG. 12.

First, it is determined in a step 20 whether or not a brake operation flag F_BRON is equal to 1. When the ON signal is delivered from the brake switch 31, the brake operation flag F_BRON is set to 1, whereas when the OFF signal is delivered from the brake switch 31, the brake operation flag F_BRON is set to 0.

Figure 13:
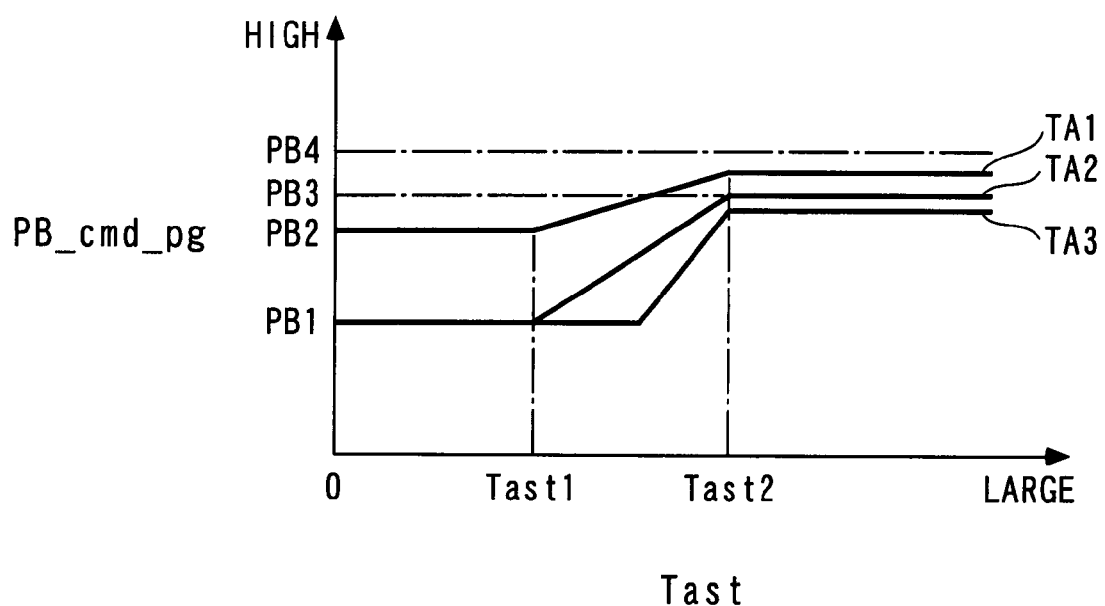
FIG. 13 is a diagram showing a map for use in calculating a brake-off value PB_cmd_pg of the target intake pipe pressure, by way of example.

If the answer to the question of the step 20 is negative (NO), i.e. if the brake pedal 19a is not stepped on, the process proceeds to a step 21, wherein a brake-off value PB_cmd_pg of the target intake pipe pressure is calculated by searching a map shown in FIG. 13 according to a measured value Tast of a post-start timer and the intake air temperature TA. The post-start timer is provided for measuring a time period elapsed after termination of the engine starting control, and formed by an upcount timer.

In FIG. 13, PB1 to PB4 represent predetermined values of the intake pipe pressure PB between which the relationship of PB1<PB2<PB3<PB4 holds, and PB4 is set such that PB4=1 atm holds. This applies to the following description of a map shown in FIG. 14, referred to hereinafter. Further, Tast1 and Tast2 represent predetermined values between which the relationship of Tast1<Tast2 holds, and TA1 to TA3 represent predetermined values of the intake air temperature TA, between which the relationship of TA1<TA2<TA3 holds. As shown in FIG. 13, in this map, the brake-off value PB_cmd_pg is set to a higher value as the intake air temperature TA is lower, and in a range where Tast1≦Tast≦Tast2 holds, the brake-off value PB_cmd_pg is set to a lower value as the measured value Tast of the post-start timer is smaller, while in a range where Tast<Tast1 holds, the brake-off value PB_ cmd_pg is set to a predetermined value (PB1 or PB2) lower than a value set in a range of time where Tast2<Tast holds.

This is because immediately after the start of the engine 3, the intake pipe pressure PB is controlled to a more negative value to thereby properly introduce evaporative fuel adsorbed by the canister 18a during stoppage of the engine 3 into the intake pipe 10. Further, it is because the amount of evaporative fuel generated in the fuel tank 18c is small in a low temperature condition, and hence the throttle valve opening TH is controlled to a larger value to control the intake pipe pressure PB to a higher value, to thereby improve fuel economy. Furthermore, it is because in a high temperature condition, not only the amount of evaporative fuel adsorbed by the canister 18a but also the amount of evaporative fuel generated during traveling of the vehicle increases, so that the intake pipe pressure PB is controlled to a more negative value than in a low-to-medium temperature condition, to thereby properly introduce the large amount of evaporative fuel into the intake pipe 10.

Then, in a step 22, the target intake pipe pressure PB_cmd is set to the brake-off value PB_cmd_pg, followed by terminating the present process.

Figure 14:
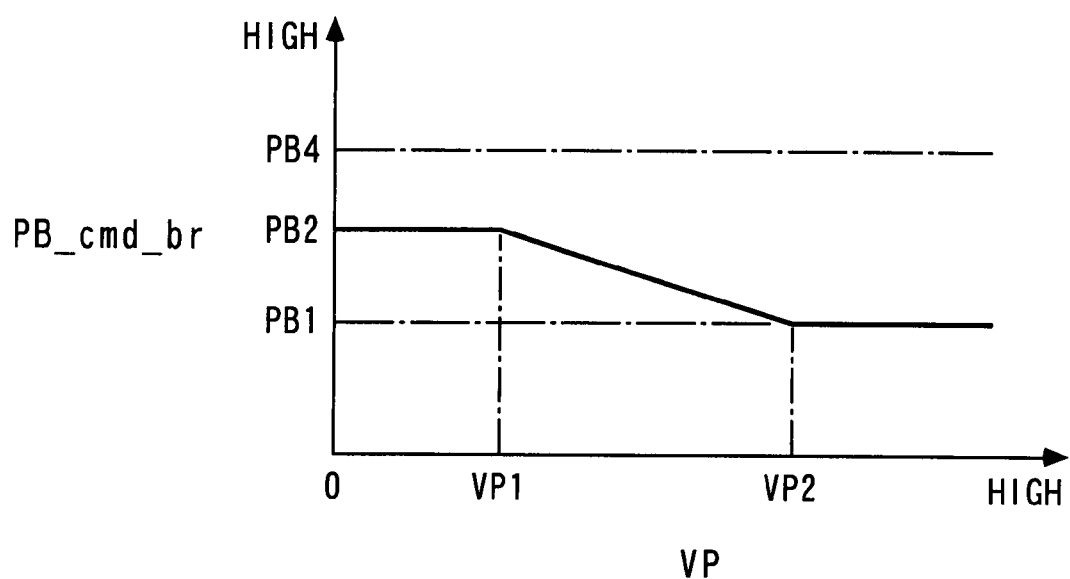
FIG. 14 is a diagram showing a table for use in calculating a brake-on value PB_cmd_br of the target intake pipe pressure, by way of example.

On the other hand, if the answer to the question of the step 20 is affirmative (YES), i.e. if the brake pedal 19a is stepped on, the process proceeds to a step 23, wherein a brake-on value PB_cmd_br of the target intake pipe pressure is calculated by searching a table shown in FIG. 14 according to the vehicle speed VP. In FIG. 14, VP1 and VP2 represent predetermined values of the vehicle speed VP, between which the relationship of VP1<VP2 holds.

In this table, in a range where VP1≦VP≦VP2 holds, the brake-on value PB_cmd_br is set to a lower value as the vehicle speed VP is higher, and in a range where VP<VP1 holds, the brake-on value PB_cmd_br is set to a value PB2 higher than a value PB1 set in a range where VP2<VP holds. This is because a larger braking force, i.e. a larger assisting force is required when the vehicle speed is high than when the vehicle speed is low, which increases the degree of consumption of negative pressure within the negative pressure chamber in the master vac 19, and causes pressure within the negative pressure chamber to increase more readily, so that the intake pipe pressure PB is controlled to be more negative, to store sufficient negative pressure in the negative pressure chamber to thereby secure a necessary assisting force. Inversely, when the vehicle speed is low, since a required assisting force is small, the intake pipe pressure PB is controlled to a higher value to thereby reduce the pumping loss for improvement of fuel economy.

Further, as is clear from comparison between FIGS. 14 and 13 referred to hereinbefore, the brake-on value PB_cmd_br is set to a value lower than the value of the brake-off value PB_cmd_pg set in the range of time where Tast2<Tast holds (value equal to or lower than the predetermined value PB2). This is because when Tast2<Tast holds, that is, when the engine 3 is in a normal operating condition after termination of the process for introducing evaporative fuel into the intake pipe 10 immediately after the start of the engine 3, if the brake pedal 19a is not stepped on, the intake pipe pressure PB is controlled to a higher value to thereby reduce the pumping loss for improving fuel economy, whereas if the brake pedal 19a is stepped on, the brake-on value PB_cmd_br is set to the above value to thereby properly ensure a necessary assisting force.

Then, in a step 24, the target intake pipe pressure PB_cmd is set to the above-described brake-on value PB_cmd_br, followed by terminating the present process.

Figure 15:
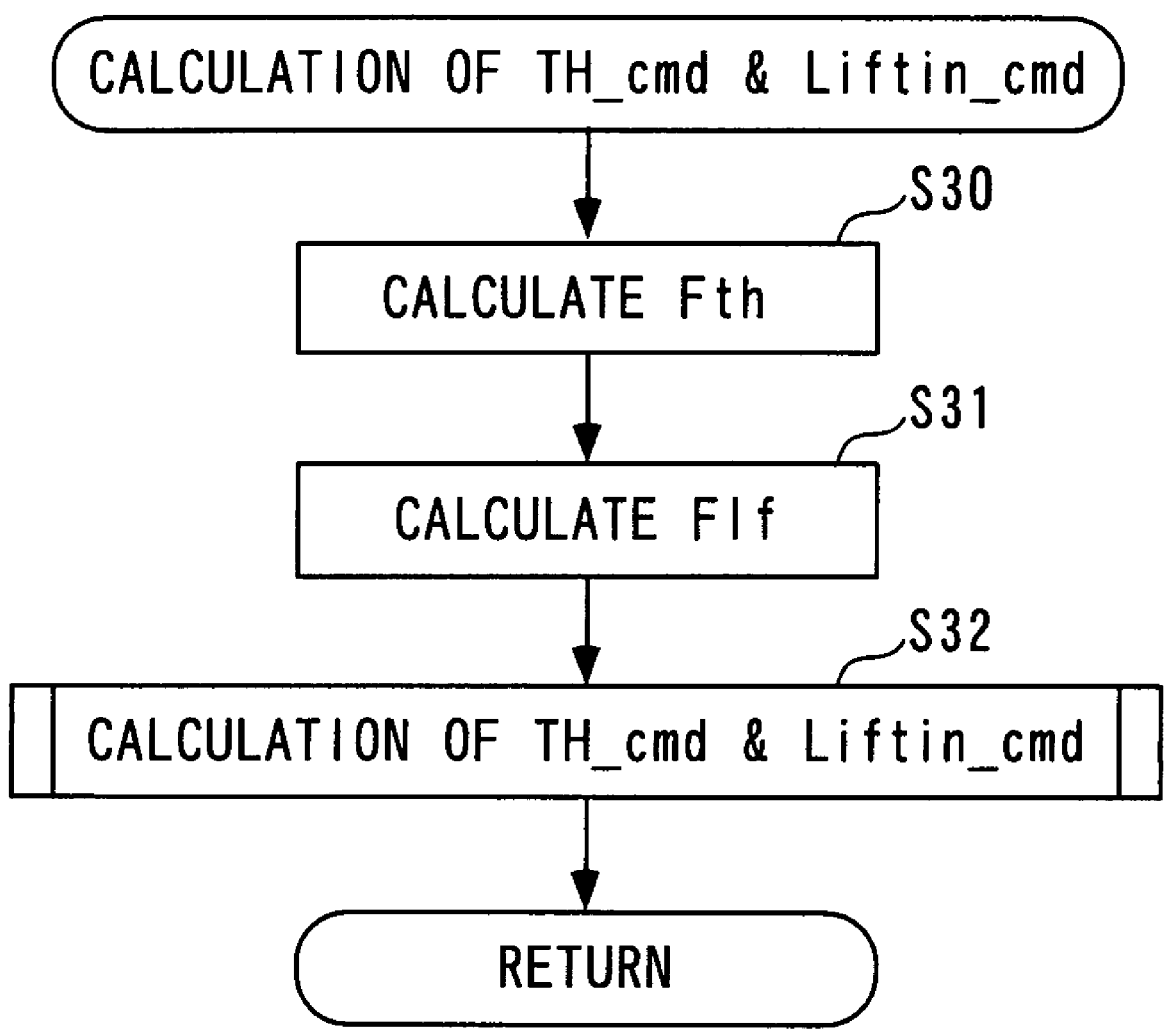
FIG. 15 is a flowchart showing a process for calculating a target throttle valve opening TH_cmd and a target valve lift Liftin_cmd.

Referring again to FIG. 10, the target intake pipe pressure PB_cmd is calculated as described above in the step 4, and then the process proceeds to a step 5, wherein the target throttle valve opening TH_cmd and the target valve lift Liftin_cmd are calculated. More specifically, the above values TH_cmd and Liftin_cmd are calculated as shown in FIG. 15.

Figure 16:
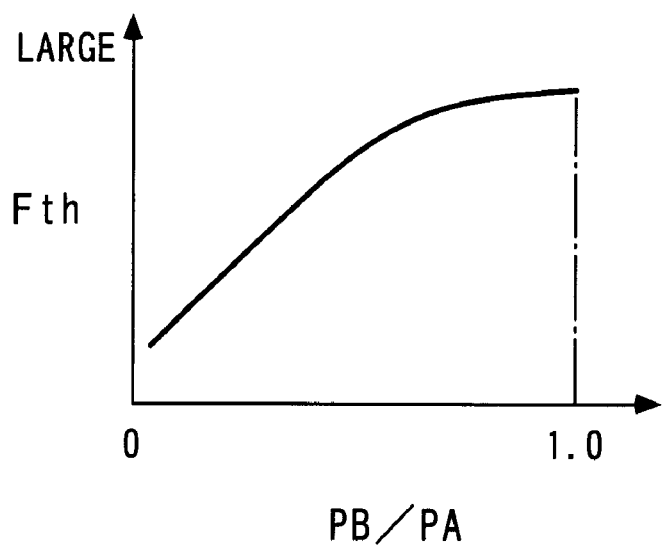
FIG. 16 is a diagram showing a table for use in calculating a non-interacting parameter Fth, by way of example.

First, in a step 30, the non-interacting parameter Fth is calculated by searching a table shown in FIG. 16 according to a ratio PB/PA between the intake pipe pressure PB and the atmospheric pressure PA.

In this table, the non-interacting parameter Fth is set to a larger value as the ratio PB/PA is closer to 1. This is because as the ratio PB/PA is closer to 1, that is, as the intake pipe pressure PB is closer in value to the atmospheric pressure PA, the TH passing intake air amount Gth assumes a larger value with respect to the target throttle valve opening TH_cmd.

Figure 17:
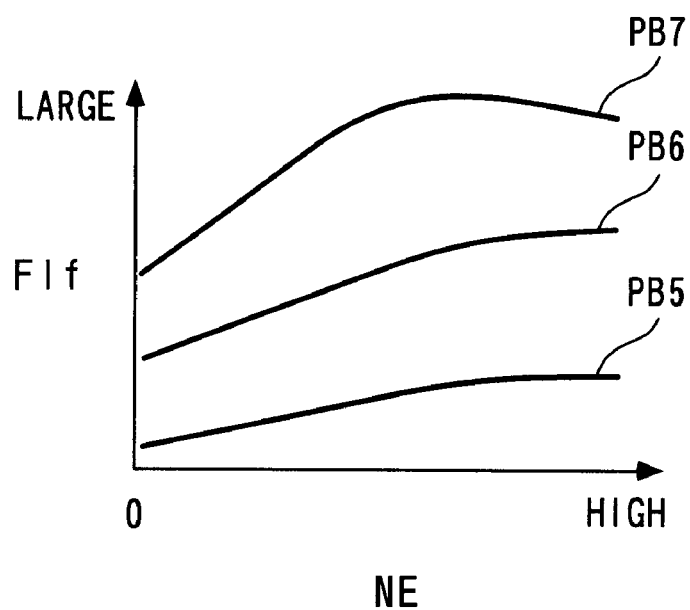
FIG. 17 is a diagram showing a map for use in calculating a non-interacting parameter Flf, by way of example.

Then, the process proceeds to a step 31, wherein the non-interacting parameter Flf is calculated by searching a map shown in FIG. 17 according to the intake pipe pressure PB and the engine speed NE. In FIG. 17, PB5 to PB7 represent predetermined values of the intake pipe pressure PB, between which the relationship of PB5<PB6<PB7 holds.

In this map, the non-interacting parameter Flf is set to a larger value as the intake pipe pressure PB is higher. This is because as the intake pipe pressure PB is higher, the intake air amount Gcyl assumes a larger value with respect to the target valve lift Liftin_cmd. Further, when PB=PB5 and when PB=PB6 holds, the non-interacting parameter Flf is set to respective larger values as the engine speed NE is higher. This is because when the intake pipe pressure PB is within the above range, the intake air amount Gcyl assumes a larger value as the engine speed NE is higher.

Further, the non-interacting parameter Flf is calculated according to the engine speed NE as described hereinabove, for the following reason: In the case of the interacting system, such as the engine 3 according to the present embodiment, the relationship of the mutual interaction between the control amounts PB and Gcyl and the control inputs TH_cmd and Liftin_cmd changes according to the engine speed NE, and the engine speed NE changes over a wide range during operation thereof. In view of this, the non-interacting parameter Flf is calculated according to the engine speed NE that changes as above, whereby the non-interacting inputs TH_cmd and Liftin_cmd are calculated as values capable of properly compensating for the change in the relationship of the mutual interaction caused by the change in the engine speed NE.

Then, the process proceeds to a step 32, wherein the target throttle valve opening TH_cmd and the target valve lift Liftin_cmd are calculated with the aforementioned control algorithm expressed by the equations (2) to (9), followed by terminating the present process. It should be noted that in the present embodiment, the target throttle valve opening TH_cmd corresponds to an opening control value, the target valve lift Liftin_cmd to a lift control value, and the engine speed NE and the atmospheric pressure PA to operating condition parameters.

Figure 18:
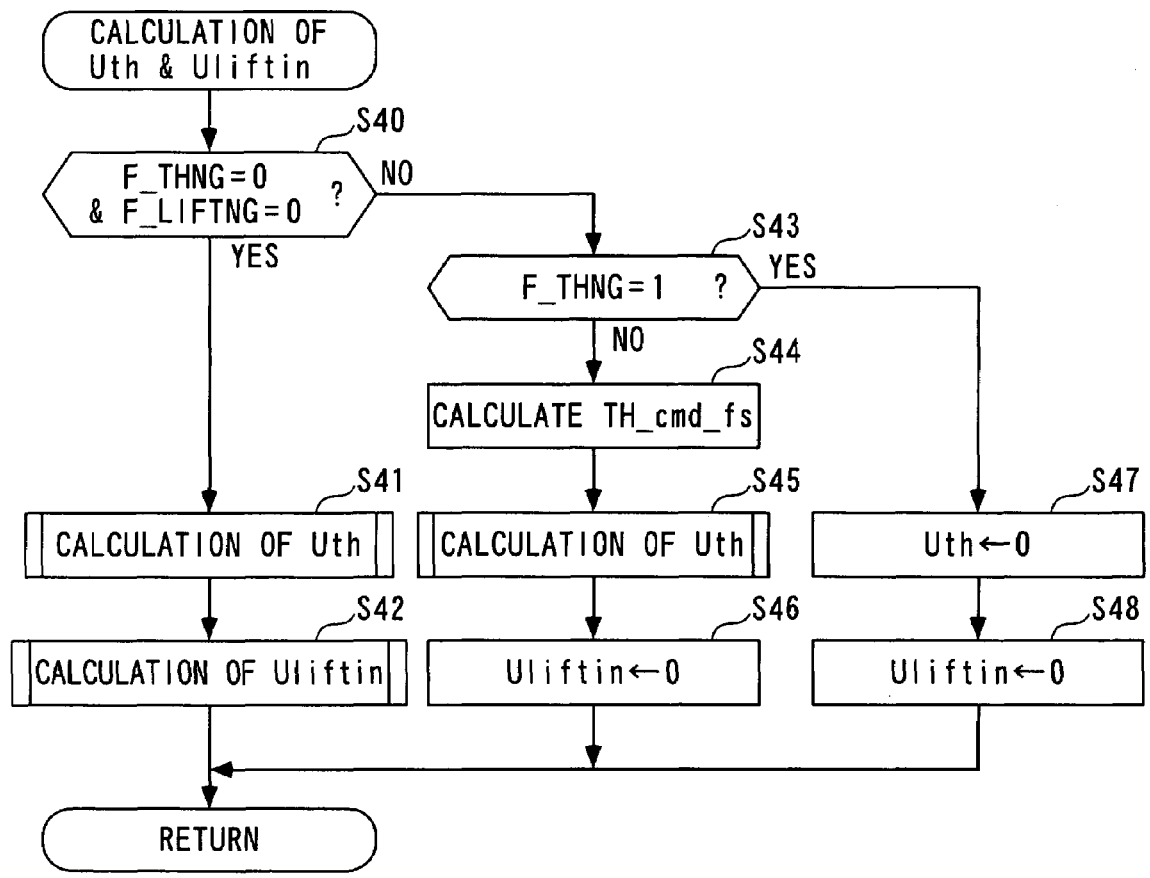
FIG. 18 is a flowchart showing a process for calculating an opening control input Uth and a lift control input Uliftin.

Referring again to FIG. 10, in the step 5, the target throttle valve opening TH_cmd and the target valve lift Liftin_cmd are calculated as described above, and thereafter the process proceeds to a step 6, wherein the opening control input Uth and the lift control input Uliftin are calculated. More specifically, the above control inputs Uth and Uliftin are calculated as shown in FIG. 18.

First, in a step 40, it is determined whether or not a throttle valve mechanism failure flag F_THNG and a lift mechanism failure flag F_LIFTNG are both equal to 0. In a failure-determining process, not shown, when the throttle valve mechanism 11 is determined to be faulty, the throttle valve mechanism failure flag F_THNG is set to 1, whereas when the throttle valve mechanism 11 is determined to be normal, the throttle valve mechanism failure flag F_THNG is set to 0. Further, in a failure-determining process, not shown, when the variable valve lift mechanism 50 is determined to be faulty, the lift mechanism failure flag F_LIFTNG as well is set to 1, whereas when the variable valve lift mechanism 50 is determined to be normal, the lift mechanism failure flag F_LIFTNG is set to 0.

If the answer to the question of the step 40 is affirmative (YES), i.e. if the throttle valve mechanism 11 and the variable valve lift mechanism 50 are both normal, the process proceeds to a step 41, wherein the opening control input Uth is calculated. The opening control input Uth is calculated as a value for causing the throttle valve opening TH to follow the target throttle valve opening TH_cmd with a target value filter-type two-degree-of-freedom response-specifying control algorithm expressed by the following equations (29) to (32).

$$Uth(k) = -\text{Krch\_th} \cdot \sigma\_\text{th}(k) - \text{Kadp\_th} \cdot \sum_{i=0}^{k} \sigma\_\text{th}(i) \quad (29)$$

$$\sigma\_\text{th}(k) = E\_\text{th}(k) + \text{pole\_th} \cdot E\_\text{th}(k-1) \quad (30)$$

$$E\_\text{th}(k) = TH(k) - \text{TH\_cmd\_f}(k) \quad (31)$$

$$\text{TH\_cmd\_f}(k) = -\text{pole\_f\_th} \cdot \text{TH\_cmd\_f}(k-1) + \\ (1 + \text{pole\_f\_th}) \cdot \text{TH\_cmd}(k) \quad (32)$$

In the above equation (29), Krch_th and Kadp_th represent a predetermined reaching law gain and a predetermined adaptive law gain, respectively. Furthermore, σ_th represents a switching function defined by the equation (30). In the equation (30), E_th represents a difference calculated by the equation (31), and pole_th represents a switching function-setting parameter which is set to a value within a range of −1<pole_th<0. Further, in the equation (31), TH_cmd_f represents a filtered value of the target throttle valve opening, and is calculated with a target value filter algorithm (first-order lag filter algorithm) expressed by the equation (32). In the equation (32), pole_f_th represents a target value response-specifying parameter, and is set to a value within a range of −1<pole_f_th<0.

Then, the process proceeds to a step 42, wherein the lift control input Uliftin is calculated. The lift control input Uliftin is calculated as a value for causing the valve lift Liftin to follow the target valve lift Liftin_cmd with a target value filter-type two-degree-of-freedom response-specifying control algorithm expressed by the following equations (33) to (36).

$$Uliftin(k) = -\text{Krch\_lf} \cdot \sigma\_\text{lf}(k) - \text{Kadp\_lf} \cdot \sum_{i=0}^{k} \sigma\_\text{lf}(i) \quad (33)$$

$$\sigma\_\text{lf}(k) = E\_\text{lf}(k) + \text{pole\_lf} \cdot E\_\text{lf}(k-1) \quad (34)$$

$$E\_\text{lf}(k) = Liftin(k) - \text{Liftin\_cmd\_f}(k) \quad (35)$$

$$\text{Liftin\_cmd\_f}(k) = -\text{pole\_f\_lf} \cdot \text{Liftin\_cmd\_f}(k-1) + \\ (1 + \text{pole\_f\_lf}) \cdot \text{Liftin\_cmd}(k) \quad (36)$$

In the above equation (33), Krch_lf and Kadp_lf represent a predetermined reaching law gain and a predetermined adaptive law gain, respectively. Furthermore, σ_lf represents a switching function defined by the equation (34). In the equation (34), E_lf represents a difference calculated by the equation (35), and pole_lf represents a switching function-setting parameter which is set to a value within a range of −1<pole_lf<0. Further, in the equation (35), Liftin_cmd_f represents a filtered value of the target valve lift, and is calculated with a target value filter algorithm (first-order lag filter algorithm) expressed by the equation (36). In the equation (36), pole_f_lf represents a target value response-specifying parameter, and is set to a value within a range of −1<pole_f_lf<0.

As described above, the lift control input Uliftin is calculated in the step 42, followed by terminating the present process.

On the other hand, if the answer to the question of the step 40 is negative (NO), i.e. if at least one of the throttle valve mechanism 11 and the variable valve lift mechanism 50 is faulty, the process proceeds to a step 43, wherein it is determined whether or not the throttle valve mechanism failure flag F_THNG is equal to 1.

Figure 19:
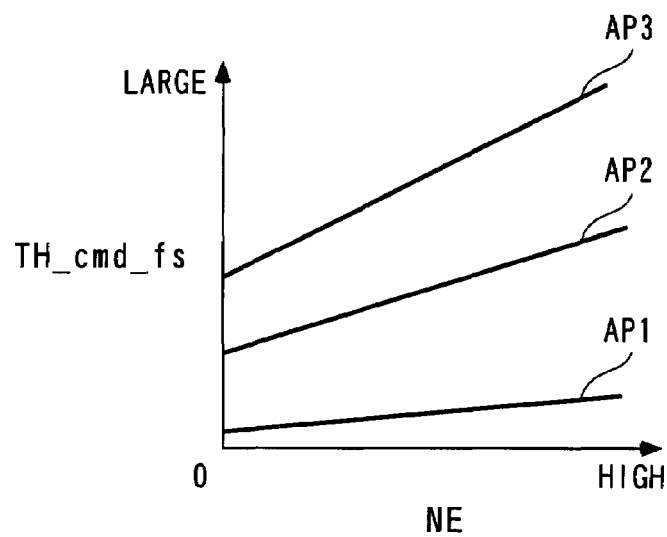
FIG. 19 is a diagram showing a map for use in calculating a failure time value TH_cmd_fs of the target throttle valve opening, by way of example.

If the answer to this question is negative (NO), i.e. if only the variable valve lift mechanism 50 is faulty but the throttle valve mechanism 11 is normal, the process proceeds to a step 44, wherein a failure time value TH_cmd_fs of the target throttle valve opening is calculated by searching a map shown in FIG. 19 according to the engine speed NE and the accelerator pedal opening AP. In FIG. 19, AP1 to AP3 represent predetermined values of the accelerator pedal opening AP, between which the relationship of AP1<AP2<AP3 holds. This applies to the following description of FIG. 21.

In this map, the failure time value TH_cmd_fs is set to a larger value as the accelerator pedal opening AP is larger, or as the engine speed NE is higher. This is because as the accelerator pedal opening AP is larger, or as the engine speed NE is higher, an output required of the engine 3 is larger, and hence a larger intake air amount is required.

Subsequently, the process proceeds to a step 45, wherein the opening control input Uth is calculated. The opening control input Uth is calculated as a value for causing the throttle valve opening TH to follow the failure time value TH_cmd_fs of the target throttle valve opening with a target value filter-type two-degree-of-freedom response-specifying control algorithm expressed by the following equations (37) to (40).

$$Uth(k) = -\text{Krch\_th} \cdot \sigma\_\text{th}(k) - \text{Kapd\_th} \cdot \sum_{i=0}^{k} \sigma\_\text{th}(i) \quad (37)$$

$$\sigma\_\text{th}(k) = E\_\text{th}(k) + \text{pole\_th} \cdot E\_\text{th}(k-1) \quad (38)$$

$$E\_\text{th}(k) = TH(k) - \text{TH\_cmd\_fs\_f}(k) \quad (39)$$

$$\text{TH\_cmd\_fs\_f}(k) = -\text{pole\_f\_th} \cdot \text{TH\_cmd\_fs\_f}(k-1) + \\ (1 + \text{pole\_f\_th}) \cdot \text{TH\_cmd\_fs}(k) \quad (40)$$

In the above equation (39), TH_cmd_fs_f represents a filtered value of the failure time value, and is calculated by the equation (40).

Then, the process proceeds to a step 46, wherein the lift control input Uliftin is set to a value of 0, followed by terminating the present process. As a result, as described hereinabove, the valve lift Liftin is held at a minimum value Liftin_L.

On the other hand, if the answer to the question of the step 43 is affirmative (YES), i.e. if at least the throttle valve mechanism 11 is faulty, the opening control input Uth and the lift control input Uliftin are set to a value of 0, followed by terminating the present process. As a result, as described hereinabove, the valve lift Liftin is held at the minimum value Liftin_L, and the throttle valve opening TH at the predetermined initial degree, whereby it is possible to ensure the intake air amount Gcyl that is capable of suitably carrying out idling or starting of the engine 3 during stoppage of the vehicle, and at the same time holding a low-speed traveling state of the vehicle during traveling of the vehicle.

Referring again to FIG. 10, in the step 6, the opening control input Uth and the lift control input Uliftin are calculated as described above, followed by terminating the present process.

On the other hand, if the answer to the question of the step 1 is negative (NO), i.e. if the engine starting control is not being executed, the process proceeds to a step 7, wherein it is determined whether or not the accelerator pedal opening AP is smaller than a predetermined value APREF. If the answer to this question is affirmative (YES), i.e. if the accelerator pedal is not stepped on, the process proceeds to a step 8, wherein it is determined whether or not the measured value Tast of the post-start timer is smaller than a predetermined value Tastlmt.

Figure 20:
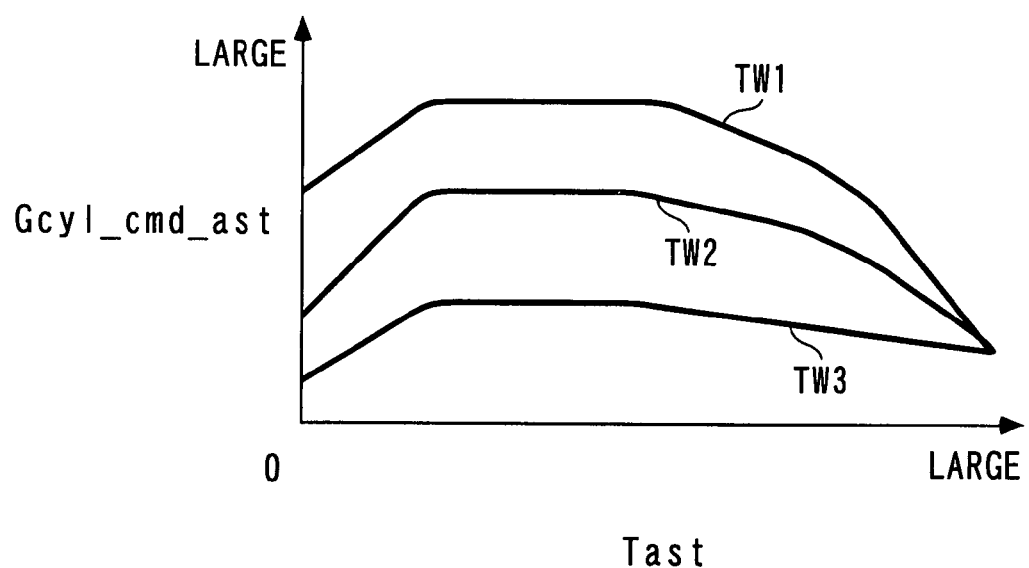
FIG. 20 is a diagram showing a map for use in calculating a catalyst warmup value Gcyl_cmd_ast of the target intake air amount during catalyst warmup control, by way of example.

If the answer to this question is affirmative (YES), i.e. if Tast<Tastlmt holds, it is judged that catalyst warmup control should be executed, and the process proceeds to a step 9, wherein a catalyst warmup value Gcyl_cmd_ast of the target intake air amount is calculated by searching a map shown in FIG. 20 according to the measured value Tast of the post-start timer and the engine coolant temperature TW. In FIG. 20, TW1 to TW3 represent predetermined values of the engine coolant temperature TW, between which the relationship of TW1<TW2<TW3 holds.

In this map, the catalyst warmup value Gcyl_cmd_ast is set to a larger value as the engine coolant temperature TW is lower. This is because as the engine coolant temperature TW is lower, it takes a longer time period to activate catalyst, and hence the volume of exhaust gasses is increased to shorten the time period required for activating the catalyst. Furthermore, in the above map, during a time period over which the measured value Tast of the post-start timer is small, the catalyst warmup value Gcyl_cmd_ast is set to a larger value as the measured value Tast is larger, whereas after the measured value Tast has become large to a certain extent, the catalyst warmup value Gcyl_cmd_ast is set to a smaller value as the measured value Tast is larger. This is because the warming up of the engine 3 proceeds along with the lapse of the execution time of the catalyst warmup control, so that when the friction lowers, unless the intake air amount is decreased, the ignition timing is excessively retarded so as to hold the engine speed NE at a target value, which makes unstable the combustion state of the engine. To avoid the combustion state from being unstable, the map is configured as described above.

Then, the process proceeds to a step 10, wherein the target intake air amount Gcyl_cmd is set to the above catalyst warmup value Gcyl_cmd_ast. After that, the steps 4 to 6 are carried out, as described hereinabove, followed by terminating the present process.

Figure 21:
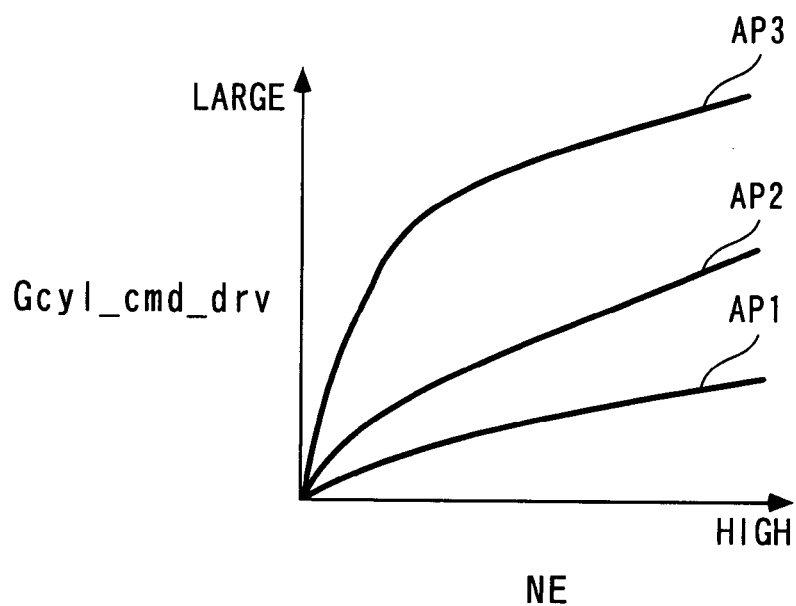
FIG. 21 is a diagram showing a map for use in calculating a normal time value Gcyl_cmd_drv of the target intake air amount, by way of example.

On the other hand, if the answer to the question of the step 7 or 8 is negative (NO), i.e. if the accelerator pedal is stepped on, or if Tast≧Tastlmt holds, the process proceeds to a step 11, wherein a normal time value Gcyl_cmd_drv of the target intake air amount is calculated by searching a map shown in FIG. 21 according to the engine speed NE and the accelerator pedal opening AP.

In this map, the normal time value Gcyl_cmd_drv is set to a larger value as the engine speed NE is higher or as the accelerator pedal opening AP is larger. This is because as the engine speed NE is higher or as the accelerator pedal opening AP is larger, the output required of the engine 3 is larger, and hence a larger intake air amount is required.

Then, the process proceeds to a step 12, wherein the target intake air amount Gcyl_cmd is set to the above normal time value Gcyl_cmd_drv. After that, the steps 4 to 6 are carried out, as described hereinabove, followed by terminating the present process.

As described above, in the variable mechanism control process, the two target values TH_cmd and Liftin_cmd are calculated with the control algorithm [equations (2) to (9)] in which the response-specifying control algorithm and the non-interacting control algorithm are combined, and the two control inputs Uth and Uliftin are calculated such that actual values TH and Liftin follow the above target values TH_cmd and Liftin_cmd. As a result, the intake pipe pressure PB and the intake air amount Gcyl are controlled such that they follow the target intake pipe pressure PB_cmd and the target intake air amount Gcyl_cmd, respectively, while avoiding the mutual interaction between the control inputs TH_cmd and Liftin_cmd.

Figure 22:
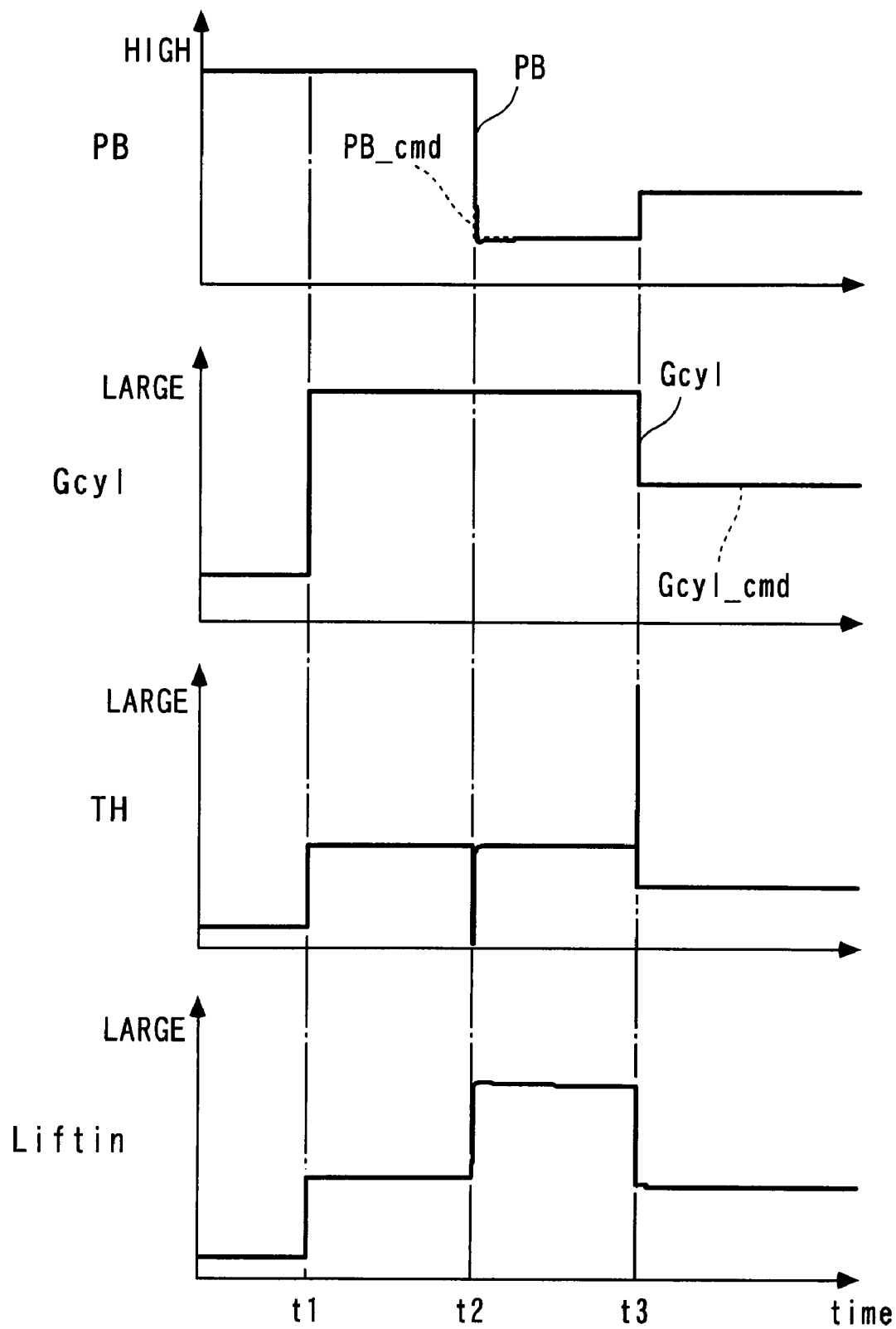
FIG. 22 is a timing chart showing a result of a simulation of variable mechanism control executed by the control system according to the first embodiment (in which there are no modeling errors), by way of example.
Figure 23:
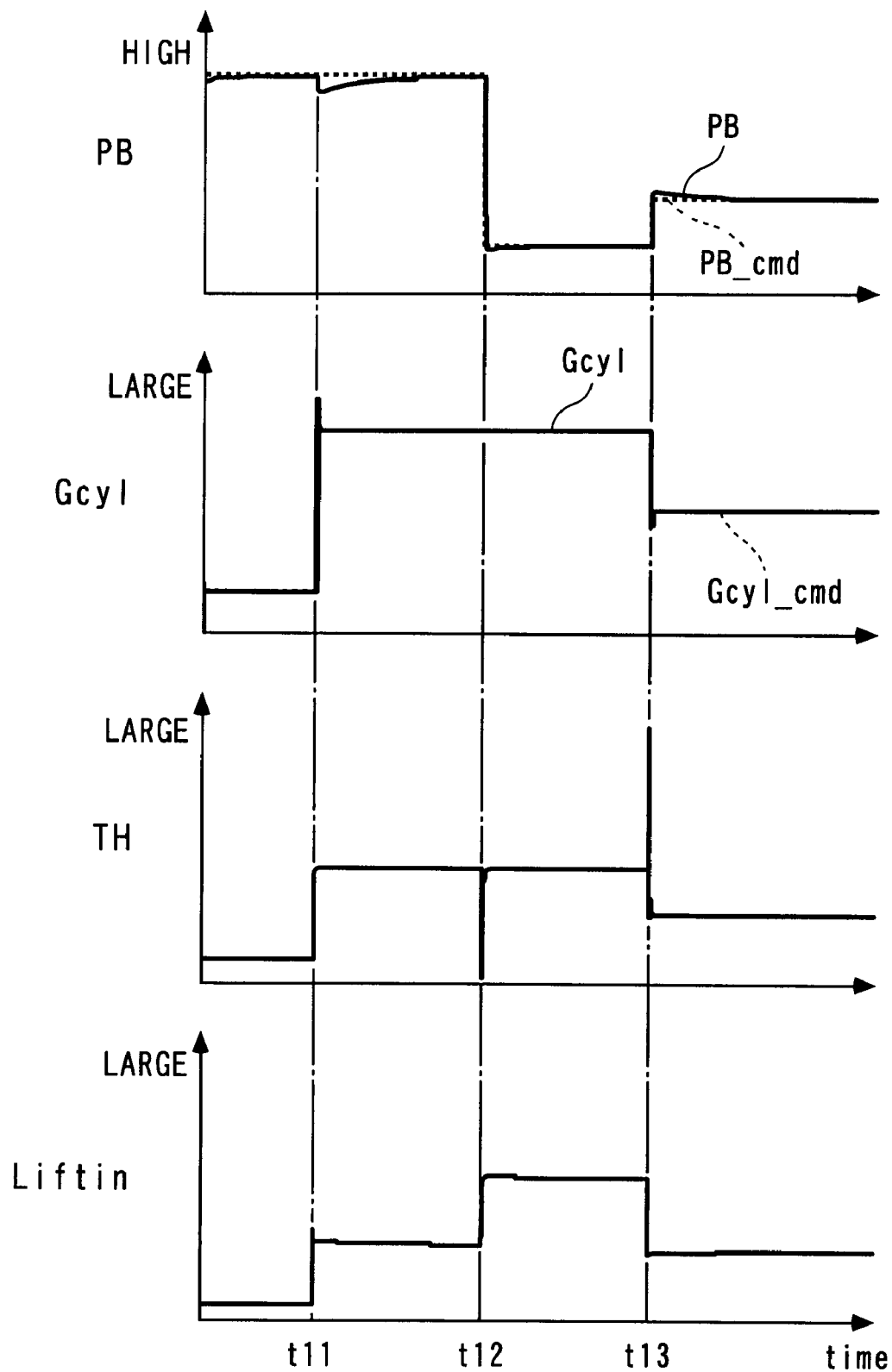
FIG. 23 is a timing chart showing a result of the simulation of the variable mechanism control executed by the control system according to the first embodiment (in which there are modeling errors), by way of example.

Next, a description will be given of the results of simulations of the variable mechanism control (hereinafter referred to as "the results of the control") performed by the control system 1 according to the present embodiment. FIGS. 22 and 23 show the results of the control performed by the control system 1 according to a first embodiment. Particularly, FIG. 22 shows the results of the control, obtained when there are no modeling errors in the aforementioned equation (19), i.e. when no calculation errors occur in calculation of the non-interacting parameters Fth and Flf, and FIG. 23 shows the results of the control, obtained when there are modeling errors in the equation (19).

Figure 24:
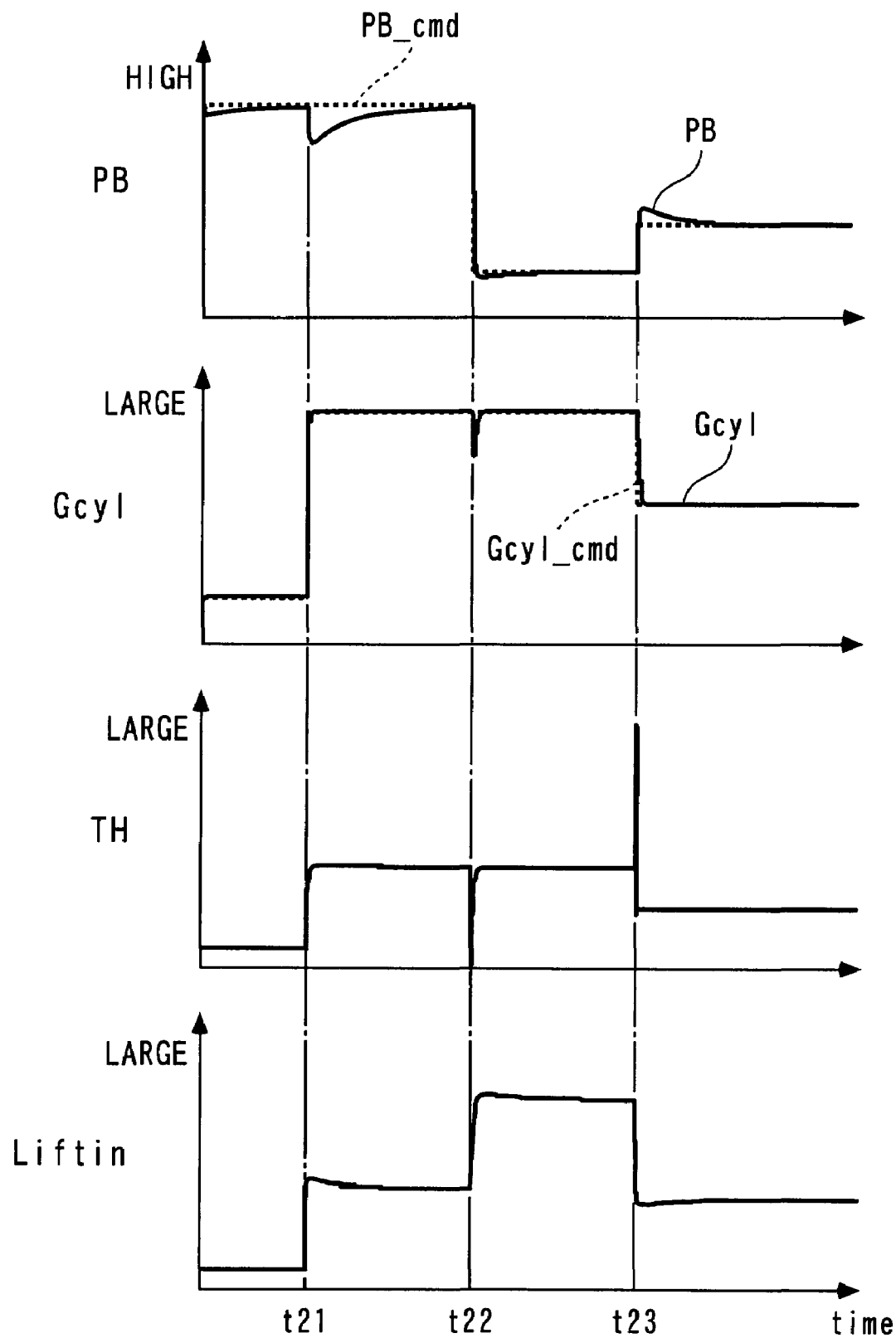
FIG. 24 is a timing chart showing a result of a simulation in which the intake pipe pressure PB and the intake air amount Gcyl are controlled without using a non-interacting control algorithm, by way of example.

Further, FIG. 24 shows the results of a simulation of variable mechanism control for comparison with the FIGS. 22 and 23 examples, in which in the variable mechanism control, the intake pipe pressure PB is controlled such that it follows the target intake pipe pressure PB_cmd, and the intake air amount Gcyl is controlled such that it follows the target intake air amount Gcyl_cmd, only with the response-specifying control algorithm without using the non-interacting control algorithm, that is, the results of control of the interacting system.

First, as is apparent from FIG. 24, according to the results of control of the interacting system, when the target intake air amount Gcyl_cmd is changed stepwise to a larger value in a state of the target intake pipe pressure PB_cmd being held constant (time t21), the throttle valve opening TH and the valve lift Liftin are both increased, and due to influence of this control, the intake pipe pressure PB largely deviates toward a lower value side with respect to the target intake pipe pressure PB_cmd. This produces a large difference between the intake pipe pressure PB and the target intake pipe pressure PB_cmd.

Further, when the target intake pipe pressure PB_cmd is changed stepwise to a lower value in a state of the target intake air amount Gcyl_cmd being held constant (time t22), the throttle valve opening TH is temporally sharply decreased, and the valve lift Liftin is increased. Due to influence of this control, the intake air amount Gcyl largely deviates toward a lower value side with respect to the target intake air amount Gcyl_cmd, which produces a large difference between the intake air amount Gcyl and the target intake air amount Gcyl_cmd.

Further, when the target intake pipe pressure PB_cmd is changed stepwise to a higher value and the target intake air amount Gcyl_cmd stepwise to a smaller value (time t23), the intake pipe pressure PB causes overshooting with respect to the target intake pipe pressure PB_cmd, which causes not only a large difference between the intake pipe pressure PB and the target intake pipe pressure PB_cmd but also a difference between the intake air amount Gcyl and the target intake air amount Gcyl_cmd.

In contrast, FIG. 22 apparently shows that if there are no modeling errors, when the target intake air amount Gcyl_cmd is changed stepwise to a larger value in the state of the target intake pipe pressure PB_cmd being held constant (time t1), the intake pipe pressure PB properly follows the target intake pipe pressure PB_cmd without deviating therefrom.

Further, it is apparent that also when the target intake pipe pressure PB_cmd is changed stepwise to a lower value in the state of the target intake air amount Gcyl_cmd being held constant (time t2), the intake air amount Gcyl properly follows the target intake air amount Gcyl_cmd without deviating therefrom.

Furthermore, it is apparent that also when the target intake pipe pressure PB_cmd is changed stepwise to a higher value and the target intake air amount Gcyl_cmd stepwise to a smaller value (time t3), respectively, the intake pipe pressure PB and the intake air amount Gcyl properly follow the target intake pipe pressure PB_cmd and the target intake air amount Gcyl_cmd, respectively.

Further, FIG. 23 apparently shows that if there are modeling errors, when the target intake air amount Gcyl_cmd is changed stepwise to a larger value in the state of the target intake pipe pressure PB_cmd being held constant (time t11), the intake pipe pressure PB produces a slight difference with respect to the target intake pipe pressure PB_cmd, differently from the above FIG. 22 case where there are no modeling errors, but the degree of the difference is smaller than in the FIG. 24 results of control of the interacting system, and therefore the follow-up property, i.e. the control accuracy is enhanced.

Furthermore, it is apparent that when the target intake pipe pressure PB_cmd is changed stepwise to a lower value in the state of the target intake air amount Gcyl_cmd being held constant (time t12), the intake air amount Gcyl produces a difference equivalent to that of the FIG. 22 case where there are no modeling errors, with respect to the target intake air amount Gcyl_cmd, but the degree of the difference is smaller than in the FIG. 24 results of control of the interacting system, and therefore the follow-up property, i.e. the control accuracy is enhanced.

Further, when the target intake pipe pressure PB_cmd is changed stepwise to a higher value and the target intake air amount Gcyl_cmd stepwise to a smaller value (time t13), differently from the FIG. 22 case where there are no modeling errors, the intake pipe pressure PB is slightly overshot with respect to the target intake pipe pressure PB_cmd, which causes a slight difference therebetween, and the intake air amount Gcyl is slightly undershot with respect to the target intake air amount Gcyl_cmd, which causes a slight difference therebetween. However, it is apparent that the degrees of the differences are smaller than in the FIG. 24 results of control of the interacting system, and the follow-up property, i.e. the control accuracy is enhanced.

As described above, according to the control system 1 of the first embodiment, the non-interacting input vector U, that is, the two non-interacting inputs TH_cmd and Liftin_cmd are calculated with the control algorithm [equations (2) to (9)] in which the response-specifying control algorithm and the non-interacting control algorithm are combined based on a plant model [equation (19)] formed as a discrete-time system model, so that it is possible to cause the intake pipe pressure PB and the intake air amount Gcyl to accurately follow the target intake pipe pressure PB_cmd and the target intake air amount Gcyl_cmd, respectively, while eliminating the mutual interaction. Furthermore, since the discrete-time system model is used in calculation of the non-interacting input vector U, modeling errors can be reduced compared with the conventional control system employing the continuous-time system model, whereby it is possible to ensure a large margin of the stability of the control while setting the controller gains Krch_p, Krch_g, Kadp_p and Kadp_g to higher values. Further, since the discrete-time system model is used, differently from the conventional control system employing the continuous-time system model, there is no need to employ the differential values of the control amounts as variables forming the switching functions, whereby even when the control period is short, it is possible to ensure the robustness, which is the advantageous feature of the response-specifying control algorithm. This makes it possible to enhance controllability and control accuracy.

Further, according to the control system 1 of the first embodiment, the two non-interacting inputs TH_cmd and Liftin_cmd are calculated with the control algorithm [equations (2) to (9)] in which the response-specifying control algorithm and the non-interacting control algorithm are combined, as values which are capable of eliminating the mutual interaction for causing the control amounts PB and Gcyl to follow the target values PB_cmd and Gcyl_cmd, respectively, so that it is possible to cause the intake pipe pressure PB and the intake air amount Gcyl to follow the target intake pipe pressure PB_cmd and the target intake air amount Gcyl_cmd, respectively, while eliminating the mutual interaction. In short, it is possible to cause the control amounts PB and Gcyl to follow their respective target values PB_cmd and Gcyl_cmd independently of each other while securing high responsiveness.

Further, the non-interacting input TH_cmd is calculated according to the control amount PB and the control input Liftin_cmd, and the non-interacting input Liftin_cmd is calculated according to the control amount Gcyl, and hence when the control amounts PB and Gcyl have changed, it is possible to calculate the non-interacting inputs TH_cmd and Liftin_cmd such that the mutual interaction is eliminated, while coping with the changes in the control amounts PB and Gcyl.

Furthermore, the non-interacting parameter Flf is calculated according to the engine speed NE, whereby the non-interacting inputs TH_cmd and Liftin_cmd as well are calculated according to the engine speed NE. In this case, the relationship of the mutual interaction between the control amounts PB and Gcyl and the control inputs TH_cmd and Liftin_cmd varies with the engine speed NE, and the engine speed NE changes over a wide range during operation thereof, and hence the degree of change in the mutual interaction accordingly increases. Therefore, by calculating the non-interacting inputs TH_cmd and Liftin_cmd according to the engine speed NE, it is possible to calculate the non-interacting inputs TH_cmd and Liftin_cmd as appropriate values dependent on the degree of change in the mutual interaction caused by the change in the engine speed NE, thereby making it possible to properly eliminate the mutual interaction.

As described above, it is possible to enhance control accuracy and response of the control system in which a mutual interaction exists between the control amounts PB and Gcyl and the control inputs TH_cmd and Liftin_cmd.

Further, since both the throttle valve opening TH and the valve lift Liftin are controlled, compared with a case in which the intake pipe pressure PB is controlled only by controlling the degree of opening of the throttle valve 11a, it is possible to reduce the pumping loss, thereby making it possible to improve fuel economy.

Furthermore, when the brake pedal 19a is not stepped on, as shown in FIG. 13, in the range of time where Tast≦Tast2 holds (i.e. until the time period corresponding to Tast2 has elapsed after the start of the engine 3), the brake-off value PB_cmd_pg of the target intake pipe pressure is set to a value lower than values set for the range of time where Tast2<Tast holds (i.e. after the lapse of a time period corresponding to Tast2) so that by controlling the intake pipe pressure PB to the target intake pipe pressure PB_cmd set as above, evaporative fuel adsorbed by the canister 18a of the evaporative fuel processing system 18 during stoppage of the engine 3 can be delivered into the intake pipe 10 quickly and effectively.

Furthermore, the brake-off value PB_cmd_pg of the target intake pipe pressure is set to a lower value as the intake air temperature TA is higher, that is, as the generation rate of evaporative fuel in the fuel tank 18c is larger, so that even when the generation rate of evaporative fuel is large, and a large amount of evaporative fuel has been adsorbed by the canister 18a, it is possible to deliver the evaporative fuel into the intake pipe 10 quickly and effectively. For the same reason, compared with the case in which the intake pipe pressure PB is held at a fixed value that is capable of cooping with a state where the generation rate of evaporative fuel is maximum, irrespective of the generation rate of the evaporative fuel, it is possible to reduce the pumping loss, thereby making it possible to improve fuel economy. Further, as a matter of course, compared with the case where when a large amount of evaporative fuel is generated, the valve lift control is stopped to switch the same to the intake air amount control by the throttle valve control, and the intake pipe pressure PB is controlled to be more negative, it is possible to improve fuel economy.

Further, when the brake pedal 19a is stepped on, as shown in FIG. 14, the brake-on value PB_cmd_br is set to a lower value as the vehicle speed VP is higher, in the range where VP1≦VP≦VP2 holds, so that the assisting force for making up for the braking force can be properly ensured according to the varying vehicle speed. Consequently, it is possible to secure the assisting force and reduce the pumping loss by avoiding generation of unnecessary negative pressure in a compatible manner.

Furthermore, the brake-on value PB_cmd_br is set to a lower value (i.e. value not higher than the predetermined value PB2) than the brake-off value PB_cmd_pg (value set within the range of time where Tast2<Tast holds) in the normal operating condition of the engine 3, and hence when the engine 3 is placed in the normal operating condition after termination of the process for introducing evaporative fuel into the intake pipe 10 immediately after the start of the engine 3, if the brake pedal 19a is not stepped on, the intake pipe pressure PB is controlled to a higher value, whereby it is possible to reduce the pumping loss to thereby improve fuel economy, whereas if the brake pedal 19a is stepped on, it is possible to properly secure a necessary assisting force.

Although in the first embodiment, the intake air temperature TA is employed as a generation rate parameter indicative of the generation rate of evaporative fuel, by way of example, the generation rate parameter is not necessarily limited to this, but it may be any suitable parameter indicative of the generation rate of evaporative fuel. For example, a parameter indicative of a state of sway of fuel in the fuel tank 18c can be used as the generation rate parameter.

Further, although in the first embodiment, the non-interacting input vector U is calculated by the equation (9), the control system 1 may be configured such that the non-interacting input vector U is calculated by the equation (26) in place of the equation (9).

Furthermore, although in the first embodiment, as expressed by the equations (2) to (9), TH_cmd, i.e. one of the two non-interacting inputs, is determined according to the two non-interacting parameters Fth and Flf and the control amount PB, and Liftin_cmd, i.e. the other of the two non-interacting inputs, is determined according to the non-interacting parameter Flf and the control amount Gcyl, by way of example, the method for calculating the non-interacting inputs is not necessarily limited to this, but it may be any suitable method that is capable of calculating the non-interacting inputs according to at least either of a plurality of non-interacting parameters and a plurality of non-interacting inputs.

Further, although in the first embodiment, the two non-interacting inputs are calculated with the control algorithms including a control algorithm in which the response-specifying control algorithm and the non-interacting control algorithm are combined, by way of example, the control algorithms for calculating a plurality of non-interacting inputs are not necessarily limited to these, but they may be any suitable control algorithms including a non-interacting control algorithm, which are capable of calculating a plurality of control inputs as a plurality of respective non-interacting inputs that can eliminate mutual interaction for causing a plurality of control amounts to follow up a plurality of target values, respectively. For example, control algorithms may be employed which include a control algorithm in which a general feedback control algorithm, such as a PID control algorithm, and a non-interacting control algorithm are combined, or control algorithms may be employed which include a control algorithm in which a response-specifying control algorithm and a non-interacting control algorithm are combined.

Next, a control system 1A according to a second embodiment of the present invention will be described with reference to FIG. 25. It should be noted that in the following description, component parts thereof identical to those of the first embodiment are designated by identical reference numerals, and detailed description thereof is omitted.

Figure 25:
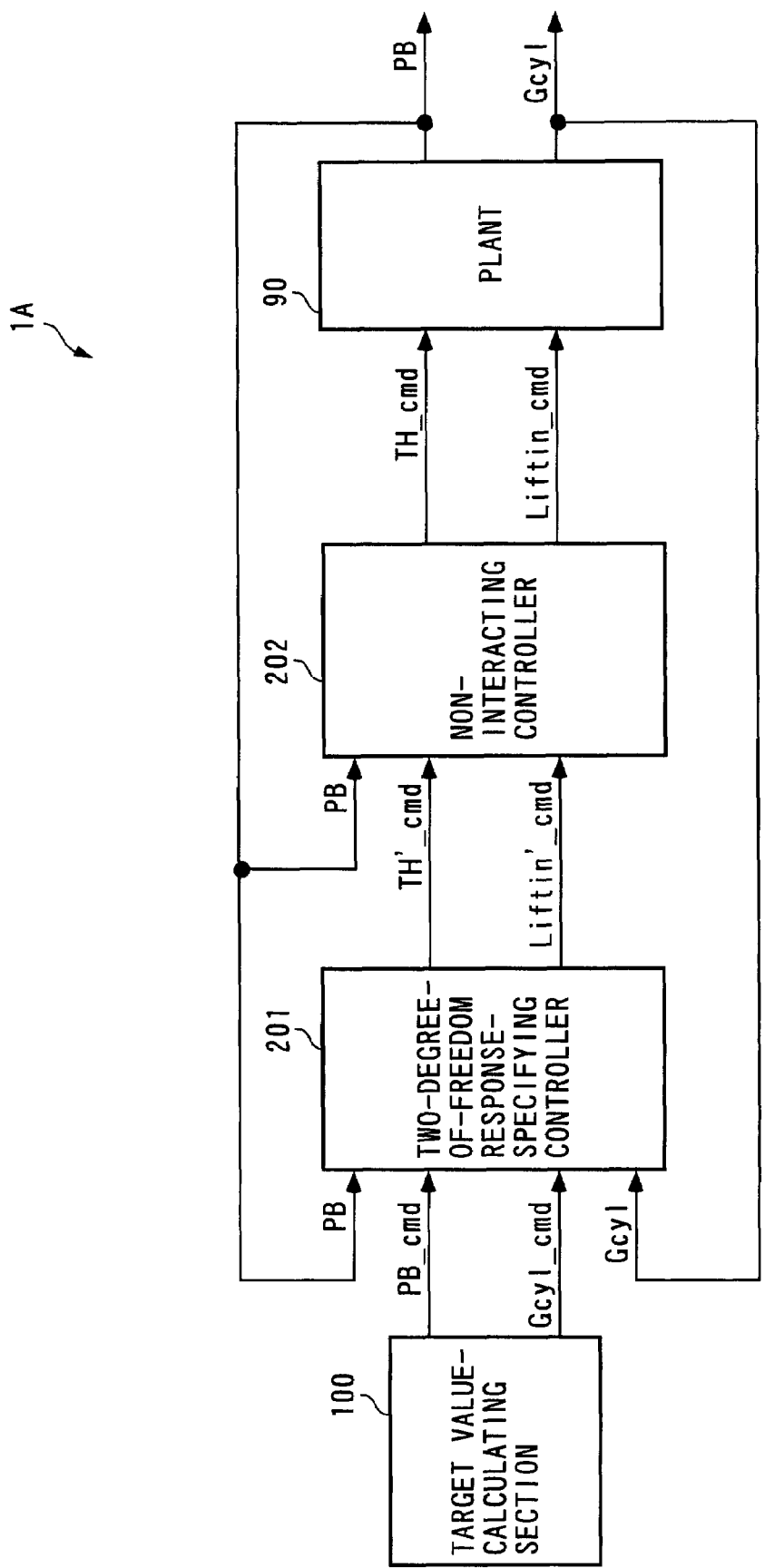
FIG. 25 is a functional block diagram schematically showing the configuration of a control system according to a second embodiment of the present invention.

As shown in FIG. 25, the control system 1A is provided for controlling the plant 90 identical to the plant in the first embodiment, and is comprised of the target value-calculating section 100, a two-degree-of-freedom response-specifying controller 201, and a non-interacting controller 202. It should be noted that in the present embodiment, the two controllers 201 and 202 correspond to the non-interacting input-calculating means.

The two-degree-of-freedom response-specifying controller 201 calculates a non-interacting input vector W with a target value filter-type two-degree-of-freedom response-specifying control algorithm expressed by the following equations (41) to (49).

$$W(k) = \begin{bmatrix} TH'\_\text{cmd}(k) \\ Liftin'\_\text{cmd}(k) \end{bmatrix} \quad (41)$$
$$= Weq(k) + Wrch(k) + Wadp(k)$$

-continued $$Weq(k) = \begin{bmatrix} (1-Sp) \cdot PB(k) + Sp \cdot PB(k-1) + \\ PB\_cmd\_f(k) + (Sp-1) \cdot PB\_cmd\_f(k-1) - Sp \cdot PB\_cmd\_f(k-2) \\ (1-Sg) \cdot Gcyl(k) + Sg \cdot Gcyl(k-1) + \\ Gcyl\_cmd\_f(k) + (Sg-1) \cdot Gcyl\_cmd\_f(k-1) - Sg \cdot Gcyl\_cmd\_f(k-2) \end{bmatrix} \quad (42)$$

$$Wrch(k) = \begin{bmatrix} -\text{Krch}\_p \cdot \sigma p(k) \\ -\text{Krch}\_g \cdot \sigma g(k) \end{bmatrix} \quad (43)$$

$$Wadp(k) = \begin{bmatrix} -\text{Kadp}\_p \cdot \sum_{i=0}^{k} \sigma p(i) \\ -\text{Kadp}\_g \cdot \sum_{i=0}^{k} \sigma g(i) \end{bmatrix} \quad (44)$$

$$\sigma(k) = \begin{bmatrix} \sigma p(k) \\ \sigma g(k) \end{bmatrix} \quad (45)$$
$$= \begin{bmatrix} Ep(k) + Sp \cdot Ep(k-1) \\ Eg(k) + Sg \cdot Eg(k-1) \end{bmatrix}$$
$$= E(k) + S \cdot E(k-1)$$

$$S = \begin{bmatrix} Sp & 0 \\ 0 & Sg \end{bmatrix} \quad (46)$$

$$E(k) = \begin{bmatrix} Ep(k) \\ Eg(k) \end{bmatrix} \quad (47)$$
$$= \begin{bmatrix} PB(k) - PB\_cmd\_f(k-1) \\ Gcyl(k) - Gcyl\_cmd\_f(k-1) \end{bmatrix}$$

$$PB\_cmd\_f(k) = -Rp \cdot PB\_cmd\_f(k-1) + (1-Rp) \cdot PB\_cmd(k) \quad (48)$$

$$Gcyl\_cmd\_f(k) = -Rg \cdot Gcyl\_cmd\_f(k-1) + (1+Rg) \cdot Gcyl\_cmd(k) \quad (49)$$

In the above-described equation (42), PB_cmd_f and Gcyl_cmd_f represent filtered values of a target intake pipe pressure and a target intake air amount, respectively, and are calculated by the equations (48) and (49). In the equations (48) and (49), Rp and Rg represent target value response-specifying parameters, and are set to values which satisfy the relationship of $-1<Rp<0$ and that of $-1<Rg<0$, respectively. Further, in the equation (45), E represents a difference vector defined by the equation (47).

The above equations (41) to (49) are derived by applying the target value filter-type two-degree-of-freedom response-specifying control algorithm to the imaginary plant expressed by the aforementioned equation (28) such that the intake pipe pressure PB is caused to follow the target intake pipe pressure PB_cmd, and the intake air amount Gcyl is caused to follow the target intake air amount Gcyl_cmd.

Further, the non-interacting controller 202 calculates the non-interacting input vector U by the following equation (50), similarly to the non-interacting controller 102 described above.

In a variable mechanism control process performed by the control system 1A configured as above, the target throttle valve opening TH_cmd and the target valve lift Liftin_cmd are calculated in the step 32 in FIG. 15 by the aforementioned equations (41) to (50), and the other steps therein are carried out similarly to the variable mechanism control process according to the first embodiment.

Figure 26:
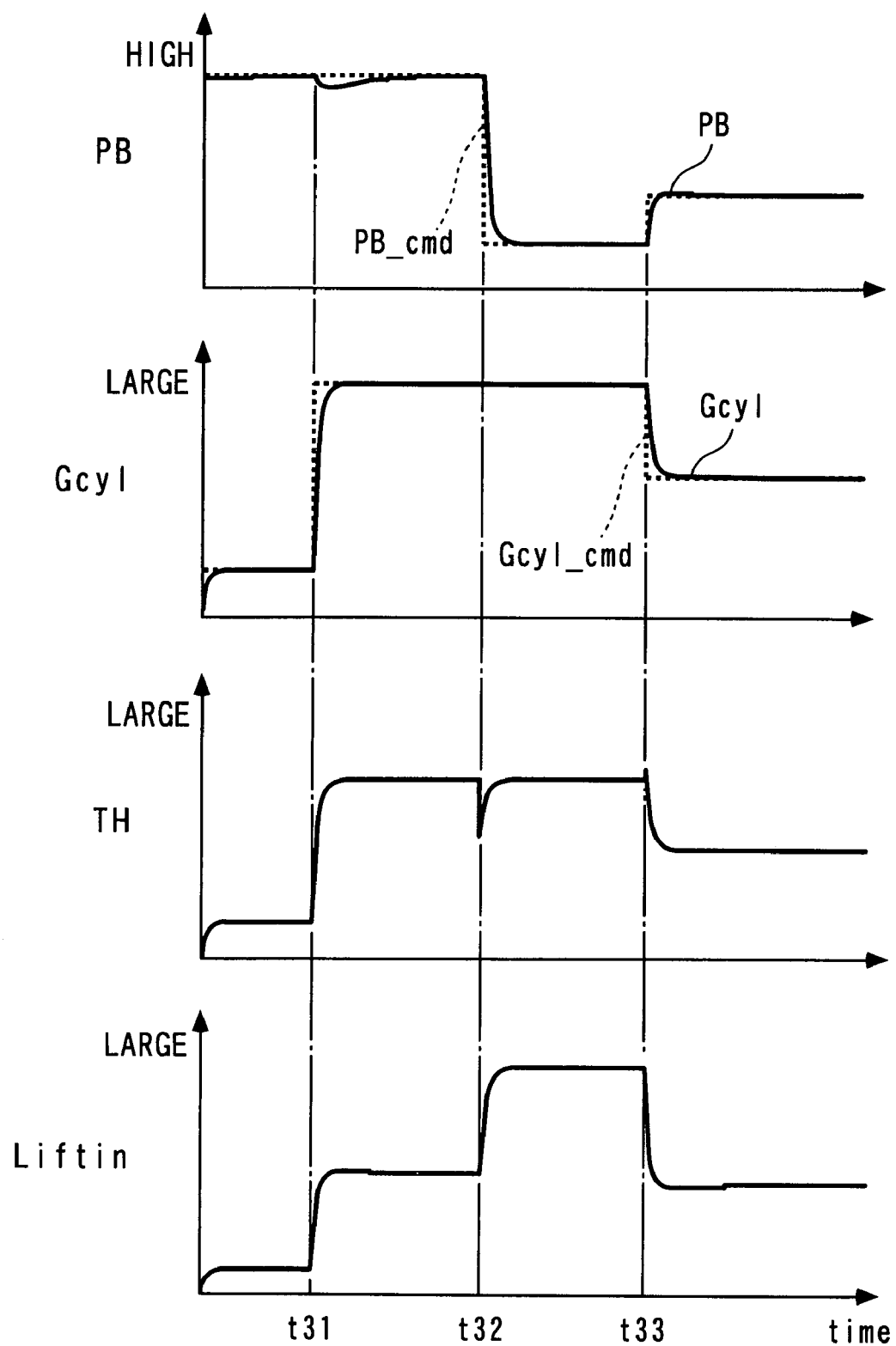
FIG. 26 is a timing chart showing a result of a simulation of variable mechanism control executed by the control system according to the second embodiment (in which there are modeling errors), by way of example.

Next, a description will be given of the results of simulations of variable mechanism control (hereinafter referred to as "the results of the control") performed by the control system 1A according to the second embodiment. FIG. 26 shows the results of the control, obtained when there are modeling errors, i.e. when calculation errors occur in the calculation of the non-interacting parameters Fth and Flf.

As is clear from FIG. 26, according to the results of the control, when the target intake air amount Gcyl_cmd is changed stepwise to a larger value in the state of the target intake pipe pressure PB_cmd being held constant (time t31), the degree of difference generated between the intake pipe pressure PB and the target intake pipe pressure PB_cmd is smaller than in the FIG. 23 results of the control by the first embodiment, obtained when there are modeling errors, and the intake air amount Gcyl is not overshot with respect to the target intake air amount Gcyl_cmd, so that the control accuracy is enhanced.

Further, it is apparent that when the target intake pipe pressure PB_cmd is changed stepwise to a lower value in the state of the target intake air amount Gcyl_cmd being held constant (time t32), differently from the FIG. 23 results of the control by the first embodiment, the intake pipe pressure PB is not undershot with respect to the target intake pipe pressure PB_cmd, and no difference is generated between the intake air amount Gcyl and the target intake air amount Gcyl_cmdn, so that the control accuracy is enhanced. What is more, it is apparent that the degree of change in the throttle valve opening TH caused by a change in the target intake pipe pressure PB_cmd is considerably smaller than in the (FIG. 23) results of the control by the first embodiment, so that controllability is further enhanced in view of the actual responsiveness of the throttle valve mechanism 11 being low.

Further, it is apparent that when the target intake pipe pressure PB_cmd is changed stepwise to a higher value and the target intake air amount Gcyl_cmd to a smaller value (time t33), although the intake pipe pressure PB is slightly overshot with respect to the target intake pipe pressure PB_cmd, the degree of the overshooting is considerably smaller than in the FIG. 23 results of the control by the first embodiment, and the intake air amount Gcyl is not undershot with respect to the target intake air amount Gcyl_cmd, so that the control accuracy is enhanced. Furthermore, it is apparent that since the degree of change in the throttle valve opening TH caused by a change in the target intake pipe pressure PB_cmd is considerably smaller than in the FIG. 23 results of the control by the first embodiment, so that controllability is $$U(k) = \begin{bmatrix} TH\_cmd(k) \\ Liftin\_cmd(k) \end{bmatrix} \quad (50)$$
$$= \begin{bmatrix} \dfrac{1}{Rt \cdot Fth(k)} \{-PB(k) + Rt \cdot Flf(k-1) \cdot Liftin\_cmd(k-1) + TH'\_cmd(k)\} \\ \dfrac{1}{Flf(k)} Liftin'\_cmd(k) \end{bmatrix}$$

further enhanced in view of the actual responsiveness of the throttle valve mechanism 11 being low.

According to the control system 1A of the second embodiment, configured as above, the non-interacting input vector U (i.e. the two non-interacting inputs TH_cmd and Liftin_cmd) is calculated with the control algorithm [equations (41) to (50)] in which the target value filter-type two-degree-of-freedom response-specifying control algorithm and the non-interacting control algorithm are combined, so that similarly to the control system 1 of the first embodiment, it is possible to cause the intake pipe pressure PB and the intake air amount Gcyl to accurately follow the target intake pipe pressure PB_cmd and the target intake air amount Gcyl_cmd, respectively, while eliminating the mutual interaction.

Furthermore, since the follow-up input vector W (i.e. the two follow-up inputs TH'_cmd and Liftin'_cmd) is calculated with the target value filter-type two-degree-of-freedom response-specifying control algorithm expressed by the equations (41) to (49), it is possible not only to enhance a disturbance-suppressing capability and suppress degradation of the controllability due to modeling errors with the response-specifying control algorithm [equations (41) to (47)] but also to calculate two follow-up inputs TH'_cmd and Gcyl'_cmd as values capable of moderating the response of the measured values PB and Gcyl to the two target values PB_cmd and Gcyl_cmd with the target value filter algorithm [equations (48) and (49)]. This makes it possible to calculate the non-interacting input vector U, that is, the target throttle valve opening TH_cmd and the target valve lift Liftin_cmd as values small in the amounts of change and the rates of change thereof while ensuring their high disturbance-suppressing capabilities.

As a result, even when differences occur between the intake pipe pressure PB and the target intake pipe pressure PB_cmd, and between the intake air amount Gcyl and the target intake air amount Gcyl_cmd, due to modeling errors, that is, calculation errors in the non-interacting parameters Fth and Flf, it is possible to hold the amounts of change and the rates of change in the target values PB_cmd and Gcyl_cmd at small values, and properly suppress increases in the differences by the high disturbance-suppressing capabilities of the target values PB_cmd and Gcyl_cmd. This makes it possible to further enhance controllability and control accuracy.

Although in the second embodiment, the control algorithm in which the target value filter algorithm and the response-specifying control algorithm are combined is employed as the two-degree-of-freedom control algorithm, by way of example, the two-degree-of-freedom control algorithm is not necessarily limited to this, but it may be any suitable control algorithm in which a target value filter algorithm and a feedback control algorithm are combined. For example, a control algorithm in which a target value filter algorithm and a PID control algorithm are combined may be employed.

Next, a control system 1B according to a third embodiment of the present invention will be described. It should be noted that in the following description, component parts thereof identical to those of the first embodiment are designated by identical reference numerals, and detailed description thereof is omitted.

Figure 27:
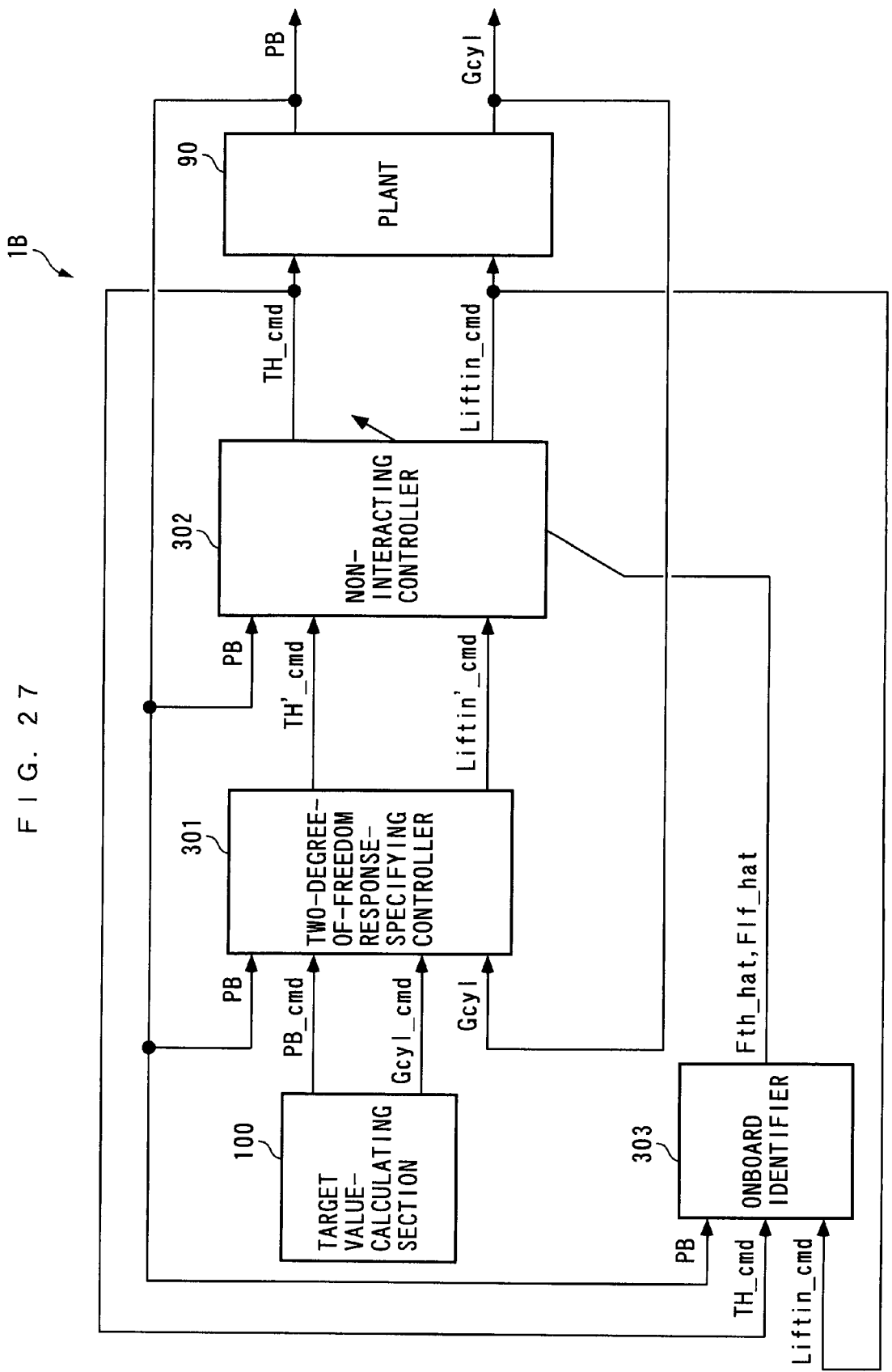
FIG. 27 is a functional block diagram schematically showing the configuration of a control system according to a third embodiment of the present invention.

Referring to FIG. 27, the control system 1B is provided for controlling the plant 90 identical to the plant in the first embodiment, and is comprised of the target value-calculating section 100, a two-degree-of-freedom response-specifying controller 301, a non-interacting controller 302, and an onboard identifier 303. It should be noted that in the present embodiment, the two controllers 301 and 302 correspond to the non-interacting input-calculating means, and the onboard identifier 303 to the identification means.

The onboard identifier 303 calculates identified values Fth_hat and Flf_hat of the non-interacting parameters Fth and Flf with a sequential identification algorithm employing a δ correcting method, expressed by the following equations (51) to (61).

$$\theta(k) = \theta base(k) + d\theta(k) \tag{51}$$

$$d\theta(k) = \delta \cdot d\theta(k-1) + \frac{P(k) \cdot \xi(k)}{1 + \xi^T(k) \cdot P(k) \cdot \xi(k)} e\_id(k) \tag{52}$$

$$e\_id(k) = \omega(k) - \omega\_hat(k) \tag{53}$$

$$\omega(k) = PB(k) - PB(k-1) \tag{54}$$

$$\omega\_hat(k) = \theta^T(k-1) \cdot \xi(k) \tag{55}$$

$$P(k+1) = \frac{1}{\lambda_1}\left(I - \frac{\lambda_2 \cdot P(k) \cdot \xi(k) \cdot \xi^T(k)}{\lambda_1 + \xi^T(k) \cdot P(k) \cdot \xi(k)}\right)P(k) \tag{56}$$

$$\theta^T(k) = [\text{Fth\_hat}(k), \text{Flf\_hat}(k)] \tag{57}$$

$$\xi^T(k) = [Rt \cdot \text{TH\_cmd}(k-1), Rt \cdot \text{Liftin\_cmd}(k-1)] \tag{58}$$

$$\theta base^T(k) = [\text{Fth\_base}(k), \text{Flf\_base}(k)] \tag{59}$$

$$d\theta^T(k) = [\text{dFth\_hat}(k), \text{dFlf\_hat}(k)] \tag{60}$$

$$\delta = \begin{bmatrix} \delta 1 & 0 \\ 0 & \delta 2 \end{bmatrix} \tag{61}$$

In the above-described equation (51), θ represents a vector of an identified value of a non-interacting parameter whose transposed matrix is defined by the equation (57), and θbase a vector of a reference value whose transposed matrix is defined by the equation (59). In the equation (59), Fth_base and Flf_base represent reference values of the non-interacting parameters Fth and Flf, respectively, and are calculated by searching tables and maps, as described hereinafter.

Further, in the aforementioned equation (51), dθ represents a correction term vector whose transposed matrix is defined by the equation (60). In the equation (60), dFth_hat and dFlf_hat represent correction terms (correction values) of the reference values Fth_base and Flf_base. The correction term vector dθ is calculated by the equation (52). In the equation (52), δ represents a forgetting vector defined by the equation (61). In the equation (61), δ1 and δ2 represent forgetting coefficients, and are set such that 0<δ1≦1 and 0<δ2≦1 hold.

Furthermore, in the equation (52), e_id represents a difference calculated by the equation (53). In the equation (53), ω represents an imaginary output, referred to hereinafter, and is calculated by the equation (54). Further, in the equation (53), ω_hat represents an estimated value of the imaginary output, and is calculated by the equation (55). In the equation (55), ζ represents a vector whose transposed matrix is defined by the equation (58).

Further, in the equation (52), P represents a square matrix of order 2 defined by the equation (56). In the equation (56), I represents a unit matrix of order 2, and λ1 and λ2 weighting parameters, respectively.

In the identification algorithm configured as above, one of the following identification algorithms is selected according to settings of the weighting parameters λ1 and λ2 in the equation (56),:

λ1=1, λ2=0: fixed gain algorithm;

λ1=1, λ2=1: least-squares method algorithm;

λ1=1, λ2=λ: progressively decreasing gain algorithm; and
λ1=λ, λ2=1: weighted least-squares method algorithm,
wherein λ represents a predetermined value set such that 0<λ<1 holds.

It should be noted that in the onboard identifier 303 according to the present embodiment, the weighted least-squares method algorithm is employed so as to optimally secure both the accuracy of identification and a follow-up rate at which the vector θ follows an optimal value.

The above-described identification algorithm is derived as described hereinafter. First, by shifting the aforementioned equation (18) toward the past side by the amount corresponding to one discrete time period, and replacing the non-interacting parameters Fth and Flf by the identified values Fth_hat and Flf_hat, the following up equation (62) is obtained.

$$PB(k) = PB(k-1) + Rt \cdot \text{Fth\_hat}(k-1) \cdot \text{TH\_cmd}(k-1) - Rt \cdot \text{Flf\_hat}(k-1) \cdot \text{Liftin\_cmd}(k-1) \quad (62)$$

In the equation (62), if PB(k−1) on the right side thereof is moved to the left side thereof, the following equation (63) is obtained.

$$PB(k) - PB(k-1) = Rt \cdot \text{Fth\_hat}(k-1) \cdot \text{TH\_cmd}(k-1) - Rt \cdot \text{Flf\_hat}(k-1) \cdot \text{Liftin\_cmd}(k-1) \quad (63)$$

In the equation (63), if the left side thereof is defined as ω, and the right side thereof as ω_hat, the aforementioned equations (54) and (55) are obtained. Here, if ω is considered as an imaginary output of an imaginary plant, and ω_hat as an estimated value of the imaginary output, it is possible to consider the equation (63) as a model of the imaginary plant. Therefore, when the sequential identification algorithm employing the δ correcting method is applied so as to identify model parameters of the model of the imaginary plant such that the difference e_id between the imaginary output ω and the estimated value ω_hat of the imaginary output is minimized, the aforementioned equations (51) to (61) are derived.

Further, the two-degree-of-freedom response-specifying controller 301 calculates the follow-up input vector W with a control algorithm similar to the control algorithm for the above-described two-degree-of-freedom response-specifying controller 201, that is, with the target value filter-type two-degree-of-freedom response-specifying control algorithm expressed by the aforementioned equations (41) to (49).

Furthermore, the non-interacting controller 302 calculates the non-interacting input vector U with the following equation (64). The equation (64) corresponds to the equation obtained by replacing the non-interacting parameters Fth and Flf by the identified values Fth_hat and Flf_hat.

Figure 10:
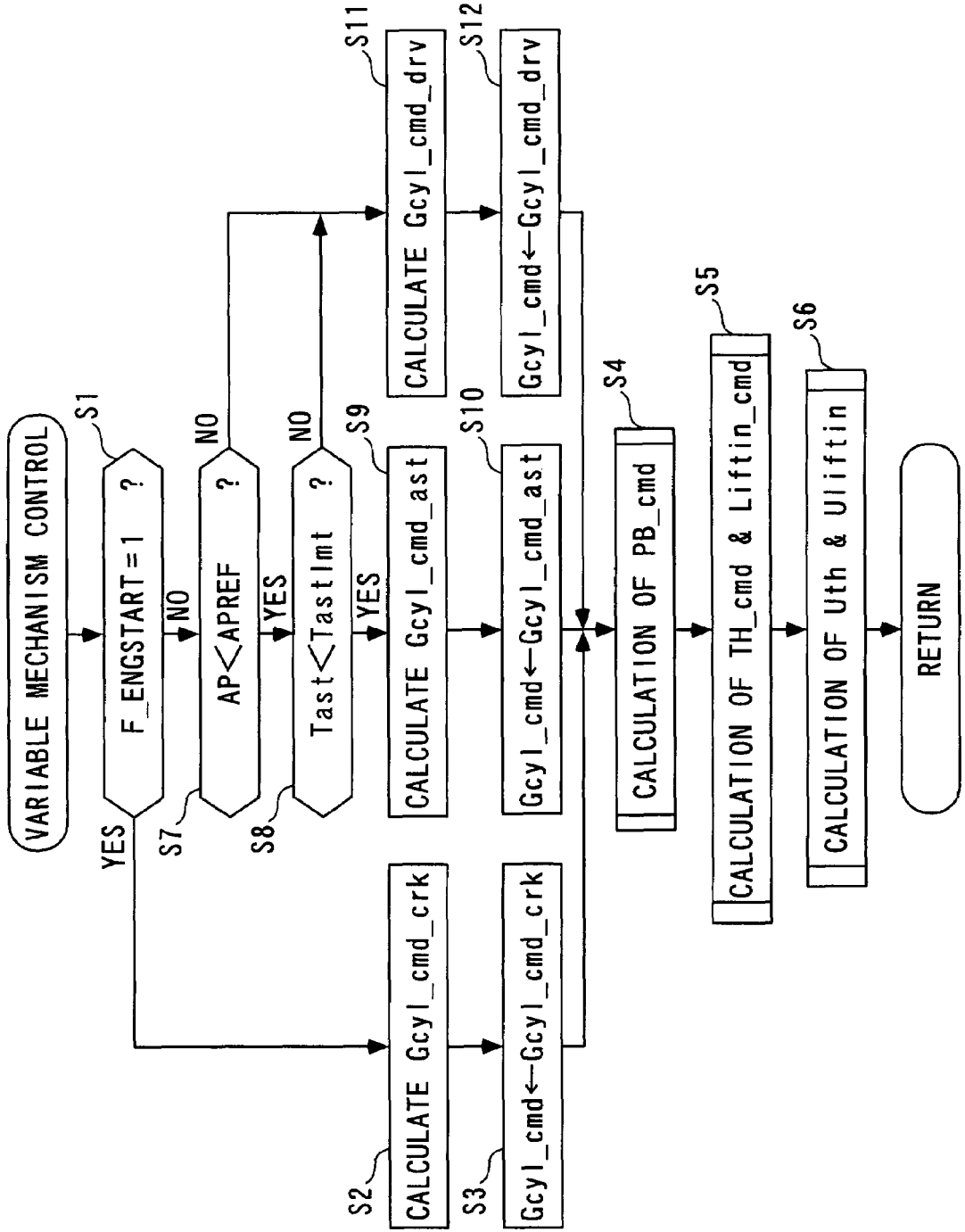
FIG. 10 is a flowchart showing a variable mechanism control process.

The variable mechanism control process carried out by the control system 1B configured as above is different from the variable mechanism control process according to the first embodiment only in the process performed in the aforementioned step 5 appearing in FIG. 10, and the other steps are performed similarly to the variable mechanism control process according to the first embodiment. Therefore, the following description will be given only of the different point.

Figure 28:
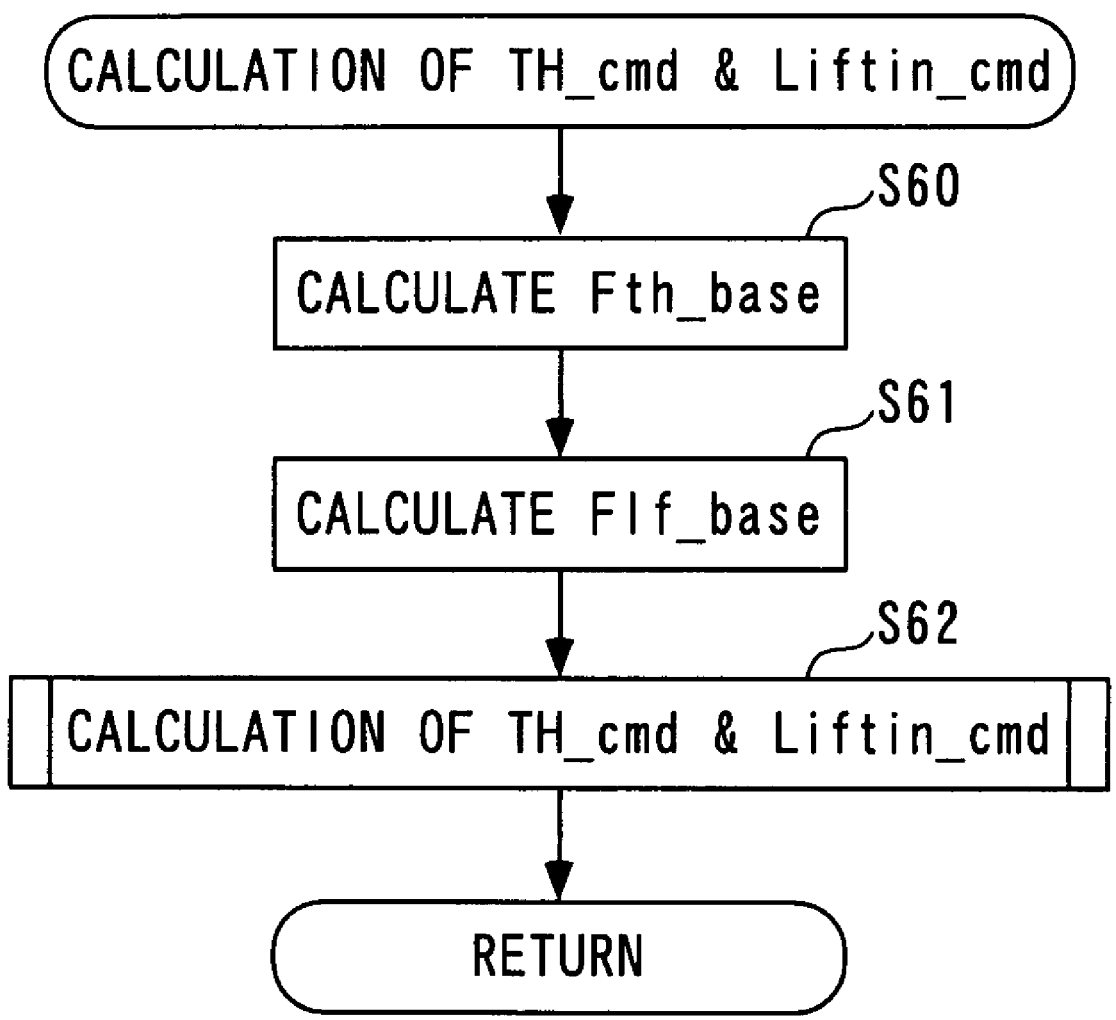
FIG. 28 is a flowchart showing a process for calculating the target throttle valve opening TH_cmd and the target valve lift Liftin_cmd, performed by the control system according to the third embodiment.

More specifically, in the variable mechanism control process according to the present embodiment, in the step 5 appearing in FIG. 10, the target throttle valve opening TH_cmd and the target valve lift Liftin_cmd are calculated, as shown in FIG. 28.

Figure 29:
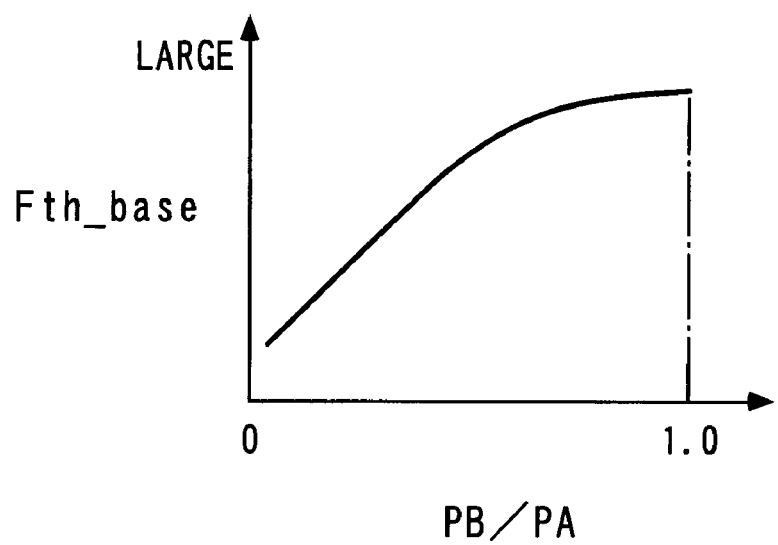
FIG. 29 is a diagram showing a table for use in calculating a reference value Fth_base of the non-interacting parameter, by way of example.

First, in a step 60, the reference value Fth_base of the non-interacting parameter Fth by searching a table shown in FIG. 29 according to the ratio PB/PA between the intake pipe pressure PB and the atmospheric pressure PA. In this table, the reference value Fth_base is set to a larger value as the ratio PB/PA is closer to 1. The reason for this is the same as given in the description of the FIG. 16 map.

Figure 30:
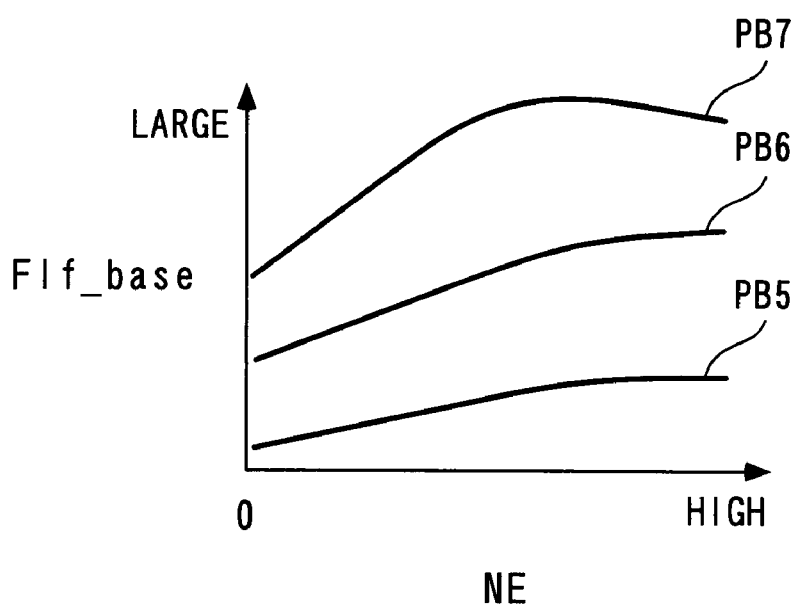
FIG. 30 is a diagram showing a map for use in calculating a reference value Flf_base of the non-interacting parameter, by way of example.

Then, the process proceeds to a step 61, wherein the reference value Flf_base of the non-interacting parameter Flf is calculated by searching a map shown in FIG. 30 according to the intake pipe pressure PB and the engine speed NE. In this map, the reference value Flf_base is set to a larger value as the intake pipe pressure PB is higher, and when PB=PB5 or when PB=PB6 holds, it is set to a larger value as the engine speed NE is higher. The reason for this is the same as given in the description of the FIG. 17 map.

Subsequently, the process proceeds to a step 62, wherein the target throttle valve opening TH_cmd and the target valve lift Liftin_cmd are calculated with the control algorithms expressed by the aforementioned equations (41) to (49), (51) to (61), and (64), followed by terminating the present process.

Figure 31:
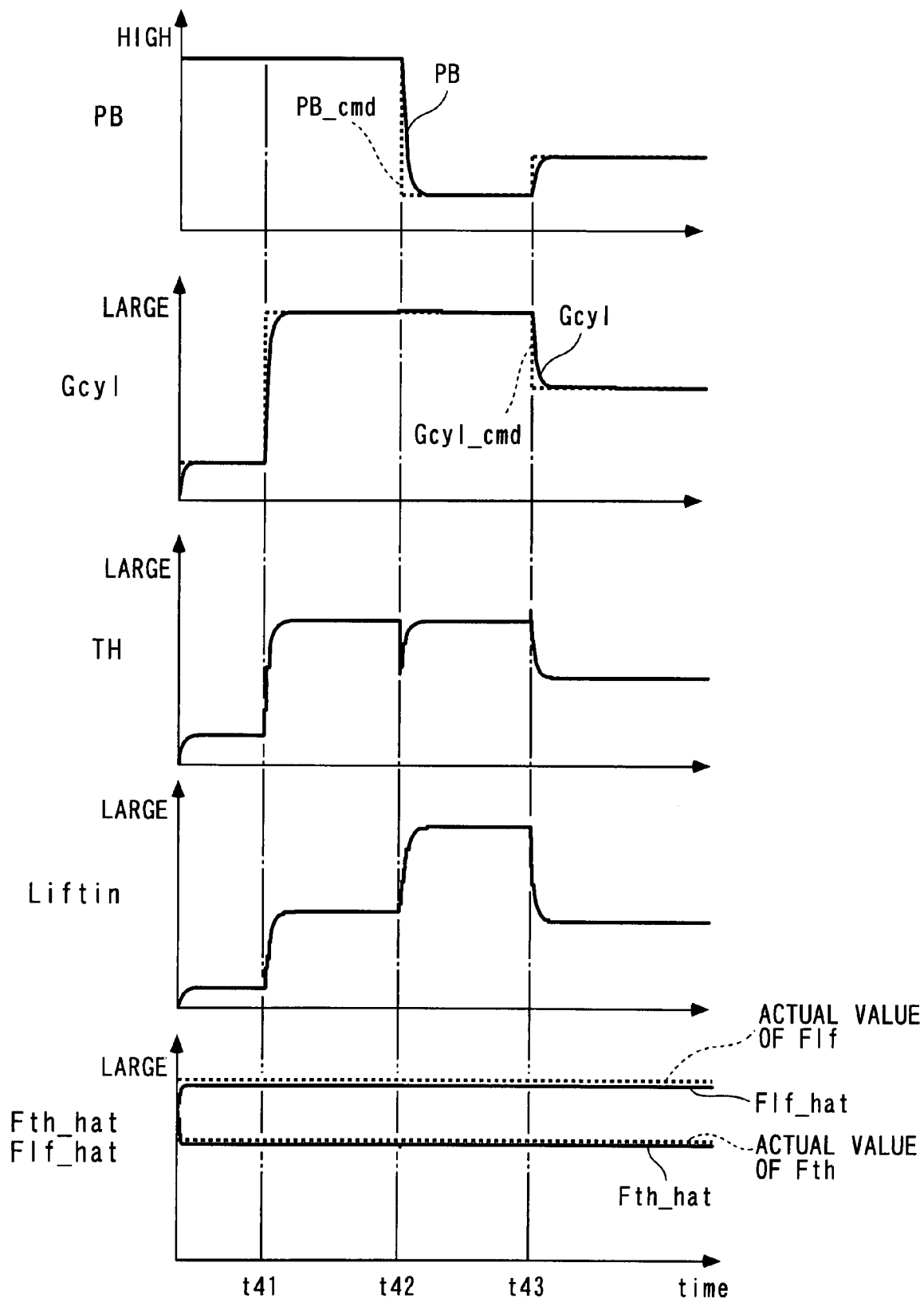
FIG. 31 is a timing chart showing a result of a simulation of variable mechanism control executed by the control system according to the third embodiment (in which there are modeling errors), by way of example.

Next, a description will be given of the results of simulations of variable mechanism control (hereinafter referred to as "the results of the control") performed by the control system 1B according to the third embodiment. FIG. 31 shows the results of the control, obtained when there are modeling errors, i.e. when the identified values Fth_hat and Flf_hat of the non-interacting parameters have deviated from actual values of the non-interacting parameters Fth and Flf at the start of the control.

As is apparent from FIG. 31, according to the results of the control, although the identified values Fth_hat and Flf_hat of the non-interacting parameters are calculated by the onboard identifier 303 as respective values very close to the actual values of the non-interacting parameters Fth and Flf, the identified values Fth_hat and Flf_hat do not converge to the actual values of the non-interacting parameters Fth and Flf, and slight errors occur. The errors occur because the changing behaviors of the two target values PB_cmd and Gcyl_cmd do not satisfy conditions for self-excitement, which are conditions for preventing occurrence of the above errors, since FIG.

$$U(k) = \begin{bmatrix} \text{TH\_cmd}(k) \\ \text{Liftin\_cmd}(k) \end{bmatrix} = \begin{bmatrix} \dfrac{1}{Rt \cdot \text{Fth\_hat}(k)} \{-PB(k) + Rt \cdot \text{Flf\_hat}(k) \cdot \text{Liftin\_cmd}(k-1) + TH'\_\text{cmd}(k)\} \\ \dfrac{1}{\text{Flf\_hat}(k)} Liftin'\_\text{cmd}(k) \end{bmatrix} \quad (64)$$

31 shows the results of simulations of the variable mechanism control. In contrast, in the actual control, the two target values PB_cmd and Gcyl_cmd satisfy the above conditions for self-excitement, since they exhibit changing behaviors including various frequency components, so that in accordance with the progress of the variable mechanism control, the identified values Fth_hat and Flf_hat are calculated as values converging to the actual values of the non-interacting parameters Fth and Flf, respectively.

Further, according to the results of the control, when the target intake air amount Gcyl_cmd is changed stepwise to a larger value in the state of the target intake pipe pressure PB_cmd being held constant (time t41), the intake air amount Gcyl is not overshot with respect to the target intake air amount Gcyl_cmd, and no difference is generated between the intake pipe pressure PB and the target intake pipe pressure PB_cmd. Therefore, it is apparent from comparison with the (FIG. 26) results of the control by the second embodiment, that the control accuracy is enhanced.

Furthermore, it is apparent that when the target intake pipe pressure PB_cmd is changed stepwise to a lower value in the state of the target intake air amount Gcyl_cmd being held constant (time t42), the intake pipe pressure PB is not undershot with respect to the target intake pipe pressure PB_cmd, and hence the control accuracy equivalent to the results of the control by the second embodiment is ensured. On the other hand, although a very small difference occurs between the intake air amount Gcyl and the target intake air amount Gcyl_cmd, the difference is caused by the calculation errors in the aforementioned identified values Fth_hat and Flf_hat, and as described above, the calculation errors do not occur in the actual control, so that no difference occurs between Gcyl and Gcyl_cmd, and hence it is possible to ensure the control accuracy equivalent to the results of the control by the second embodiment. What is more, it is apparent that the degree of change in the throttle valve opening TH caused by a change in the target intake pipe pressure PB_cmd is also equivalent to the results of the control by the second embodiment, and hence equivalent controllability is ensured.

Further, it is apparent that when the target intake pipe pressure PB_cmd is changed stepwise to a higher value and the target intake air amount Gcyl_cmd stepwise to a smaller value (time t43), the intake air amount Gcyl is not undershot with respect to the target intake air amount Gcyl_cmd, and the intake pipe pressure PB is not overshot with respect to the target intake pipe pressure PB_cmd, and therefore comparison with the results of the control by the second embodiment, in which slight overshooting occurs, shows that the control accuracy is enhanced. What is more, it is apparent that the degree of change in the throttle valve opening TH caused by the change in the target intake pipe pressure PB_cmd is also equivalent to that in the results of the control by the second embodiment, and hence equivalent controllability is ensured.

According to the control system 1B of the third embodiment, configured as above, the non-interacting input vector U (i.e. the two non-interacting inputs TH_cmd and Liftin_cmd) is calculated with the control algorithm [equations (41) to (49), (51) to (61), and (64)] in which the sequential identification algorithm, the target value filter-type two-degree-of-freedom response-specifying control algorithm, and the non-interacting control algorithm are combined, so that similarly to the above-described control systems 1 and 1A of the first and second embodiments, it is possible to cause the intake pipe pressure PB and the intake air amount Gcyl to accurately follow the target intake pipe pressure PB_cmd and the target intake air amount Gcyl_cmd, respectively, while eliminating the mutual interaction.

Furthermore, since the follow-up input vector W (i.e. the two follow-up inputs TH'_cmd and Gcyl'_cmd) is calculated with the target value filter-type two-degree-of-freedom response-specifying control algorithm, similarly to the aforementioned control system 1A according to the second embodiment, it is possible not only to enhance the disturbance-suppressing capability and suppress degradation of controllability due to modeling errors, with the response-specifying control algorithm [equations (41) to (47)], but also to calculate the two follow-up inputs TH'_cmd and Gcyl'_cmd as values capable of moderating the response of the measured values PB and Gcyl to the two target values PB_cmd and Gcyl_cmd, with the target value filter algorithm [equations (48) and (49)].

Furthermore, the identified values Fth_hat and Flf_hat of the non-interacting parameters are calculated by the onboard identifier 303 with the sequential identification algorithm [equations (51) to (61)] to which is applied the δ correcting method. More specifically, since the non-interacting parameters Fth and Flf, which can cause direct modeling errors in the plant model, are sequentially identified, it is possible to calculate the two non-interacting inputs TH_cmd and Liftin_cmd while compensating for the modeling errors quickly and properly. As a result, in the plant 90 in which the degree of the mutual interaction between TH_cmd and Liftin_cmd and PB and Gcyl is considerably large, as in the present embodiment, even when modeling errors are caused by aging and variations between individual component parts, it is possible to compensate for modeling errors quickly and properly, thereby making it possible to ensure excellent controllability and control accuracy.

What is more, since the sequential identification algorithm to which is applied the δ correcting method is used, the identified values Fth_hat and Flf_hat of the non-interacting parameters are calculated as values close to the reference values Fth_base and Flf_base thereof immediately after the start of identification, thereby making it possible to avoid erroneous identification. Furthermore, the correction term vector dθ is multiplied by the forgetting coefficient vector δ, whereby predetermined forgetting effects are added to the correction term vector dθ, and the identified values Fth_hat and Flf_hat are identified in a state bound to the vicinity of the reference values Fth_base and Flf_base. Therefore, it is possible to avoid a phenomenon in which the absolute values of the identified values Fth_hat and Flf_hat increase to cause the identified values to become erroneous ones, that is, a drift phenomenon of the non-interacting parameters Fth and Flf, thereby making it possible to ensure the stability of the control system and enhance the accuracy of the identification. As described above, controllability and control accuracy can be further improved than in the control system 1A according to the second embodiment.

Although in the third embodiment, the identification algorithm (weighted sequential least-squares method algorithm) to which is applied the δ correcting method is used as the sequential identification algorithm, by way of example, the sequential identification algorithm is not necessarily limited to this, but it may be any suitable identification algorithm that is capable of sequentially identifying the identified values Fth_hat and Flf_hat of the non-interacting parameters. For example, the aforementioned fixed gain algorithm and a normal least-squares method algorithm may be employed.

Further, although in the third embodiment, the identified values Fth_hat and Flf_hat of the non-interacting parameters Fth and Flf are calculated by the equations (51) to (61) according to the non-interacting inputs TH_cmd and Liftin_cmd as control inputs, the intake pipe pressure PB as a control amount, and the engine speed NE and the atmospheric pressure PA as internal variables of the plant, by way of example, the method of calculating the identified values of the non-interacting parameters is not necessarily limited to this, but it may be any suitable identification method that is capable of sequentially identifying the identified values according to at least one of a plurality of non-interacting inputs, a plurality of control amounts, and internal variables of the plant.

Furthermore, although in the third embodiment, the identified values Fth_hat and Flf_hat of the non-interacting parameters Fth and Flf are calculated by the equations (51) to (61) according to the non-interacting inputs TH_cmd and Liftin_cmd as control inputs, the intake pipe pressure PB as a control amount, and the engine speed NE and the atmospheric pressure PA as operating condition parameters, the method of calculating the identified values of the non-interacting parameters is not necessarily limited to this, but it may be any suitable identification method that is capable of sequentially identifying the identified values according to at least one of a plurality of non-interacting inputs, a plurality of control amounts, and operating condition parameters. Further, the operating condition parameters are not necessarily limited to the engine speed NE and the atmospheric pressure PA, but they may be any suitable parameters indicative of the operating conditions of the engine 3.

Next, a control system 1C according to a fourth embodiment of the present invention will be described with reference to FIGS. 32 and 33. It should be noted that in the following description, component parts thereof identical to those of the above-described first embodiment are designated by identical reference numerals, and detailed description thereof is omitted. The control system 1C is provided for carrying out EGR control and boost pressure control of an engine 3A. The engine 3A is implemented by a diesel engine having no throttle valve mechanism, and includes a turbocharger system 15, and an EGR control valve 16.

The turbocharger system 15 (supercharger) is comprised of a compressor blade 15a housed in a compressor housing provided in an intermediate portion of the intake pipe 10, a turbine blade 15b housed in a turbine housing provided in an intermediate portion of an exhaust pipe 14, a shaft 15c integrally formed with the two blades 15a and 15b for connection thereof, and a wastegate valve 15d.

In the turbocharger system 15, when the turbine blade 15b is driven for rotation by exhaust gases flowing through the exhaust pipe 14, the compressor blade 15a integrally formed with the turbine blade 15b is also rotated, whereby intake air within the intake pipe 19 is pressurized, that is, supercharging is carried out.

On the other hand, the wastegate valve 15d is provided for opening and closing a bypass exhaust passage 14a that bypasses the turbine blade 15b disposed across the exhaust pipe 14, and is implemented by a solenoid control valve connected to the ECU 2. The wastegate valve 15d changes the degree of opening thereof in response to a boost pressure control input Upb, described hereinafter, supplied from the ECU 2, to thereby change the flow rate of exhaust gases flowing through the bypass exhaust passage 14a, in other words, the flow rate of exhaust gases for driving the turbine blade 15b, thereby changing the boost pressure. Thus, the boost pressure is controlled.

Figure 32:
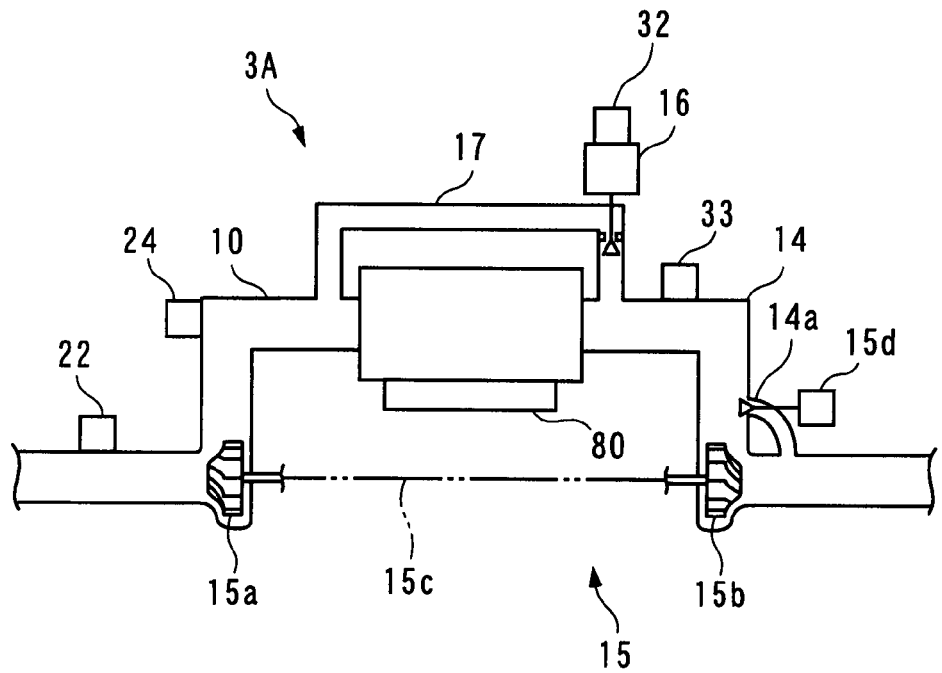
FIG. 32 is a diagram schematically showing the arrangement of an internal combustion engine to which is applied a control system according to a fourth embodiment of the present invention.
Figure 33:
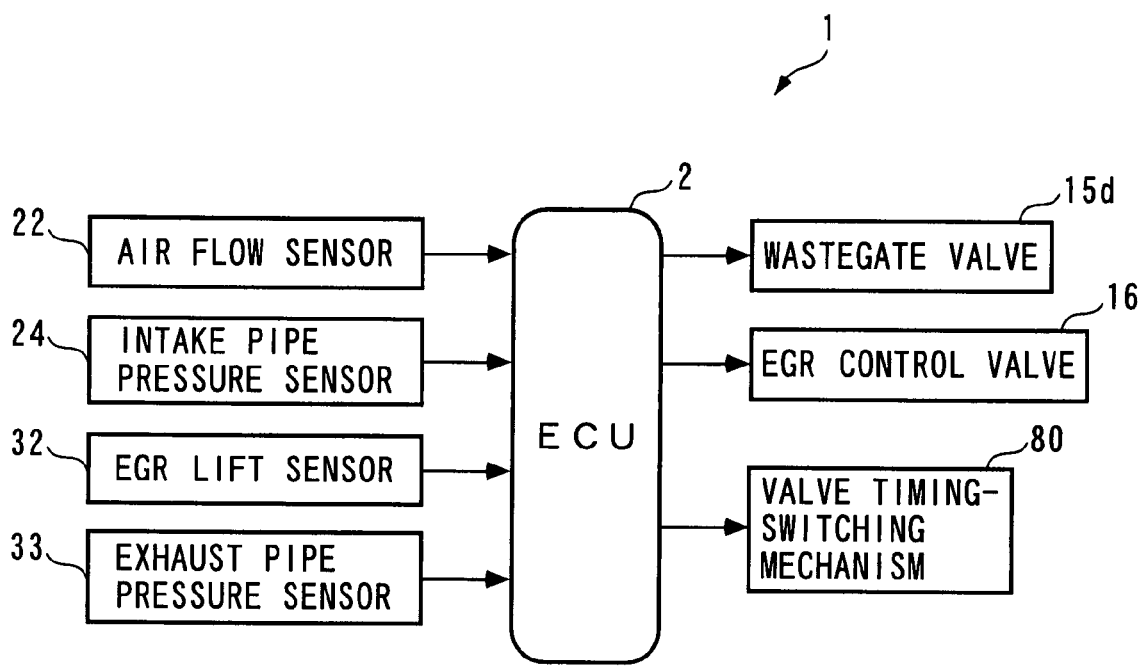
FIG. 33 is a block diagram schematically showing the configuration of the control system according to the fourth embodiment.

Further, as shown in FIG. 32, the intake pipe pressure sensor 24 according to the present embodiment is disposed in the intake pipe 10 at a location downstream of the compressor blade 15a, so that when boost pressure control is being performed, the intake pipe pressure PB detected by the intake pipe pressure sensor 24 becomes equal to the boost pressure. Therefore, in the following description, the intake pipe pressure PB is referred to as "the boost pressure PB".

On the other hand, the EGR control valve 16 (EGR device) is provided for opening and closing an EGR passage 17 extending between the intake pipe 10 and the exhaust pipe 14 to thereby perform EGR in which exhaust gases are recirculated from the exhaust pipe 14 to the intake pipe 10. The EGR control valve 16 is implemented by a linear solenoid valve connected to the ECU 2. When an EGR control input Uegr, described hereinafter, is inputted from the ECU 2, the EGR control valve 16 linearly changes a valve lift thereof, whereby the amount of recirculated gases, that is, an EGR amount Gegr, is controlled.

Further, the EGR control valve 16 has an EGR lift sensor 32 mounted thereto. The EGR lift sensor 32 detects the lift Legr of the EGR control valve 16 (hereinafter referred to as "the EGR lift Legr") and delivers a signal indicative of the sensed EGR lift Legr to the ECU 2.

On the other hand, an exhaust pipe pressure sensor 33 is disposed in the exhaust pipe 14 at a location upstream of the turbine blade 15b. The exhaust pipe pressure sensor 33 detects pressure Pex in the exhaust pipe 14 (hereinafter referred to as "the exhaust pipe pressure Pex"), and delivers a signal indicative of the sensed pressure Pex to the ECU 2. It should be noted that in the present embodiment, the exhaust pipe pressure Pex corresponds to an internal variable of the plant, pressure in the exhaust passage, and an operating condition parameter.

Further, the engine 3A is provided with a valve timing-switching mechanism 80. Although not shown, each intake cam of the engine 3A is comprised of a low-speed cam, and a high-speed cam having a higher cam nose than that of the low-speed cam. The valve timing-switching mechanism 80 switches the intake cam for actuating the intake valve to open and close the same, between the low-speed cam and the high-speed cam, to thereby switch the valve timing of the intake valve between a low-speed valve timing LO.VT and a high-speed valve timing HI.VT. The valve timing-switching mechanism 80 is electrically connected to the ECU 2 (see FIG. 33) such that the above switching operation is controlled by the ECU 2. It should be noted that the two valve timings LO.VT and HI.VT correspond to internal variables of the plant and operating condition parameters.

Furthermore, the ECU 2 calculates the amount Gin of intake air having passed near the air flow sensor 22 (hereinafter referred to as "the detected intake air amount Gin") based on the detection signal from the air flow sensor 22 by an equation formed by replacing Gth on the left side of the equation (12) by Gin.

Further, as described hereinafter, the ECU 2 controls the boost pressure PB and the EGR lift Legr, respectively, to thereby control the intake air amount Gcyl (fresh air amount) and the EGR amount Gegr.

Figure 34:
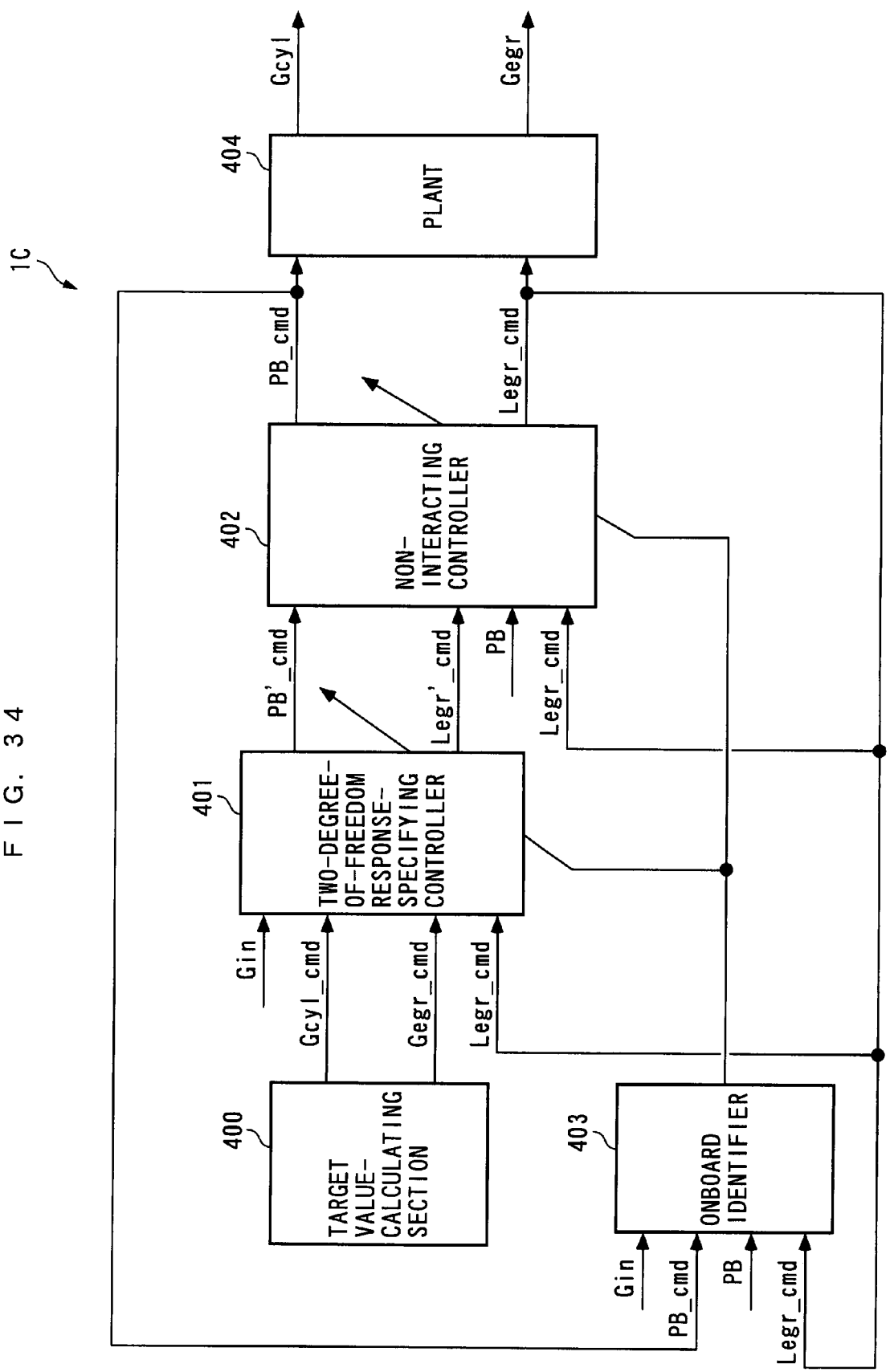
FIG. 34 is a functional block diagram schematically showing the configuration of the control system according to the fourth embodiment.

Next, a description will be given of the control system 1C according to present embodiment. Referring to FIG. 34, the control system 1C is provided for controlling a plant 404, and is comprised of a target value-calculating section 400, a two-degree-of-freedom response-specifying controller 401, a non-interacting controller 402, and an onboard identifier 403. It should be noted that in the present embodiment, the target value-calculating section 400 corresponds to the target value-setting means, the two controllers 401 and 402 to the non-interacting input-calculating means, and the onboard identifier 403 to the identification means.

Figure 35:
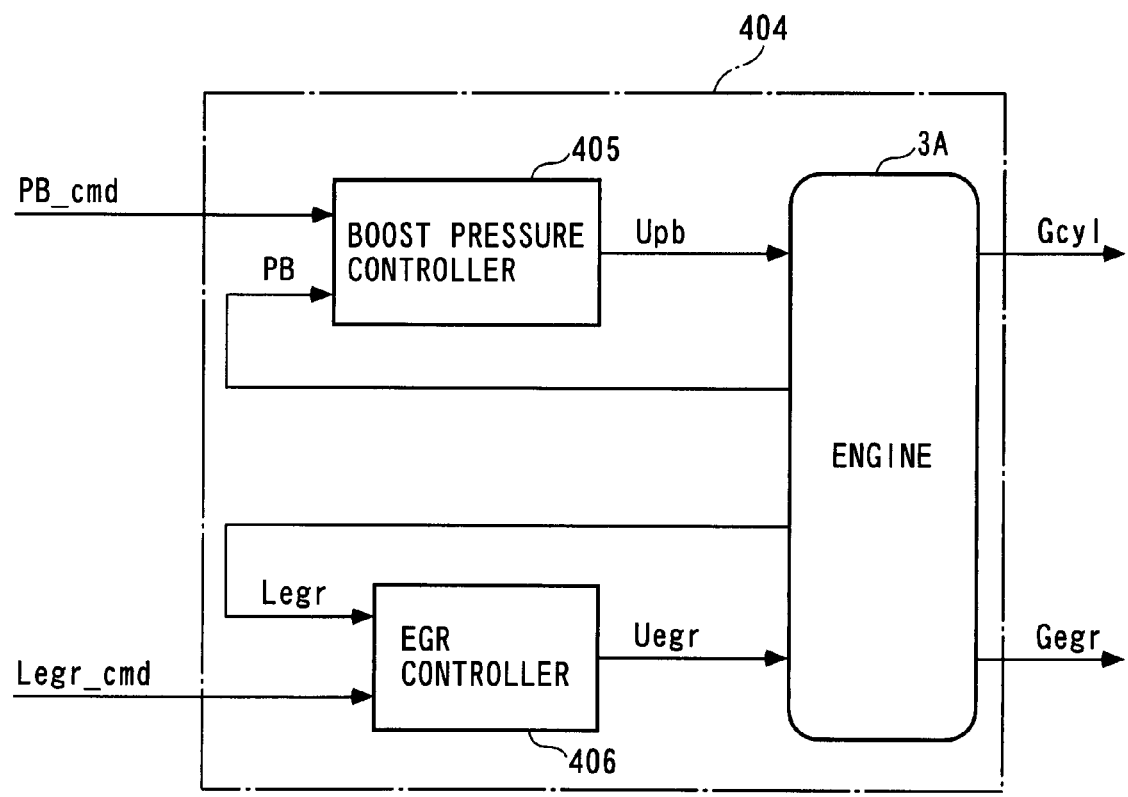
FIG. 35 is a block diagram useful in explaining a plant according to the fourth embodiment.

As shown in FIG. 35, the plant 404 is defined as an interacting system to which a target boost pressure PB_cmd and a target EGR lift Legr_cmd are inputted as control inputs, and for which the intake air amount Gcyl and the EGR amount Gegr are controlled as control amounts, and specifically, is comprised of a boost pressure controller 405, an EGR controller 406, and the engine 3A.

The target boost pressure PB_cmd and the target EGR lift Legr_cmd are target values of the boost pressure PB and the EGR lift Legr, respectively, and calculated as described hereinafter. It should be noted that in the present embodiment, the target boost pressure PB_cmd corresponds to a boost pressure control value, and the target EGR lift Legr_cmd to an EGR control value.

Further, the boost pressure controller 405 calculates the boost pressure control input Upb, although specific equations therefor are omitted, as a value for causing the boost pressure PB to follow the target boost pressure PB_cmd, with a target value filter-type two-degree-of-freedom response-specifying control algorithm similar to the control algorithm expressed by the equations (29) to (32), and the intake air amount Gcyl is controlled by inputting the boost pressure control input Upb to the wastegate valve 15d.

Furthermore, the EGR controller 406 calculates the EGR control input Uegr, although specific equations therefor are omitted, as a value for causing the EGR lift Legr to follow the target EGR lift Legr_cmd, with a target value filter-type two-degree-of-freedom response-specifying control algorithm similar to the control algorithm expressed by the equations (33) to (36), and the EGR amount Gegr is controlled by inputting the EGR control input Uegr to the EGR control valve 16.

In the plant 404 configured as above, when the boost pressure PB is controlled such that it follows the target boost pressure PB_cmd, both the intake air amount Gcyl and the EGR amount Gegr accordingly change. Still further, when the EGR lift Legr is controlled such that it follows the target EGR lift Legr_cmd, both the intake air amount Gcyl and the EGR amount Gegr accordingly change. That is, the plant 404 is configured as an interacting system in which a mutual interaction exists between the target boost pressure PB_cmd and the target EGR lift Legr_cmd as control inputs, and the intake air amount Gcyl and the EGR amount Gegr as control amounts.

Therefore, in the control system 1C according to the fourth embodiment, while avoiding the above-mentioned mutual interaction in the plant 404 of the interacting system configured as above, the target boost pressure PB_cmd and the target EGR lift Legr_cmd are calculated as control inputs i.e. non-interacting inputs that are capable of controlling both the intake air amount Gcyl and the EGR amount Gegr independently of each other. The target boost pressure PB_cmd and the target EGR lift Legr_cmd are calculated as follows. It should be noted that in the following description, vectors (W, U, X, A, B, C, S, σ, θ) and matrices in mathematical expressions are represented by the same notations and names as in the mathematical expressions in the first to third embodiments for convenience, since the vectors and the matrices are the same in capability and property thereof as inputs, coefficients, or functions, although elements constituting the vectors and the matrices in the mathematical expressions in the present embodiment are different from those in the first to third embodiments.

Figure 36:
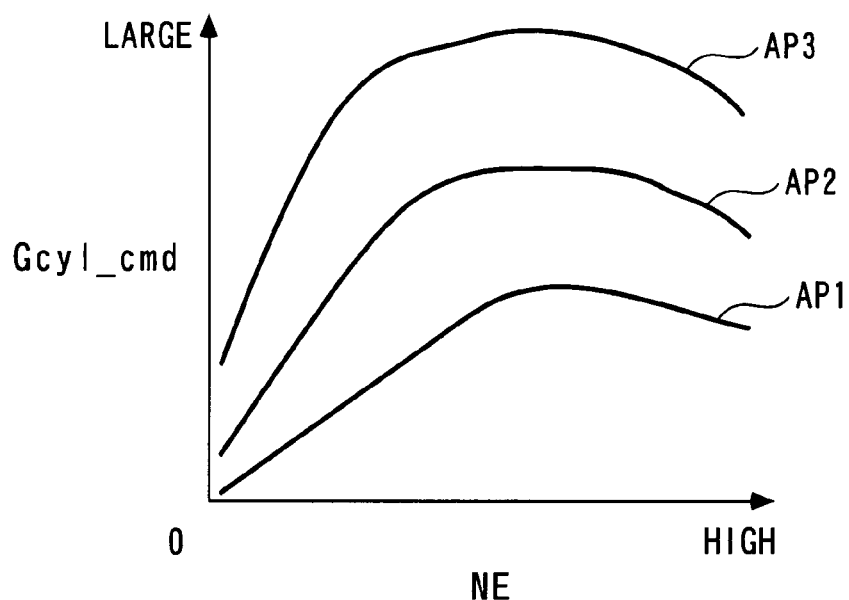
FIG. 36 is a diagram showing a map for use in calculating the target intake air amount Gcyl_cmd, by way of example.

More specifically, first, the target value-calculating section 400 calculates the target intake air amount Gcyl_cmd and a target EGR amount Gegr_cmd. In this case, the target intake air amount Gcyl_cmd is calculated by searching a map shown in FIG. 36 according to the engine speed NE and the accelerator pedal opening AP. As shown in FIG. 36, in this map, the target intake air amount Gcyl_cmd is set to a larger value as the accelerator pedal opening AP is larger. This is to control the intake air amount Gcyl to a larger value to meet drivers' demand for increase in driving force.

Figure 37:
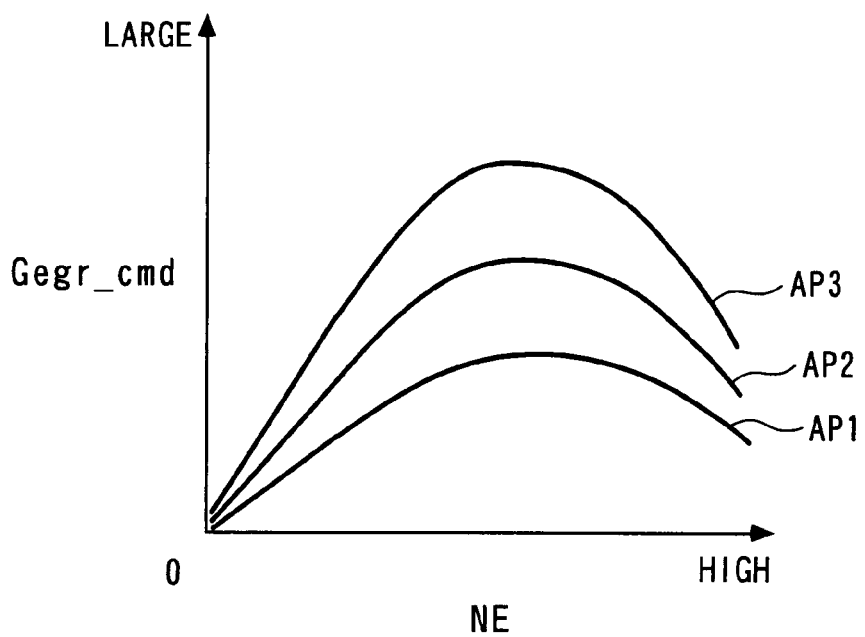
FIG. 37 is a diagram showing a map for use in calculating a target EGR amount Gegr_cmd, by way of example.

Further, the target EGR amount Gegr_cmd is calculated by searching a map shown in FIG. 37 according to the engine speed NE and the accelerator pedal opening AP. As shown in FIG. 37, in this map, the target EGR amount Gegr_cmd is set to a larger value as the accelerator pedal opening AP is larger. This is because as described above, the intake air amount Gcyl is controlled to a larger value as the accelerator pedal opening AP is larger, and hence the target EGR amount Gegr_cmd is set to a larger value to thereby accordingly increase the EGR amount Gegr as well. Further, the target EGR amount Gegr_cmd is set such that it has a largest value when the engine 3A is in a medium engine speed region. This is to reduce exhaust emissions by increasing the EGR amount Gegr, since the engine 3A is in an excellent combustion state in the medium engine speed region.

Then, the two-degree-of-freedom response-specifying controller 401 calculates the follow-up input vector W defined by the following equation (65) with a target value filter-type two-degree-of-freedom response-specifying control algorithm expressed by the following equations (66) to (74).

$$W(k) = \begin{bmatrix} PB'\_cmd(k) \\ Legr'\_cmd(k) \end{bmatrix} \quad (65)$$

$$W(k) = Weq(k) + Wrch(k) + Wadp(k) \quad (66)$$

$$Weq(k) = \begin{bmatrix} (1-Sg) \cdot Gin(k-1) + Sg \cdot Gin(k-2) + \\ Gcyl\_cmd\_f(k) + (Sg-1) \cdot Gcyl\_cmd\_f(k-1) - Sg \cdot Gcyl\_cmd\_f(k-2) \\ (1-Se) \cdot Heg\_hat(k) \cdot Legr\_cmd(k-1) + Se \cdot Heg\_hat(k) \cdot Legr\_cmd(k-2) + \\ Gegr\_cmd\_f(k) + (Se-1) \cdot Gegr\_cmd\_f(k-1) - Se \cdot Gegr\_cmd\_f(k-2) \end{bmatrix} \quad (67)$$

$$Wrch(k) = \begin{bmatrix} -Krch\_g \cdot \sigma g(k) \\ -Krch\_e \cdot \sigma e(k) \end{bmatrix} \quad (68)$$

-continued $$Wadp(k) = \begin{bmatrix} -\text{kadp\_g} \cdot \sum_{i=0}^{k} \sigma g(i) \\ -\text{kadp\_e} \cdot \sum_{i=0}^{k} \sigma e(i) \end{bmatrix} \quad (69)$$

$$\sigma(k) = \begin{bmatrix} \sigma g(k) \\ \sigma e(k) \end{bmatrix} \quad (70)$$

$$= \begin{bmatrix} Eg(k) + Sg \cdot Eg(k-1) \\ Ee(k) + Se \cdot Ee(k-1) \end{bmatrix}$$

$$= E(k) + S \cdot E(k-1)$$

$$S = \begin{bmatrix} Sg & 0 \\ 0 & Se \end{bmatrix} \quad (71)$$

$$E(k) = \begin{bmatrix} Eg(k) \\ Ee(k) \end{bmatrix} \quad (72)$$

$$= \begin{bmatrix} Gcyl(k) - Gcyl\_cmd\_f(k-1) \\ Gegr(k) - Gegr\_cmd\_f(k-1) \end{bmatrix}$$

$$= \begin{bmatrix} Gcyl(k) \\ Gegr(k) \end{bmatrix} - \begin{bmatrix} Gcyl\_cmd\_f(k-1) \\ Gegr\_cmd\_f(k-1) \end{bmatrix}$$

$$= \begin{bmatrix} Gin(k-1) \\ Heg(k-1) \cdot Legr\_cmd(k-1) \end{bmatrix} - \begin{bmatrix} Gcyl\_cmd\_f(k-1) \\ Gegr\_cmd\_f(k-1) \end{bmatrix}$$

$$Gcyl\_cmd\_f(k) = -Rg \cdot Gcyl\_cmd\_f(k-1) + (1+Rg) \cdot Gcyl\_cmd(k) \quad (73)$$

$$Gegr\_cmd\_f(k) = -Re \cdot Gegr\_cmd\_f(k-1) + (1+Re) \cdot Gegr\_cmd(k) \quad (74)$$

In the equation (65), PB'_cmd represents a follow-up input for causing the intake air amount Gcyl to follow the target intake air amount Gcyl_cmd, and Legr'_cmd represents a follow-up input for causing the EGR amount Gegr to follow the target EGR amount Gegr_cmd. As expressed by the equation (66), the follow-up input vector W is calculated as the sum of an equivalent control input vector Weq, a reaching law input vector Wrch, and an adaptive law input vector Wadp.

The equivalent control input vector Weq is calculated by the aforementioned equation (67). In the equation (67), Sg and Se represent switching function-setting parameters, respectively, and are set such that $-1<Sg<0$ and $-1<Se<0$ hold. Further, in the equation (67), Heg_hat represents an identified value of a non-interacting parameter Heg, described hereinafter, and is calculated by the onboard identifier 403, as described hereinafter. Further, in the equation (67), Gcyl_cmd_f and Gegr_cmd_f represent filtered values of the target intake air amount and the target EGR amount, and are calculated by the equations (73) and (74), respectively. In the equations (73) and (74), Rg and Re represent target value response-specifying parameters, and are set to values which satisfy the relationship of $-1<Rg<0$ and that of $-1<Re<0$, respectively.

Further, the reaching law input vector Wrch expressed by the equation (66) is calculated by the above-described equation (68). In the equation (68), Krch_g and Krch_e represent predetermined reaching law gains. Further, in the equation (68), σg and σe represent switching functions, and the switching function vector σ including these functions as elements thereof is calculated by the equation (70). In the equation (70), S represents a matrix defined by the above-described equation (71), and E a difference vector defined by the above-described equation (72).

Furthermore, in the equation (66), the adaptive law input vector Wadp is calculated by the aforementioned equation (69), and in the equation (69), Kadp_g and Kadp_e represent predetermined adaptive law gains.

Further, the non-interacting controller 402 calculates the non-interacting input vector U with an adaptive non-interacting control algorithm expressed by the following equation (75). The non-interacting input vector U is defined by the following equation (76).

$$U(k) = \begin{bmatrix} \dfrac{1}{Scp\_hat(k)}\{Heg\_hat(k) \cdot Legr\_cmd(k-1) - Rcp\_hat(k) \cdot PB(k-1) + PB'\_cmd(k)\} \\ \dfrac{1}{Heg\_hat(k)} Legr'\_cmd(k) \end{bmatrix} \quad (75)$$

$$U(k) = \begin{bmatrix} PB\_cmd(k) \\ Legr\_cmd(k) \end{bmatrix} \quad (76)$$

In the above equation (75), Rcp_hat and Scp_hat represent identified values of non-interacting parameters Rch and Sch described hereinafter, and are calculated by the onboard identifier 403, as described hereinafter.

On the other hand, the onboard identifier 403 calculates identified values Rcp_hat, Scp_hat, and Heg_hat of the non-interacting parameters with a sequential identification algorithm employing the δ correcting method, expressed by the following equations (77) to (86).

$$\theta(k) = \theta base(k) + d\theta(k) \tag{77}$$

$$d\theta(k) = \delta \cdot d\theta(k-1) + \frac{P(k) \cdot \xi(k)}{1 + \xi^T(k) \cdot P(k) \cdot \xi(k)} e\_id(k) \tag{78}$$

$$e\_id(k) = Gin(k) - Gcyl\_hat(k) \tag{79}$$

$$Gcyl\_hat(k) = \theta^T(k-1) \cdot \xi(k) \tag{80}$$

$$P(k+1) = \frac{1}{\lambda_1}\left(I - \frac{\lambda_2 \cdot P(k) \cdot \xi(k) \cdot \xi^T(k)}{\lambda_1 + \xi^T(k) \cdot P(k) \cdot \xi(k)}\right) P(k) \tag{81}$$

$$\theta^T(k) = [Rcp\_hat(k), Scp\_hat(k), Heg\_hat(k)] \tag{82}$$

$$\xi^T(k) = [PB(k-2), PB\_cmd(k-1), -Legr\_cmd(k-2)] \tag{83}$$

$$\theta base^T(k) = [Rcp\_base(k), Scp\_base(k), Heg\_base(k)] \tag{84}$$

$$d\theta^T(k) = [dRcp\_hat(k), dScp\_hat(k), dHeg\_hat(k)] \tag{85}$$

$$\delta = \begin{bmatrix} \delta 1 & 0 & 0 \\ 0 & \delta 2 & 0 \\ 0 & 0 & \delta 3 \end{bmatrix} \tag{86}$$

In the above-described equation (77), θ represents a vector of identified values of non-interacting parameters whose transposed matrix is defined by the equation (82), and θ base represents vectors of reference values whose transposed matrix is defined by the equation (84). In the equation (84), Rcp_base, Scp_base, and Heg_base represent reference values of the non-interacting parameters, respectively, and are calculated, as described hereinafter.

Further, in the aforementioned equation (77), dθ represents a vector of correction terms whose transposed matrix is defined by the equation (85). In the equation (85), dRcp_hat, dScp_hat, and dHeg_hat represent correction terms (correction values) of the reference values Rcp_base, Scp_base, and Heg_base, respectively. The correction term vector dθ is calculated by the equation (78). In the equation (78), δ represents a forgetting vector defined by the equation (86). In the equation (86), δ1 to δ3 represent forgetting coefficients, and are set to values which are larger than a value of 0, and at the same time not larger than a value of 1.

Furthermore, in the equation (78), e_id represents a difference calculated by the equation (79). In the equation (79), Gcyl_hat represents an estimated value of the intake air amount, and is calculated by the equation (80). In equation (80), ζ represents a vector where transposed matrix is defined by the equation (83).

Further, in the equation (78), P represents a square matrix of order 3 defined by the equation (81). In the equation (81), I represents a unit matrix of order 3, and λ1 and λ2 weighting parameters, respectively. As described hereinabove, in the identification algorithm configured as above, it is possible to configure characteristics of the identification algorithms according to settings of the weighting parameters λ1 and λ2 in the equation (81). In the onboard identifier 403 according to the present embodiment, the weighted least-squares method algorithm is employed so as to optimally secure both the accuracy of identification and a follow-up rate at which the vector θ follows an optimal value.

Figure 38:
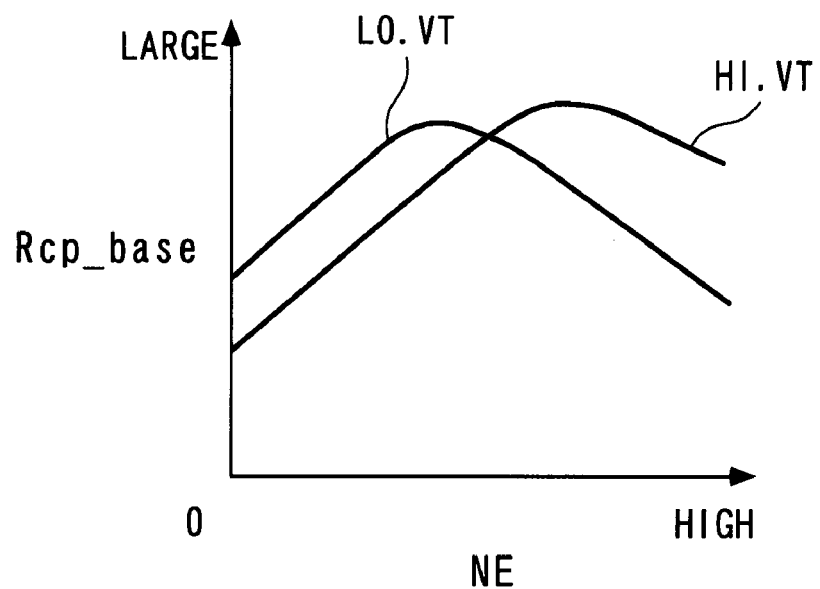
FIG. 38 is a diagram showing a table for use in calculating a reference value Rcp_base of a non-interacting parameter, by way of example.

Hereinafter, a description will be given of a method of calculating the aforementioned reference values Rcp_base, Scp_base, and Heg_base of the non-interacting parameters. First, the non-interacting parameter reference value Rcp_base is calculated by searching a table shown in FIG. 38 according to the engine speed NE. Referring to FIG. 38, the table for use in calculation of the reference value Rcp_base includes two types of tables used for HI.VT and LO.VT, from which is selected one associated with a state of switching of the valve timing by the valve timing-switching mechanism 80. Further, in this table, the reference value Rcp_base is set to a value capable of coping with a change in charging efficiency of the engine 3A, caused by a change in the engine speed NE. For example, it is set to a larger value in a region where the charging efficiency is higher.

Further, Scp_base is calculated by the following equation (87). In the equation (87), Ktb represents a model parameter of a model described hereinafter, and is set to a value which satisfies the relationship of 0<Ktb<1.

$$Scp\_base(k) = Rcp\_base(k) \cdot \frac{Ktb}{1 - Ktb} \tag{87}$$

Figure 39:
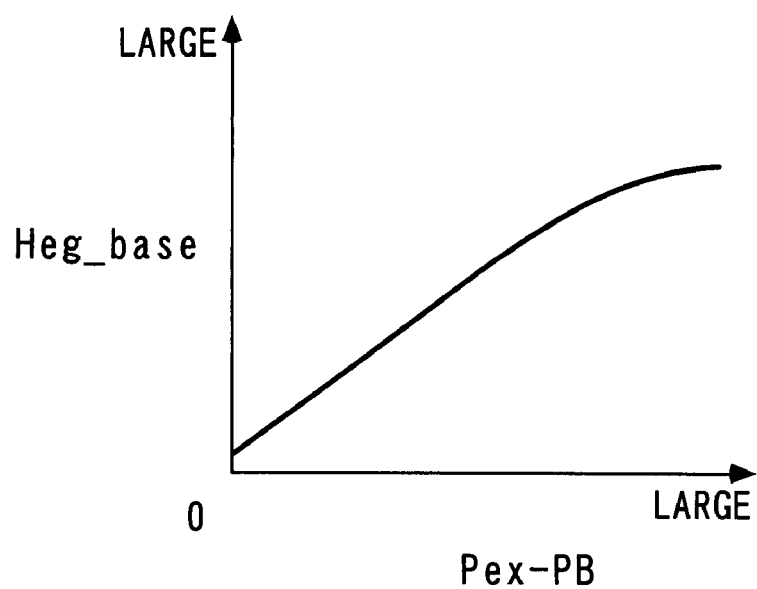
FIG. 39 is a diagram showing a table for use in calculating a reference value Heg_base of a non-interacting parameter, by way of example.

Furthermore, the non-interacting parameter reference value Heg_base is calculated by searching a table shown in FIG. 39 according to differential pressure Pex-PB between the exhaust pipe pressure Pex and the boost pressure PB. In this table, the reference value Heg_base is set to a larger value as the differential pressure Pex-PB is larger. This is because the EGR amount Gegr is increased as the differential pressure Pex-PB is larger.

As described above, the control system 1C calculates the vector θ of the identified values of the non-interacting parameters with the sequential identification algorithm expressed by the aforementioned equations (77) to (86), and calculates the non-interacting input vector U using the vector θ with a control algorithm expressed by the aforementioned equations (66) to (75), i.e. a control algorithm in which the target value filter-type adaptive two-degree-of-freedom response-specifying control algorithm and the adaptive non-interacting control algorithm are combined. The equations (66) to (75) and (77) to (86) are derived as described hereinafter.

First, in a case where the engine 3A is in a steady operating condition, when dead time which intake air takes to flow through the intake pipe 10 to reach the cylinders 3a is taken into account, the following equation (88) holds between an intake air amount Gcyl (fresh air amount not containing the EGR amount Gegr) and the detected intake air amount Gin. Furthermore, the following equation (89) holds between an intake air amount Gcp of intake air having flowed through the turbocharger system 15 and the EGR amount Gegr.

$$Gcyl(k+1) = Gin(k) \tag{88}$$

$$Gcp(k) = Gin(k) + Gegr(k) \tag{89}$$

Now, the intake air amount Gcp of intake air having flowed through the turbocharger system 15 is the amount of gases sucked into the cylinders 3a, and hence assuming that the charging efficiency determined by the boost pressure PB, the engine speed NE, and the valve timing is represented by Ki, the intake air amount Gcp can be defined by the following equation (90).

$$Gcp(k) = Ki(k) \cdot PB(k) \tag{90}$$

On the other hand, the boost pressure PB is controlled by the turbocharger system 15. When a response-specifying control algorithm or a target value filter-type two-degree-of-freedom response-specifying control algorithm is used as a control algorithm for controlling the boost pressure PB, the boost pressure PB can be modeled as expressed by the following equation (91) with respect to the target boost pressure PB_cmd.

$$PB(k)=(1-Ktb) \cdot PB(k-1)+Ktb \cdot PB\_cmd(k) \quad (91)$$

When the right side of the aforementioned equation (91) is substituted into PB of the equation (90), the following equations (92) to (94) are obtained.

$$Gcp(k) = Ki(k) \cdot (1 - Ktb)PB(k-1) + Ki(k) \cdot Ktb \cdot PB\_cmd(k) \quad (92)$$
$$= Rcp(k) \cdot PB(k-1) + Scp(k) \cdot PB\_cmd(k)$$

$$Rcp(k) = Ki(k) \cdot (1 - Ktb) \quad (93)$$

$$Scp(k) = Ki(k) \cdot Ktb \quad (94)$$

Furthermore, when the above equation (89) is modified, the following equation (95) is obtained, and when the right side of the above equation (92) is substituted into Gcp of the equation (95), the following equation (96) is obtained.

$$Gin(k)=Gcp(k)-Gegr(k) \quad (95)$$

$$Gin(k)=Rcp(k) \cdot PB(k-1)+Scp(k) \cdot PB\_cmd(k)-Gegr(k) \quad (96)$$

Furthermore, the following equation (97) is obtained by the equation (96) and the aforementioned equation (88).

$$Gcyl(k+1)=Rcp(k) \cdot PB(k-1)+Scp(k) \cdot PB\_cmd(k)-Gegr(k) \quad (97)$$

On the other hand, the EGR amount Gegr can be expressed by the following equation (98) using the exhaust pipe pressure Pex and the target EGR lift Legr_cmd, and further when the equation (98) is shifted toward the future side by the amount corresponding to one discrete time period, the following equation (99) is obtained.

$$Gegr(k)=Heg(k-1) \cdot Legr\_cmd(k-1) \quad (98)$$

$$Gegr(k+1)=Heg(k) \cdot Legr\_cmd(k) \quad (99)$$

When the above equations (97) and (99) are collectively expressed, the following equation (100) is obtained.

$$\begin{bmatrix} Gcyl(k+1) \\ Gegr(k+1) \end{bmatrix} = \begin{bmatrix} 0 & -1 \\ 0 & 0 \end{bmatrix} \begin{bmatrix} Gcyl(k) \\ Gegr(k) \end{bmatrix} + \begin{bmatrix} Scp(k) & 0 \\ 0 & Heg(k) \end{bmatrix} \begin{bmatrix} PB\_cmd(k) \\ Legr\_cmd(k) \end{bmatrix} + \begin{bmatrix} Rcp(k) \\ 0 \end{bmatrix} PB(k-1) \quad (100)$$

The equation (100) can be regarded as a model of the plant 404 of the interacting system, in which Gcyl and Gegr are used as control amounts, and to which PB_cmd and Legr_cmd are inputted as control inputs, and be expressed by the following equations (101) to (107).

$$X(k+1) = A \cdot X(k) + B \cdot U(k) + C \cdot D(k) \quad (101)$$

$$X(k) = \begin{bmatrix} Gcyl(k) \\ Gegr(k) \end{bmatrix} \quad (102)$$

$$U(k) = \begin{bmatrix} PB\_cmd(k) \\ Legr\_cmd(k) \end{bmatrix} \quad (103)$$

$$D(k) = PB(k-1) \quad (104)$$

$$A = \begin{bmatrix} 0 & -1 \\ 0 & 0 \end{bmatrix} \quad (105)$$

$$B = \begin{bmatrix} Scp(k) & 0 \\ 0 & Heg(k) \end{bmatrix} \quad (106)$$

$$C = \begin{bmatrix} Rcp(k) \\ 0 \end{bmatrix} \quad (107)$$

To convert the plant 404 of the interacting system expressed by the equation (101) to a linear system without any mutual interaction, the non-interacting input vector U calculated by the following equation (108) is used as a control input vector U. It should be noted that the equation (108) is derived by the non-interacting control law (cross-controller).

$$U(k)=B^{-1}(-A \cdot X(k)-C \cdot D(k)+W(k)) \quad (108)$$

When the right sides of the above equations (106), (105), (102), (107), and (104), and the right side of the aforementioned equation (65) are substituted into B, A, X, C, D, and W of the equation (108), respectively, the following equation (109) is obtained.

$$\begin{bmatrix} PB\_cmd(k) \\ Legr\_cmd(k) \end{bmatrix} = \frac{1}{Scp(k)Heg(k)} \begin{bmatrix} Heg(k) & 0 \\ 0 & Scp(k) \end{bmatrix} \times \quad (109)$$
$$\left( -\begin{bmatrix} 0 & -1 \\ 0 & 0 \end{bmatrix} \begin{bmatrix} Gcyl(k) \\ Gegr(k) \end{bmatrix} - \begin{bmatrix} Rcp(k) \\ 0 \end{bmatrix} PB(k-1) + \begin{bmatrix} PB'\_cmd(k) \\ Legr'\_cmd(k) \end{bmatrix} \right)$$
$$= \begin{bmatrix} \frac{1}{Scp(k)}\{Gegr(k) - Rcp(k) \cdot PB(k-1) + PB'\_cmd(k)\} \\ \frac{1}{Heg(k)} Legr'\_cmd(k) \end{bmatrix}$$

Furthermore, when the right side of the aforementioned equation (99) is substituted into Gegr of the above equation (109), the following equation (110) is obtained.

$$U(k) = \begin{bmatrix} PB\_cmd(k) \\ Legr\_cmd(k) \end{bmatrix} \quad (110)$$
$$= \begin{bmatrix} \frac{1}{Scp(k)}\{Heg(k) \cdot Legr\_cmd(k-1) - Rcp(k) \cdot PB(k-1) + PB\_cmd(k)\} \\ \frac{1}{Heg(k)} Legr'\_cmd(k) \end{bmatrix}$$

In the above equation (110), when the left side thereof is replaced by U, and so as to compensate for changes in the non-interacting parameters Rcp, Scp, and Heg caused by changes in the operating conditions and aging, the non-interacting parameters Rcp, Scp, and Heg are replaced by the identified values Rcp_hat, Scp_hat, and Heg_hat, respectively, the control algorithm expressed by the aforementioned equation (75), that is, the control algorithm for the non-interacting controller 402 is obtained.

Furthermore, when the right side of the aforementioned equation (110) is substituted into U of the aforementioned equation (101) for arrangement, the following equation (111) is obtained.

$$\begin{bmatrix} Gcyl(k+1) \\ Gegr(k+1) \end{bmatrix} = \begin{bmatrix} -Gegr(k) + Rcp(k) \cdot PB(k-1) + \\ Scp(k) \cdot PB\_cmd(k) Heg(k) \cdot Legr\_cmd(k) \end{bmatrix} \quad (111)$$

$$= \begin{bmatrix} -Gegr(k) + Rcp(k) \cdot PB(k-1) + \\ Scp(k) \dfrac{1}{Scp(k)} \left\{ \begin{array}{c} Gegr(k) - Rcp(k) \cdot \\ PB(k-1) + PB'\_cmd(k) \end{array} \right\} \\ Heg(k) \dfrac{1}{Heg(k)} Legr'\_cmd(k) \end{bmatrix}$$

$$= \begin{bmatrix} PB'\_cmd(k) \\ Legr'\_cmd(k) \end{bmatrix}$$

$$= W(k)$$

The above equation (111) expresses a model of a linear imaginary plant free from mutual interaction in which the follow-up input vector W is the control amount vector X. This imaginary plant corresponds to a combination of the aforementioned plant 404 and the non-interacting controller 402. As described hereinabove, a linear controller can be designed for such a linear imaginary plant without any mutual interaction, and therefore if a target value filter-type two-degree-of-freedom response-specifying control law is applied to the imaginary plant expressed by the equation (111) such that the intake air amount Gcyl is caused to follow the target intake air amount Gcyl_cmd, and the EGR amount Gegr to follow the target EGR amount Gegr_cmd, the following equations (112) to (120) are obtained.

$$W(k) = Weq(k) + Wrch(k) + Wadp(k) \quad (112)$$

$$= \begin{bmatrix} PB'\_cmd(k) \\ Legr'\_cmd(k) \end{bmatrix}$$

$$Weq(k) = \begin{bmatrix} (1-Sg) \cdot Gcyl(k) + Sg \cdot Gcyl(k-1) + \\ Gcyl\_cmd\_f(k) + (Sg-1) \cdot \\ Gcyl\_cmd\_f(k-1) - Sg \cdot \\ Gcyl\_cmd\_f(k-2)(1-Se) \cdot \\ Gegr(k) + Se \cdot Gegr(k-1) + Gegr\_cmd\_f(k) + \\ (Se-1) \cdot Gegr\_cmd\_f(k-1) - Se \cdot \\ Gegr\_cmd\_f(k-2) \\ \hline (1-Sg) \cdot Gin(k-1) + Sg \cdot Gin(k-2) + \\ Gcyl\_cmd\_f(k) + (Sg-1) \cdot \\ Gcyl\_cmd\_f(k-1) - Sg \cdot \\ Gcyl\_cmd\_f(k-2)(1-Se) \cdot \\ Heg(k-1) \cdot Legr\_cmd(k-1) + \\ Se \cdot Heg(k-2) \cdot Legr\_cmd(k-2) + \\ Gegr\_cmd\_f(k) + (Se-1) \cdot \\ Gegr\_cmd\_f(k-1) - Se \cdot Gegr\_cmd\_f(k-2) \end{bmatrix} \quad (113)$$

$$Wrch(k) = \begin{bmatrix} -Krch\_g \cdot \sigma g(k) \\ -Krch\_e \cdot \sigma e(k) \end{bmatrix} \quad (114)$$

$$Wadp(k) = \begin{bmatrix} -Kadp\_g \cdot \sum_{i=0}^{k} \sigma g(i) \\ -Kadp\_e \cdot \sum_{i=0}^{k} \sigma e(i) \end{bmatrix} \quad (115)$$

$$\sigma(k) = \begin{bmatrix} \sigma g(k) \\ \sigma e(k) \end{bmatrix} \quad (116)$$

$$= \begin{bmatrix} Eg(k) + Sg \cdot Eg(k-1) \\ Ee(k) + Se \cdot Ee(k-1) \end{bmatrix}$$

$$= E(k) + S \cdot E(k-1)$$

$$S = \begin{bmatrix} Sg & 0 \\ 0 & Se \end{bmatrix} \quad (117)$$

$$E(k) = \begin{bmatrix} Eg(k) \\ Ee(k) \end{bmatrix} \quad (118)$$

$$= \begin{bmatrix} Gcyl(k) - Gcyl\_cmd\_f(k-1) \\ Gegr(k) - Gegr\_cmd\_f(k-1) \end{bmatrix}$$

$$= \begin{bmatrix} Gcyl(k) \\ Gegr(k) \end{bmatrix} - \begin{bmatrix} Gcyl\_cmd\_f(k-1) \\ Gegr\_cmd\_f(k-1) \end{bmatrix}$$

$$= \begin{bmatrix} Gin(k-1) \\ Heg(k-1) \cdot Legr\_cmd(k-1) \end{bmatrix} - \begin{bmatrix} Gcyl\_cmd\_f(k-1) \\ Gegr\_cmd\_f(k-1) \end{bmatrix}$$

$$Gcyl\_cmd\_f(k) = \dfrac{-Rg \cdot Gcyl\_cmd\_f(k-1) +}{(1+Rg) \cdot Gcyl\_cmd(k)} \quad (119)$$

$$Gegr\_cmd\_f(k) = \dfrac{-Re \cdot Gegr\_cmd\_f(k-1) +}{(1+Re) \cdot Gegr\_cmd(k)} \quad (120)$$

In the above equations (112) to (120), when the non-interacting parameters Rcp, Scp, and Heg are replaced by the identified values Rcp_hat, Scp_hat, and Heg_hat, respectively, for the above-described reason, the control algorithm expressed by the aforementioned equations (66) to (74), that is, the control algorithm for the two-degree-of-freedom response-specifying controller 401 is obtained.

On the other hand, the identification algorithm expressed by the aforementioned equations (77) to (86) is derived as described hereinafter. First, when the right side of the equation (98) is substituted into Gegr of the aforementioned equation (97), the following equation (121) is obtained.

$$Gcyl(k+1) = Rcp(k) \cdot PB(k-1) + \quad (121)$$

$$Scp(k) \cdot PB\_cmd(k) - Heg(k-1) \cdot Legr\_cmd(k-1)$$

When the equation (121) is shifted toward the past side by an amount corresponding to one discrete time period, and the intake air amount Gcyl is replaced by the estimated value Gcyl_hat thereof while the non-interacting parameters Rcp, Scp, and Heg are replaced by the identified values Rcp_hat, Scp_hat, and Heg_hat, respectively, the following equation (122) is obtained.

$$Gcyl\_hat(k) = Rcp\_hat \cdot PB(k-2) + \quad (122)$$

$$Scp\_hat \cdot PB\_cmd(k-1) - Heg\_hat \cdot Legr\_cmd(k-2)$$

The equation (122) can be considered as a model of the imaginary plant, and as described above, Gcyl(k+1)=Gin(k) holds, and hence when the sequential identification algorithm employing the δ correcting method is applied to the equation (122) so as to identify model parameters of the model of the imaginary plant such that the difference e_id between the detected intake air amount Gin and the estimated value Gcyl_hat of the intake air amount is minimized, the aforementioned equations (77) to (86) are derived.

According to the control system 1C of the fourth embodiment, configured as above, the non-interacting input vector U, that is, the two non-interacting inputs PB_cmd and Legr_cmd) are calculated with the predetermined control algorithm [equations (66) to (75)] in which the target value filter-type two-degree-of-freedom response-specifying control algorithm and the non-interacting control algorithm are combined based on the plant model [equation (100)] formed as a discrete-time system model, it is possible to cause the intake air amount Gcyl and the EGR amount Gegr to accurately follow the target intake air amount Gcyl_cmd and the target EGR amount Gegr_cmd, respectively, while eliminating the mutual interaction.

Further, since the non-interacting input PB_cmd is calculated according to the value Gin corresponding to the immediately preceding value of the control amount Gcyl, and the control input Legr_cmd, when the control amount Gcyl changes, it is possible to calculate the non-interacting input PB_cmd so as to eliminate the mutual interaction, while quickly coping with the change in the control amount Gcyl.

Furthermore, since the discrete-time system model is used in calculation of the non-interacting input vector U, modeling errors can be reduced compared with the conventional control system employing the continuous-time system model, whereby it is possible to ensure a large margin of the stability of the control while setting the controller gains Krch_g, Krch_e, Kadp_g, and Kadp_e to higher values. What is more, since the discrete-time system model is used, differently from the conventional control system employing the continuous-time system model, there is no need to employ the differential values of the control amounts as variables forming the switching function, whereby even when the control period is short, it is possible to ensure the robustness, which is the advantageous feature of the response-specifying control algorithm.

Furthermore, since the follow-up input vector W (i.e. the two follow-up inputs Gcyl'_cmd and Gegr'_cmd) is calculated with the target value filter-type two-degree-of-freedom response-specifying control algorithm, it is possible not only to enhance the disturbance-suppressing capability and suppress degradation of controllability due to modeling errors, with the response-specifying control algorithm [equations (66) to (72)] but also to calculate the two follow-up inputs Gcyl'_cmd and Gegr'_cmd as values capable of moderating the response of the measured values Gcyl and Gegr to the two target values Gcyl_cmd and Gegr_cmd, with the target value filter algorithm [equations (73) and (74)].

Furthermore, the identified values Rcp_hat, Scp_hat, and Heg_hat of the non-interacting parameters are calculated by the onboard identifier 403 with the sequential identification algorithm [equations (51) to (61)] to which is applied the δ correcting method. More specifically, since the non-interacting parameters Rcp, Scp, and Heg, which can cause direct modeling errors in the plant model, are sequentially identified, it is possible to calculate the two non-interacting inputs Gcyl_cmd and Gegr_cmd while compensating for modeling errors quickly and properly. As a result, in the plant 404 in which the degree of the mutual interaction between the control inputs PB_cmd and Legr_cmd and the control amounts Gcyl and Gegr is considerably large, as in the present embodiment, even when modeling errors are caused by the aging and variations between individual component parts, it is possible to compensate for the modeling errors quickly and properly, thereby making it possible to ensure excellent controllability and control accuracy.

What is more, since the sequential identification algorithm to which is applied the δ correcting method is used, the identified values Rcp_hat, Scp_hat, and Heg_hat of the non-interacting parameters are calculated as values close to the reference values Rcp_base, Scp_base, and Heg_base thereof immediately after the start of the identification, thereby making it possible to avoid erroneous identification. Furthermore, the correction term vector dθ is multiplied by the forgetting coefficient vector δ, whereby predetermined forgetting effects are added to the correction term vector dθ, so that the identified values Rcp_hat, Scp_hat, and Heg_hat are identified in a state bound to the vicinity of the reference values Rcp_base, Scp_base, and Heg_base. This makes it possible to enhance the accuracy of the identification.

Furthermore, since the reference value Rcp_base of the non-interacting parameter is calculated according to the valve timing HI.VT or LO.VT of the intake valve switched by the valve timing-switching mechanism 80, the target boost pressure PB_cmd as a non-interacting input is also calculated according to the valve timing of the intake valve. Generally, when the boost pressure PB is controlled by a supercharger, there is a relationship between the valve timing of the intake valve and the control characteristics of the boost pressure PB that when the valve timing of the intake valve has changed, the control characteristics of the boost pressure PB also change. Therefore, there is a fear that when the boost pressure control is carried out independently of the valve timing of the intake valve 4, it becomes impossible not only to properly control the boost pressure PB but also to eliminate the mutual interaction between the control inputs PB_cmd and Legr_cmd and the control amounts Gcyl and Gegr. In contrast, according to the control system 1C, it is possible to properly control the boost pressure PB, while eliminating the mutual interaction, since the non-interacting input PB_cmd is calculated according to the valve timing of the intake valve, as described hereinabove.

Further, the reference value Heg_base of the non-interacting parameter is calculated according to the exhaust pipe pressure Pex, whereby the non-interacting input PB_cmd as well is calculated according to the exhaust pipe pressure Pex. Generally, when the boost pressure PB is controlled by a turbocharger system, there is a relationship between the exhaust pipe pressure Pex and the control characteristics of the boost pressure PB that when the exhaust pipe pressure Pex has changed, the control characteristics of the boost pressure PB also dramatically change. Therefore, there is a fear that when the control of the boost pressure PB is carried out independently of the exhaust pipe pressure Pex, it becomes impossible not only to properly control the boost pressure PB but also to eliminate the mutual interaction between the control inputs PB_cmd and Legr_cmd and the control amounts Gcyl and Gegr. In contrast, according to the control system 1C, it is possible to properly control the boost pressure PB, while eliminating the mutual interaction, since the non-interacting input PB_cmd is calculated according to the exhaust pipe pressure Pex, as described hereinabove.

As described above, it is possible to enhance the control accuracy and the response of the control system in which the mutual interaction exists between the control amounts Gcyl and Gegr and the control inputs PB_cmd and Legr_cmd.

It should be noted that although in the fourth embodiment, the non-interacting input vector U is calculated by the equation (75), when detection means for directly detecting the EGR amount Gegr is disposed in the engine 3A, the non-interacting input vector U may be calculated by an equation formed by replacing the non-interacting parameters Rcp, Scp, and Heg of the aforementioned equation (109) by the identified values Rcp_hat, Scp_hat, and Heg_hat.

Further, although in the fourth embodiment, the exhaust pipe pressure Pex and the valve timing HI.VT or LO.VT switched by the valve timing-switching mechanism 80 are used as operating condition parameters, by way of example, the operating condition parameters are not necessarily limited to these, but they may be any suitable parameters indicative of the operating conditions of the internal combustion engine.

Furthermore, although in the fourth embodiment, the turbocharger system 15 is employed as a supercharger, by way of example, the supercharger is not necessarily limited to this, but it may be any suitable supercharger that is capable of supercharging the engine 3A.

Further, although in the above-described embodiments, the control system according to the present invention is applied to plants of an interacting system in which a mutual interaction exists between two control inputs and two control amounts, by way of example, this is not limitative, but it can be applied to any plant of an interacting system in which a mutual interaction exists between three control inputs and three control amounts.

Further, although in the above-described embodiments, the control system according to the present invention is applied to the internal combustion engine in which two control amounts are controlled by two control inputs, respectively, by way of example, this is not limitative, but it can be applied to any internal combustion engine in which three or more control amounts are controlled by three or more control inputs, respectively.

Further, although in the above-described embodiments, the control system according to the present invention is applied to control of a driving mechanism of an intake system for the internal combustion engine, as a plant of the interacting system, by way of example, this is not limitative, but it goes without saying that the control system according to the present can be applied to control of any suitable plant of the interacting system for other industrial machines.

Further, although in the above-described embodiments, the control system according to the present invention is applied to the internal combustion engine for automotive vehicles, by way of example, this is not limitative, but it can be applied to internal combustion engines for various uses, such as those installed on boats, electric generators, and the like.

INDUSTRIAL APPLICABILITY

As described hereinbefore, the control system according to the present invention is useful in controlling a plurality of control amounts of a plant or an internal combustion engine while eliminating mutual interaction existing between a plurality of control inputs and the control amounts.

What is claimed is:

1. A control system for a plant in which a mutual interaction exists between a plurality of control inputs and a plurality of control amounts, comprising:
    target value-setting means for setting a plurality of target values that are targets of the respective control amounts; and
    non-interacting input-calculating means for calculating the control inputs as respective non-interacting inputs for causing the control amounts to follow the respective target values, the non-interacting inputs eliminating the mutual interaction, with a predetermined control algorithm based on a plant model formed by modeling the plant into a discrete-time system model, the predetermined control algorithm including a combination of a predetermined response-specifying control algorithm and a predetermined non-interacting control algorithm.

2. A control system as claimed in claim 1, wherein the plant model includes a plurality of non-interacting parameters for defining relationships between the control inputs and the control amounts,
    wherein said non-interacting input-calculating means calculates the respective non-interacting inputs with the predetermined control algorithm according to at least one of the non-interacting parameters and the control amounts, and
    the control system further comprising identification means for sequentially identifying the non-interacting parameters according to at least one of the non-interacting inputs, the control amounts, and an internal variable of the plant.

3. A control system as claimed in claim 2, wherein said identification means calculates reference values of the non-interacting parameters according to at least one of the non-interacting inputs, the control amounts, and the internal variable of the plant, calculates a plurality of correction values with a predetermined sequential identification algorithm according to at least one of the non-interacting inputs, the control amounts, and the internal variable of the plant, and identifies the non-interacting parameters by correcting the reference values of the non-interacting parameters by the correction values, respectively.

4. A control system for a plant in which a mutual interaction exists between a plurality of control inputs and a plurality of control amounts, comprising:
    target value-setting means for setting a plurality of target values that are targets of the respective control amounts; and
    non-interacting input-calculating means for calculating the control inputs as respective non-interacting inputs for causing the control amounts to follow the respective target values, the non-interacting inputs eliminating the mutual interaction, with a predetermined control algorithm based on a plant model formed by modeling the plant, the predetermined control algorithm including a combination of a predetermined two-degree-of-freedom control algorithm and a predetermined non-interacting control algorithm,
    wherein the predetermined two-degree-of-freedom control algorithm is an algorithm formed by combing a predetermined target value filter algorithm and a predetermined feedback control algorithm.

5. A control system as claimed in claim 4, wherein the predetermined feedback control algorithm is a predetermined response-specifying control algorithm.

6. A control system as claimed in claim 4, wherein the plant model includes a plurality of non-interacting parameters for defining relationships between the control inputs and the control amounts,
    wherein said non-interacting input-calculating means calculates the respective non-interacting inputs with the predetermined control algorithm according to at least one of the non-interacting parameters and the control amounts, and
    the control system further comprising identification means for sequentially identifying the non-interacting parameters according to at least one of the non-interacting inputs, the control amounts, and an internal variable of the plant.

7. A control system as claimed in claim 6, wherein said identification means calculates reference values of the non-interacting parameters according to at least one of the non-interacting inputs, the control amounts, and the internal variable of the plant, calculates a plurality of correction values with a predetermined sequential identification algorithm according to at least one of the non-interacting inputs, the control amounts, and the internal variable of the plant, and identifies the non-interacting parameters by correcting the reference values of the non-interacting parameters by the correction values, respectively.

8. A control system for a plant in which a mutual interaction exists between a plurality of control inputs and a plurality of control amounts, comprising:
   non-interacting input-calculating means for calculating the control inputs as respective non-interacting inputs eliminating the mutual interaction with a predetermined control algorithm based on a plant model formed by modeling the plant, the predetermined control algorithm including a predetermined non-interacting control algorithm,
   wherein the plant model includes a plurality of non-interacting parameters for defining relationships between the control inputs and the control amounts,
   wherein said non-interacting input-calculating means calculates the respective non-interacting inputs with the predetermined control algorithm according to at least one of the non-interacting parameters and the control amounts, and
   the control system further comprising identification means for sequentially identifying the non-interacting parameters according to at least one of the non-interacting inputs, the control amounts, and an internal variable of the plant.

9. A control system as claimed in claim 8, wherein said identification means calculates reference values of the non-interacting parameters according to at least one of the non-interacting inputs, the control amounts, and the internal variable of the plant, calculates a plurality of correction values with a predetermined sequential identification algorithm according to at least one of the non-interacting inputs, the control amounts, and the internal variable of the plant, and identifies the non-interacting parameters by correcting the reference values of the non-interacting parameters by the correction values, respectively.

10. A control system for an internal combustion engine, for controlling a plurality of control amounts therein by a plurality of control inputs, respectively, in which a mutual interaction exists between the control amounts and the control inputs, comprising:
   target value-setting means for setting a plurality of target values that are targets of the respective control amounts; and
   non-interacting input-calculating means for calculating the control inputs as respective non-interacting inputs for causing the control amounts to follow the respective target values, the non-interacting inputs eliminating the mutual interaction, with a predetermined control algorithm including a predetermined non-interacting control algorithm.

11. A control system as claimed in claim 10, wherein said non-interacting input-calculating means calculates the respective non-interacting inputs with the predetermined control algorithm according to at least one of the control amounts and at least one of the control inputs and an operating condition parameter indicative of an operating condition of the engine.

12. A control system as claimed in claim 11, wherein the predetermined non-interacting control algorithm is an algorithm based on a plant model defining relationships between the control amounts and the control inputs,
   wherein the plant model includes a plurality of non-interacting parameters for defining relationships between the control inputs and the control amounts,
   wherein said non-interacting input-calculating means calculates the non-interacting inputs with the predetermined control algorithm further according to the non-interacting parameters, respectively, and
   the control system further comprising identification means for sequentially identifying the non-interacting parameters according to at least one of the non-interacting inputs, the control amounts, and the operating condition parameter.

13. A control system as claimed in claim 12, wherein said identification means calculates reference values of the non-interacting parameters according to at least one of the non-interacting inputs, the control amounts, and the operating condition parameter, calculates a plurality of correction values with a predetermined sequential identification algorithm according to at least one of the non-interacting inputs, the control amounts, and the operating condition parameter, and identifies the non-interacting parameters by correcting the reference values of the non-interacting parameters by the correction values, respectively.

14. A control system as claimed in claim 11, wherein the engine includes a throttle valve mechanism for changing an opening of a throttle valve, and a variable valve lift mechanism for changing a lift of an intake valve,
   wherein the control amounts are pressure in an intake passage of the engine and an amount of intake air,
   wherein the control inputs are an opening control value for controlling the opening of the throttle valve and a lift control value for controlling the lift of the intake valve,
   wherein the operating condition parameter is rotational speed of the engine, and
   wherein said non-interacting input-calculating means calculates the non-interacting inputs according to the rotational speed of the engine, and at least one of the control amounts and the control inputs.

15. A control system as claimed in claim 11, wherein the engine includes a turbocharger system for changing boost pressure,
   wherein one of the control amounts is the boost pressure,
   wherein one of the control inputs is a boost pressure control value for controlling the boost pressure by the turbocharger system,
   wherein the operating condition parameter is pressure in an exhaust passage of the engine, and
   wherein said non-interacting input-calculating means calculates the boost pressure control value as one of the non-interacting inputs according to the pressure in the exhaust passage of the engine, and at least one of the control amounts and the control inputs.

16. A control system as claimed in claim 11, wherein the engine includes a supercharger for changing boost pressure, and a variable valve timing mechanism for changing valve timing of an intake valve,
   wherein one of the control amounts is the boost pressure,
   wherein one of the control inputs is a boost pressure control value for controlling the boost pressure by the supercharger,
   wherein the operating condition parameter is valve timing of the intake valve, and
   wherein said non-interacting input-calculating means calculates the boost pressure control value as one of the non-interacting inputs according to the valve timing of the intake valve, and at least one of the control amounts and the control inputs.

17. A control system as claimed in claim 10, wherein the engine includes a throttle valve mechanism for changing an opening of a throttle valve, and a variable valve lift mechanism for changing a lift of an intake valve,

- wherein the control amounts are pressure in an intake passage of the engine and an amount of intake air, and
- wherein the control inputs are an opening control value for controlling the opening of the throttle valve and a lift control value for controlling the lift of the intake valve.

18. A control system as claimed in claim 17, wherein the engine further includes an evaporative fuel processing system for temporarily adsorbing evaporative fuel generated within a fuel chamber and delivering the adsorbed evaporative fuel into the intake passage by the pressure in the intake passage, and

- wherein said target value-setting means sets a target value of the pressure in the intake passage to a lower value until a predetermined time period has elapsed after a start of the engine than after the predetermined time period has elapsed.

19. A control system as claimed in claim 17, wherein the engine further includes:

- an evaporative fuel processing system for temporarily adsorbing evaporative fuel generated within a fuel chamber, and delivering the adsorbed evaporative fuel into the intake passage by the pressure in the intake passage, and
- generation rate parameter-detecting means for detecting a generation rate parameter indicative of a rate of generation of evaporative fuel within the fuel chamber of the engine, and
- wherein said target value-setting means sets a target value of the pressure in the intake passage to a lower value as the rate of generation of evaporative fuel indicated by the detected generation rate parameter is larger.

20. A control system as claimed in claim 17, wherein the engine is used as a drive source of a vehicle,

- wherein an assisting force-generating device for generating an assisting force for making up for a braking force of the vehicle is connected to the intake passage of the engine, as a power source, and
- wherein said target value-setting means sets a target value of the pressure in the intake passage to a lower value when conditions for supplying negative pressure to the assisting force-generating device are satisfied than when the conditions are not satisfied.

21. A control system as claimed in claim 20, wherein said target value-setting means sets the target value of the pressure in the intake passage to a lower value as a speed of the vehicle is higher, when the conditions for supplying negative pressure to the assisting force-generating device are satisfied.

22. A control system as claimed in claim 10, wherein the engine includes an EGR device for changing an EGR amount, and a supercharger for changing boost pressure,

- wherein the control amounts are the EGR amount and the boost pressure, and
- wherein the control inputs are an EGR control value for controlling the EGR amount by the EGR device and a boost pressure control value for controlling the boost pressure by the supercharger.

\* \* \* \* \*